(12) United States Patent
Kataoka et al.

(10) Patent No.: US 6,243,469 B1
(45) Date of Patent: Jun. 5, 2001

(54) INFORMATION TRANSMISSION METHOD AND APPARATUS

(75) Inventors: Mitsuteru Kataoka, Fujisawa; Takenosuke Harada, Yokohama; Kazuhiro Machida, Inzai; Isao Masuda, Setagays, all of (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 0 days.

(21) Appl. No.: 09/154,165

(22) Filed: Sep. 16, 1998

(30) Foreign Application Priority Data

Sep. 18, 1997 (JP) .................................................. 9-253158

(51) Int. Cl.⁷ .................................................. H04N 7/167
(52) U.S. Cl. .................... 380/255; 380/212; 380/210; 380/200; 380/255; 380/259; 380/37; 380/42; 713/150
(58) Field of Search ..................................... 380/212, 210, 380/200, 255, 259, 37, 42; 713/150

(56) References Cited

U.S. PATENT DOCUMENTS

| 5,144,669 | * | 9/1992 | Faulkner et al. | 380/49 |
| 5,978,479 | * | 11/1999 | Ooi | 380/10 |
| 6,028,934 | * | 2/2000 | Shimosaka | 380/10 |

* cited by examiner

*Primary Examiner*—Thomas R. Peeso
*Assistant Examiner*—Todd Jack
(74) *Attorney, Agent, or Firm*—Wenderoth, Lind & Ponack, L.L.P.

(57) ABSTRACT

The present invention provides an information transmission apparatus and method for an information transmission system where encrypted information comprised of a plurality of information units each hierarchically encrypted and multiplexed to each other is communicated between at least two parties, wherein the information is being encrypted for transmission. The information transmission system is constructed by a transmitting unit and a receiving unit.

38 Claims, 25 Drawing Sheets

INFORMATION TRANSMISSION METHOD AND APPARATUS

BACKGROUND OF THE INVENTION

1. Field of the Invention

The present invention relates generally to a method and an apparatus for encrypting information in computer communication and data broadcasting, and transmitting the encrypted information.

2. Description of the Background Art

In FIG. 25, a conventional information transmission apparatus is shown. The conventional information transmission apparatus 1900 includes a transmitting unit 1910, transmitter 1920, and receiving unit 1930. Description is now made by taking two types of specific examples, those are information transmission in the Internet as Example 1 and digital broadcasting as Example 2. A plurality of receiving units 1930 may correspond to one transmitting unit 1930.

The transmitting unit 1930 produces transmission information It obtained by subjecting an information unit Iu to multiplexing and encryption, and output thereof. The information unit Iu is a collection of electronic data having meanings for a user, for example, such as text information, voice information, still image information, moving image information, HTML (Hypertext Makeup Language) information, and their combination.

Transmitting Unit 1910

The transmitting unit 1910 contains an information unit generator 1911, a multiplexer 1912, a lower layer scrambler 1913, and a sender 1914.

The information unit generator 1911 generates a plurality of information units Iu, and outputs thereof. In Example 1, the information unit generator 1911 outputs the information units Iu which are, for example, a text the user entered with a keyboard or the like, and an image taken into a computer, and others already stored in the computer. The information unit generator 1911 is an input screen portion of electronic mail software, and a server in a broadcasting station on the Internet, for example.

On the other hand, in Example 2, all information units Iu generated are previously stored in the information unit generator 1911. A method for merely selectively outputting the information units Iu in accordance with a predetermined schedule is considered. The information unit generator 1911 is a broadcasting station system containing a program management system in a sending system of digital broadcasting, a cart machine of a VTR, an MPEG-2 encoder, an EPG (Electronic Program Guide) management sending system of digital broadcasting, and the like. Additional information such as EPG must be sent out with the same contents thereof maintained for a long time. Therefore, the same contents, in some cases, are repeatedly outputted in a period on the order of seconds in the information unit generator 1911.

The multiplexer 1912 receives the plurality of information units Iu outputted by the information unit generator 1911. Then, the multiplexer 1912 multiplexes the inputted information units Iu, and outputs the multiplexed information units Iu as multiple information Im. By the multiplexing, the plurality of information units Iu are converted into a format (multiple information lm) suitable for efficient transmission in the transmitter 1920.

In Example 1, the multiplexer 1912 is an MIME (Multipurpose Internet Mail Extensions) encoder used for sending multimedia information by an electronic mail on the Internet, for example. In this case, the multiplexer 1912 respectively takes text information, image information, voice information, and so forth which are the plurality of information units Iu as parts. Then the multiplexer 1912 converts the parts into a multipartite message conforming to MIME for collecting the plurality of parts, and outputs the message. The formal specification of the MIME is defined by RFC (Request for Comments) 1521/1522.

On the other hand, in Example 2, the multiplexer 1912 is a service multiplexer for obtaining TS (Transport Stream) of an MPEG-2 systems from a plurality of stream data, for example. The MPEG-2 systems and the TS are standardized by ISO/IEC CD 13818-1. In this case, the multiplexer 1912 divides each of the plurality of information units Iu outputted by the information unit generator 1911 into packets called PES (Packetized Elementary Stream), and multiplexes the obtained packets on the basis of a certain rule.

The lower layer scrambler 1913 receives the multiple information Im outputted by the multiplexer 1912, and encrypts the multiple information Im in accordance with a predetermined encryption algorithm, and outputs the encrypted result as encrypted multiple information Ime. In Example 1, the lower layer scrambler 1913 may be software PGP (Pretty Good Privacy) on which an RSA cipher which is a public key cipher, for example, mounted therein is started with an encryption option. An output of the lower layer scrambler 1913 is a text of an electronic mail encrypted using the RSA cipher. The RSA cipher is described in detail in an article entitled by R. L. Rivest, A. Shamir, and L. Adleman which are contrivers themselves "A Method for Obtaining Digital Signatures and Public Key Cryptosystems" (Vol. 21, No. 2 issued on February, 1978 in Communications of the ACM). The PGP is described in detail in an article entitled by Simson Garfinkel "PGP: Pretty Good Privacy" (O'Reilly & Associates).

On the other hand, in Example 2, the lower layer scrambler 1913 may be, for example, a scrambler of a transport layer. The lower layer scrambler 1913 encrypts a payload portion of inputted TS of MPEG-2 using an encryption algorithm such as MULTI2 and DES(the Data Encryption Standard), and outputs the encrypted TS of the MPEG-2 which is the result thereof. Note that MULTI2 described in ARIB report No. 74 is developed by Hitachi Ltd. for the application of digital broadcasting system.

The sender 1914 receives the encrypted multiple information Ime outputted by the lower layer scrambler 1913, and converts the encrypted multiple information Ime into transmission information It which will be inputted to the transmitter 1920. In Example 1, the sender 1914 is a program for adding a mail header composed of a destination field, a sender field, and so forth to the text of the electronic mail. An output of the sender 1914 is the text of the electronic mail to which the mail header is added. On the other hand, in Example 2, the sender 1914 is an error-correcting encoder and a modulator for the TS of the MPEG-2.

Transmitter 1920

The transmitter 1920 transmits the inputted transmission information It to a physically distant point. Both inputs and outputs of the transmitter 1920 are the transmission information It. All the inputs of the transmitter 1920 may not appear in the outputs to the receiving unit 1930 without any error. In Example 1, the transmitter 1920 is a plurality of mail communication daemons which are connected to each other by a channel such as the Internet for interpreting and executing an SMTP (Simple Mail Transfer Protocol). Examples of the typical mail communication daemon include "sendmail". The formal specification of the SMTP is defined by RFC 821, RFC 822, and RFC 974. The sendmail is described in detail in an article entitled by E. Allman ""SENDMAIL—An Internetwork Mail Router" Unix Programmer's manual" (CSRG U. C. Berkeley issued on July, 1983).

On the other hand, in Example 2, the transmitter 1920 is constituted by an up-converter, a parabola antenna for sending data to a satellite, a communication satellite, and a ground receiving antenna.

Receiving unit 1930

The receiving unit 1930 receives the transmission information It transmitted by the transmitter 1920, and presents an information unit Iu to a user. The receiving unit 1930 includes a receiver 1931, a lower layer descrambler 1932, a demultiplexer 1933, a reproducer 1934, a storage 1935, and presenter 1936.

The receiver 1931 receives the transmission information It outputted by the transmitter 1920, and takes out the whole or a part of thereof. Then, the receiver 1931 reproduces an encrypted multiple information Ime based on the transmission information It taken out. In Example 1, the receiver 1931 is a front end program for mail transmission. On the other hand, in Example 2, the receiver 1931 is the connection of a satellite broadcasting tuner, a demodulator and an error-correcting decoder.

The lower layer descrambler 1932 receives the encrypted multiple information Ime outputted by the receiver 1931, and decrypts the encrypted multiple information Ime, and reproduces the multiple information Im. In Example 1, the lower layer descrambler 1932 is a PGP program which is started with a decryption option. On the other hand, in Example 2, the lower layer descrambler 1932 is a descrambler of the transport layer.

The demultiplexer 1933 separates each information unit Iu from the multiple information Im, takes out the separated information unit Iu, and outputs the information unit Iu taken out. In Example 1, the demultiplexer 1933 is an MIME decoder, and separates the text information, the image information, and so forth which are the respective parts included in the multipartite message as separate information, to take out the separate information. On the other hand, in Example 2, the demultiplexer 1933 is a demultiplexer for the TS of the MPEG-2. The demultiplexer 1933 separates a plurality of streams which are multiplexed by the MPEG-2 systems.

The reproducer 1934 receives the information unit Iu outputted by the demultiplexer 1933, and produces a reproduction information Ir1 which is reproducible information. In Example 1, the reproducer 1934 may be a text file viewer, image file presenting software, etc. On the other hand, in Example 2, the reproducer 1934 may be an MPEG-2 decoder for reproducing voices or images encoded by the MPEG-2, for example. In this case, the output is an NTSC (National Television System Standard Committee) signal or an analog voice signal.

The storage 1935 receives the reproduction information outputted by the reproducer 1934, and stores the first reproduction information Ir1. Then, the storage 1935 also outputs the first reproduction information Ir1 therefrom as a second reproduction information Ir2 on demands for reproduction. This operation is hereinafter merely referred to as reproduction. It is to be noted that the first and second reproduction information Ir1 and Ir2 are identical with respect to the contents thereof, but different in time for the presentation, as described later.

In Example 1, the storage 1935 may be a file system in OS (operating System) or software for managing the classification of electronic mails. On the other hand, in Example 2, the storage 1935 may be a VTR (Video Tape Recorder) or VCR (Video Cassette Tape Recorder) for recording and reproducing an NTSC signal and an analog voice signal.

The presenter 1936 receives the first reproduction information Ir1 outputted by the reproducer 1934 and the second reproduction information Ir2 outputted by the storage 1935, and presents either one or both of the information to a user. In Example 1, the presenter 1936 may be a window system such as X-window or Microsoft Windows for presenting image and voice to a user. On the other hand, in Example 2, the presenter 1936 may be a television receiver for inputting and receiving an NTSC signal and an analog voice signal, for example.

In FIG. 26, an example of encrypted multiple information unit Ime0$d$ produced by the information transmission apparatus 1900 is shown. According to this example, the encrypted multiple information unit Ime0$d$ includes four information units Iu1$d$, Iu2$d$, Iu3$d$, and Iu4$d$ each indicated by a circle in the drawing. A rectangle indicated by a dot line represents an encrypted multiple information unit Ime obtained by encrypting the information units Iu1$d$, Iu2$d$, Iu3$d$, and Iu4$d$ once in the lower layer scrambler 1913. In other words, all the information units Iu1$d$, Iu2$d$, Iu3$d$, and Iu4$d$ are encrypted with the same cipher, and are protected by the single encryption layer in the transportation level.

The information units Iu1$d$, Iu2$d$, Iu3$d$, and Iu4$d$ represents a tourist resort guide considering the weather forecast, a weather forecast for the tourist resorts, a weather forecast for the entire country, and a weather forecast for a local area, respectively. These sub-tiles with respect to weather forecast are encrypted to generate a total weather forecast program Iue. Thus, there is no hierarchical order among these sub-tiles from the view point of encryption.

In Operation

With reference to FIGS. 27 and 28, the operation of the conventional information transmission apparatus 1900 is described below. In FIG. 27, a flow chart showing the operation performed by the transmitting unit 1910 and the transmitter 1920 is shown.

At step S2001, the information unit generator 1911 generates a plurality of information units Iu, and outputs the generated information units Iu. Examples of the generation of the information units Iu include a method in which a user enters information units Iu and designates a file as in Example 1, and a case where information units Iu are selectively outputted from stored information units Iu in accordance with a predetermined schedule as in Example 2.

At step S2002, the multiplexer 1912 multiplexes the information units Iu generated at step S2001, and outputs the result thereof as multiple information Im. The multiple information Im is multipartite data conforming to the MIME in the case of Example 1, while being data representing the TS of the MPEG-2 systems in the case of Example 2.

At step S2003, the lower layer scrambler 1913 encrypts the multiple information Im obtained by the multiplexing at step S2002, and produces the encrypted multiple information Ime. In Example 1, the multiple information Im is encrypted using the RSA cipher or the like. On the other hand, in Example 2, the payload portion of the TS of the MPEG-2 is encrypted using a MULTI2 cipher manufactured by Hitachi Ltd., for example.

At step S2004, the sender 1914 converts the encrypted multiple information Ime obtained by the encryption at step S2003 into a format which is transmittable or suitable for transmission by the transmitter 1920, and produces the transmission information It. In Example 1, information obtained by adding information, for example, "To:" field, "From:" field to the head of the text of the mail which is encrypted multiple information Ime is outputted as transmission information It. On the other hand, in Example 2, information obtained by encoding the TS of the MPEG-2 using an error-correcting code and then, modulating the encoded TS is outputted.

At step S2005, the transmitter 1920 transmits the transmission information It to a physically distant point. In Example 1, the mail communication daemons mounted on one or a plurality of computers connected are communicated to a computer network such as the Internet or a LAN (Local Area Network) on the basis of the SMTP. Thus, the mail is transmitted from the mail communication daemon on one of the computers to the mail communication daemon on the other computer.

On the other hand, in Example 2, transmission information It obtained by the conversion in the up-converter is transmitted to the communication satellite by the parabolic antenna. The communication satellite transmits the received transmission information It to the ground by a transponder. The transmission information It from the communication satellite is received by the ground receiving antenna.

With reference to FIG. 28, the operation performed by the receiving unit 1930 is described next. In FIG. 28, the operations of taking out an information unit Iu in real time from the transmission information It, presenting the information unit Iu to the user, storing the information unit Iu as required by the user, and later viewing the information unit Iu again are specifically shown.

At step S2101, when the user views the information unit Iu in real time from the transmission information It, the procedure advances to step S2102. When the user views the information unit Iu previously stored in the storage 1935, the procedure advances to step S2109.

At step S2102, the receiver 1931 receives the transmission information It from the transmitter 1920, and takes out a part or the whole of the encrypted multiple information Ime from the inputted transmission information It. In Example 1, processing for taking out one electronic mail data addressed to a specific user is performed. On the other hand, in Example 2, processing for filtering a particular packet storing information to be found by a PID (Packet ID), and selecting and extracting the packet is performed by tuning to a predetermined frequency.

At step S2103, the lower layer descrambler 1932 receives the encrypted multiple information Ime outputted by the receiver 1931, and decrypts the encrypted multiple information Ime, and outputs multiple information Im. In Example 1, the lower layer descrambler 1932 is the PGP program started with a decryption option. Decryption is performed using the RSA cipher by the PGP program, and the result of the decryption is outputted. On the other hand, in Example 2, the multiple information Im encrypted using the MULTI2 cipher is decrypted, to obtain multiple information Im.

At step S2104, the demultiplexer 1933 separates each information unit Iu from the multiplexed information units Im and takes out the information unit Iu. In Example 1, the demultiplexer 1933 separates for each part the multipartite message obtained by multiplexing on the basis of the MIME. As a result, the text information, the image information, the voice information, and so forth which are the respective parts are separated as discrete information units Iu.

On the other hand, in Example 2, the demultiplexer 1933 separates the plurality of streams multiplexed by the MPEG-2 systems on the basis of a PID (Packet ID, a packet identifier). As a result, additional information such as an MPEG-2 video stream, an MPEG-1 audio stream, and EPG are separated as discrete information units Iu. An MPEG-2 video is standardized by ITU-T H. 262, and a MPEG-1 audio is standardized as ISO/IEC 11172-3 Standard.

At step S2105, the reproducer 1934 receives the information unit Iu outputted by the demultiplexer 1933, and produces the first reproduction information Ir1 which is reproducible information. In Example 1, when the information unit Iu is text information, for example, fonts corresponding to respective character codes are selected and listed, to generate a bitmap format as the reproduction information Ir1. When the information unit Iu is in an image information format such as JPEG (Joint Photographics Experts Group), it is expanded into the bitmap format, and the result of the expansion is outputted as reproduction information. The JPEG is standardized by ISO/IEC 10918. When the information unit Iu is voice information, it is converted into an analog voice signal by the same function as that of a digital-to-analogue (D/A) converter. And the analog voice signal is also outputted as reproduction information.

On the other hand, in Example 2, when the information unit Iu obtained at step S2104 is the MPEG-2 video stream, the MPEG-2 video is decoded, and the NTSC is outputted signal as reproduction information. When the information unit Iu is a voice stream, it is converted into an analog voice signal by D/A conversion, and the analog voice signal is outputted.

At step S2106, the presenter 1936 presents the first reproduction information Ir1 obtained at step S2105 to the user in accordance with the format of the reproduction information. In Example 1, when the reproduction information obtained at step S2105 is in the bitmap format, the presenter 1936 arranges and presents the reproduction information Ir1 on a display screen. Thus, the reproduction information Ir1 is presented to the user. When the reproduction information obtained at step S2105 is an analog voice signal, the analog voice signal is converted into sound by being sent to a speaker, and is visually presented to the user.

On the other hand, in Example 2, an NTSC signal as the reproduction information which is obtained at step S2105 is received on a display, the analog voice information is sent to a speaker, and the reproduction information is presented to the user.

At step S2107, the procedure advances to step S2108 in a case where an attempt to store information in the current transmission information It is made by presenting the intention of the user, while proceeding to step S2101 in the other case. Specific examples of a case where the intention of the user is presented include a case where it is designated while being viewed and a case where it is previously set by a timer or the like.

At step S2108, the reproduction information generated at step S2105 is stored in the storage 1935. Thereafter, the procedure advances to step S2101. Reproduction information Ir1 may be additionally stored in the storage 1935, or the information Ir1 already stored may be overwritten by the additionally stored information Ir1. Alternatively, in a case where information with an old version has already been stored in the storage 1935, the information with an old version may be replaced.

In Example 1, the reproduction information is stored and arranged in a file system. The information units Iu are arranged in the order of arrival, by sending person, and by topic, for example. On the other hand, in Example 2, the reproduction information such as images and voices is recorded on a video tape or the like. For example, additional information other than images and voices which are multiplexed in a NTSC vertical blanking period may be simultaneously stored. In a case where digital information is recorded as it is, a plurality of streams other than images and voices may be simultaneously recorded.

At step S2109, the first reproduction information Ir1 stored in the storage 1935 is outputted therefrom as the second reproduction information Ir2. In Example 1, the reproduction information Ir2 (Ir1) selected by the user out of the reproduction information Ir1 arranged and stored in the file system is outputted. On the other hand, in Example 2, images and voices are reproduced from the video tape or the like. Although the selection of the reproduction information Ir2 (Ir1) which the user desires to select may be automated by being realized as the function of the storage 1935, the user himself or herself may also select the video tape or the like and set the selected video tape in the storage 1935.

At step S2110, the presenter 1936 presents the reproduction information outputted at step S2109 to the user. Thereafter, the procedure returns to step S2101. The operation at step S2110 may be the same as that at step S2106 except that the procedure returns to step S2101.

However, as described in the above description, the conventional information transmission apparatus 1900 faces the following two main problems. The first problem is that there is a restriction on the degree of freedom to setting the resistance of a cipher against unfair decryption. In general, the higher the resistance of the cipher to unfair decryption is, the more resources such as computer resources and processing time are required for decryption processing performed by a fair decrypting method. Therefore, encryption using a cipher having necessary and sufficient resistance is required depending on secrecy required of an object to be encrypted.

For example, when an encryption higher in secrecy is required of an information unit Iu which is a part of information to be transmitted, the information unit Iu which is the part must be subjected to encryption using a cipher having higher resistance. For example, when in a weather forecast program, a weather forecast for the entire country is free and is not encrypted. However, a detailed forecast for the local area is charged, and a weather forecast custom-maid for each user is charged extra. Therefore, the detailed forecast for the local area must be subjected to an encryption higher in secrecy than the weather forecast for the entire country, and the custom-made weather forecast must be subjected to an encryption higher in secrecy than the detailed forecast for the local area.

Although in many of the ciphers, the resistance of the cipher can be theoretically adjusted by increasing the size of a key of cryptanalysis, the resistance of the cipher does not necessarily have a sufficient degree of freedom due to the restriction on hardware for decryption generally used, for example.

The second problem is that the information unit Iu must be decrypted before it is stored. In general, when charged information is sent in a media which can be accessed by all people, for example, such as broadcasting. In such a charged broadcasting, information is transmitted in an encrypted state in a transmitting unit 1910, and fees are charged at the time point where the information is decrypted in a receiving unit 1930 in many cases. This is for preventing unfair viewing of users who do not pay fees.

It is necessary for the conventional information transmission apparatus 1900 to store the reproduction information Ir which is generated by decrypting the transmission information It produced by encrypting the information unit Iu sent from the transmitting unit 1910 before the user views the information unit Iu not in real time but some time after transmission. Considered next is a case where information units Iu which may be viewed are previously stored and are later viewed.

On the other hand, a method of changing the structure of the receiving unit and storing transmission information It as it exists is also considered. In this method, when a additional information such as EPG having the same content are repeatedly sent, such information is overlapped with each other. Furthermore, the information units Iu including old and new contents are both stored regardless the version thereof, even though the newest one of them, for example, the number of survivors in a plane accident and software whose version is updated, is worthwhile. Therefore, the capacity of the storage is wasted, which is not realistic, and excess processing is required in taking out the newest information unit Iu.

SUMMARY OF THE INVENTION

The present invention has been made to solve the above-described conventional problems. According to a first aspect of the present invention, an information transmission apparatus for use in an information transmission system where an encrypted information comprised of a plurality of information units each hierarchically encrypted and multiplexed to each other is communicated between at least two parties, the information being encrypted for the transmission, the apparatus comprises:

a first multiplexer for multiplexing at least one of the information unit and the encrypted information unit to produce a multiplexed information unit.

As apparently from the above, according to the first aspect of the present invention, it is possible to produce the encrypted information comprised of a plurality of information units which are hierarchically encrypted and multiplexed to each other in various combinations.

According to a second aspect, in the first aspect of the present invention, an information transmission apparatus further comprises:

a second encryption unit for encrypting the multiple information with a second predetermined encryption system to produce the encrypted multiplexed information; and a second multiplexer for multiplexing the encrypted information unit to produce the multiplexed information.

As apparent from the above, according to the second aspect of the present invention, it is possible to encrypt each of information units with a different encryption system, ensuring the encryption resistance against unfair access the information.

According to a third aspect, in the second aspect of the present invention, an information transmission apparatus further comprises:

a third encryption unit for encrypting the multiplexed information with a third predetermined encryption system to produce an encrypted multiple information unit.

According to a fourth aspect, in the third aspect of the present invention, an information transmission apparatus, wherein the third predetermined encryption system is the same as that applied to the encrypted information.

According to a fifth aspect, in the third aspect of the present invention, an information transmission apparatus, wherein the second predetermined encryption system is the same as the third predetermined encryption system.

According to a sixth aspect, in the third aspect of the present invention, an information transmission apparatus, wherein the first, second, and third predetermined encryption systems are the same.

According to a seventh aspect, in the first aspect of the present invention, an information transmission apparatus further comprises:

a transmitter for converting the encrypted multiplexed information into a format suitable for an efficient transmission.

According to an eighth aspect, in the first aspect of the present invention, an information transmission apparatus, wherein the first encryption unit encrypts the information unit with an encryption system suitable for the transmission of information.

According to an eighth aspect, an information transmission apparatus for use in an information transmission system where an encrypted information comprised of a plurality of information units each hierarchically encrypted and multiplexed to each other is communicated between at least two parties, the information being encrypted for the transmission, the apparatus comprising:

a first demultiplexer for demultiplexing the first multiplexed information unit into any of a first encrypted information unit, a second multiplexed information unit and the information unit; and a second decryption unit for decrypting the first encrypted information unit with a second decryption system to produce the information unit or a second encrypted information unit.

According to a tenth aspect, in the ninth aspect of the present invention, an information transmission apparatus further comprising:

a second demultiplexer for demultiplexing the second multiplexed information unit;

a third decryption unit for decrypting the second encrypted information unit with a third predetermined decryption system to produce the information unit.

According to an eleventh aspect, in the ninth aspect of the present invention, an information transmission apparatus, wherein the first decryption system is the same as that applied to the encrypted information.

According to a twelve aspect, in the first aspect of the present invention, an information transmission apparatus further comprises:

a storage provided between the first demultiplexer and the second decryption unit for storing any of the first and second encrypted information units.

According to a thirteenth aspect, in the twelve aspect of the present invention, an information transmission apparatus further comprises:

a reproducer for receiving the encrypted information units from the second decryption unit to produce a reproduction information indicating a content the encrypted information, the reproducer requesting the storage to supply the stored encryption information unit to the second decryption unit.

According to a fourteenth aspect of the present invention, an information transmission method for transmitting an encrypted information comprised of a plurality of information units each hierarchically encrypted and multiplexed to each other is communicated between at least two parties, the information being encrypted for the transmission, the method comprising the steps of:

producing the information unit;

encrypting the information unit with a first predetermined encryption system to produce an encrypted information unit; and multiplexing at least one of the information unit and the encrypted information unit to produce a multiplexed information unit.

As apparently from the above, according to the fourteenth aspect of the present invention, it is possible to produce the encrypted information comprised of a plurality of information units which are hierarchically encrypted and multiplexed to each other in various combination.

According to a fifteenth aspect, in the fourteenth aspect of the present invention, an information transmission method further comprising the steps of:

encrypting the multiple information with a second predetermined encryption system to produce the encrypted multiplexed information; and multiplexing the encrypted information unit to produce the multiplexed information.

As apparent from the above, according to the fourteenth aspect of the present invention, it is possible to encrypt each of information units with different encryption system, ensuring the encryption resistance against unfair access the information.

According to a sixteenth aspect, in the fifteen aspect of the present invention, an information transmission method further comprises:

encrypting the multiplexed information with a third predetermined encryption system to produce an encrypted multiple information unit.

According to a seventeenth aspect, in the sixteenth aspect of the present invention, an information transmission method, wherein the third predetermined encryption system is the same as that applied to the encrypted information.

According to an eighteenth aspect, in the sixteenth aspect of the present invention, an information transmission method, wherein the second predetermined encryption system is the same as the third predetermined encryption system.

According to a nineteenth aspect, in the sixteenth aspect of the present invention, an information transmission method, wherein the first, second, and third predetermined encryption systems are the same.

According to a twentieth aspect, in the fourteenth aspect of the present invention, an information transmission method further comprising the step of:

converting the encrypted multiplexed information into a format suitable for an efficient transmission.

According to a twenty first aspect, in the fourteenth aspect of the present invention, an information transmission method, wherein at the encrypting step the information unit is encrypted with an encryption system suitable for the transmission of information.

According to a twenty second aspect of the present invention, an information transmission method for transmitting an encrypted information comprised of a plurality of information units each hierarchically encrypted and multiplexed to each other is communicated between at least two parties, the information being encrypted for the transmission, the method comprising the steps of:

decrypting the encrypted information with a first decryption system to produce a first multiplexed information unit;

demultiplexing the first multiplexed information unit into any of a first encrypted information unit, a second multiplexed information unit and the information unit; and decrypting the first encrypted information unit with a second decryption system to produce the information unit or a second encrypted information unit.

According to a twenty third aspect, in the twenty second aspect of the present invention, an information transmission method further comprising the steps of:

demultiplexing the second multiplexed information unit;

decrypting the second encrypted information unit with a third predetermined decryption system to produce the information unit.

According to a twenty fourth aspect, in the twenty second aspect of the present invention, an information transmission apparatus, wherein the first decryption system is the same as that applied to the encrypted information.

According to a twenty fifth aspect, in the fourteenth aspect of the present invention, an information transmission apparatus further comprising the step of:

storing any of the first and second encrypted information units.

According to a twenty sixth aspect, in the twenty fifth aspect of the present invention, an information transmission apparatus further comprising the step of:

a reproducer for receiving the encrypted information units from the second decryption unit to produce a reproduction information indicating a content of the encrypted information, the reproducer requesting the storage to supply the stored encryption information unit to the second decryption unit.

According to a twenty seventh aspect of the present invention, an information transmission system for transmitting an encrypted information comprised of a plurality of information units each hierarchically encrypted and multiplexed to each other is communicated between at least two parties, the information being encrypted for the transmission, the system comprises:

an information unit generator for producing the information unit;

a first encryption unit for encrypting the information unit with a first predetermined encryption system to produce an encrypted information unit;

a first multiplexer for multiplexing at least one of the information unit and the encrypted information unit to produce a multiplexed information unit;

a first decryption unit for decrypting the encrypted information with a first decryption system to produce a first multiplexed information unit;

a first demultiplexer for demultiplexing the first multiplexed information unit into any of a first encrypted information unit, a second multiplexed information unit and the information unit; and a second decryption unit for decrypting the first encrypted information unit with a second decryption system to produce the information unit or a second encrypted information unit.

As apparent from the above, according to the twenty seventh aspect of the present invention, it is possible to produce the encrypted information comprised of a plurality of information units which are hierarchically encrypted and multiplexed to each other in various combinations. It is also possible to reproduce the information from thus hierarchically encrypted and multiplexed information.

According to a twenty eighth aspect, in the twenty seventh aspect of the present invention, an information transmission system further comprises:

a second encryption unit for encrypting the multiple information with a second predetermined encryption system to produce the encrypted multiplexed information; and a second multiplexer for multiplexing the encrypted information unit to produce the multiplexed information.

As apparent from the above, according to the twenty eighth aspect of the present invention, it is possible to encrypt each of information units with different encryption system, ensuring the encryption resistance against unfair access of the information.

According to a twenty ninth aspect, in the twenty eighth aspect of the present invention, an information transmission system further comprising:

a third encryption unit for encrypting the multiplexed information with a third predetermined encryption system to produce an encrypted multiple information unit.

According to a thirtieth aspect, in the twenty ninth aspect of the present invention, an information transmission system, wherein the third predetermined encryption system is the same as that applied to the encrypted information.

According to a thirty first aspect, in the twenty ninth aspect of the present invention, an information transmission system, wherein the second predetermined encryption system is the same as the third predetermined encryption system.

According to a thirty second aspect, in the twenty ninth aspect of the present invention, an information transmission system, wherein the first, second, and third predetermined encryption systems are the same.

According to a thirty third aspect, in the twenty seventh aspect of the present invention, an information transmission system further comprising:

a transmitter for converting the encrypted multiplexed information into a format suitable for an efficient transmission.

According to a thirty fourth aspect, in the twenty seventh aspect of the present invention, an information transmission system, wherein the first encryption unit encrypts the information unit with an encryption system suitable for the transmission of information.

According to a thirty fifth aspect, in the twenty seventh aspect of the present invention, an information transmission system further comprises:

a second demultiplexer for demultiplexing the second multiplexed information unit;

a third decryption unit for decrypting the second encrypted information unit with a third predetermined decryption system to produce the information unit.

According to a thirty sixth aspect, in the twenty seventh aspect of the present invention, an information transmission system, wherein the first decryption system is the same as that applied to the encrypted information.

According to a thirty seventh aspect, in the twenty seventh aspect of the present invention, an information transmission system apparatus further comprises:

a storage provided between the first demultiplexer and the second decryption unit for storing any of the first and second encrypted information units.

According to a thirty eighth aspect, in the thirtieth aspect of the present invention, an information transmission system further comprises:

a reproducer for receiving the encrypted information units from the second decryption unit to produce a reproduction information indicating a content of the encrypted information, the reproducer requesting the storage to supply the stored encryption information unit to the second decryption unit.

DESCRIPTION OF THE PREFERRED EMBODIMENTS

Preferred embodiments according to the present invention are described in detail with reference to the attached drawings FIGS. 1 to 24.

First Embodiment

Figure 1:
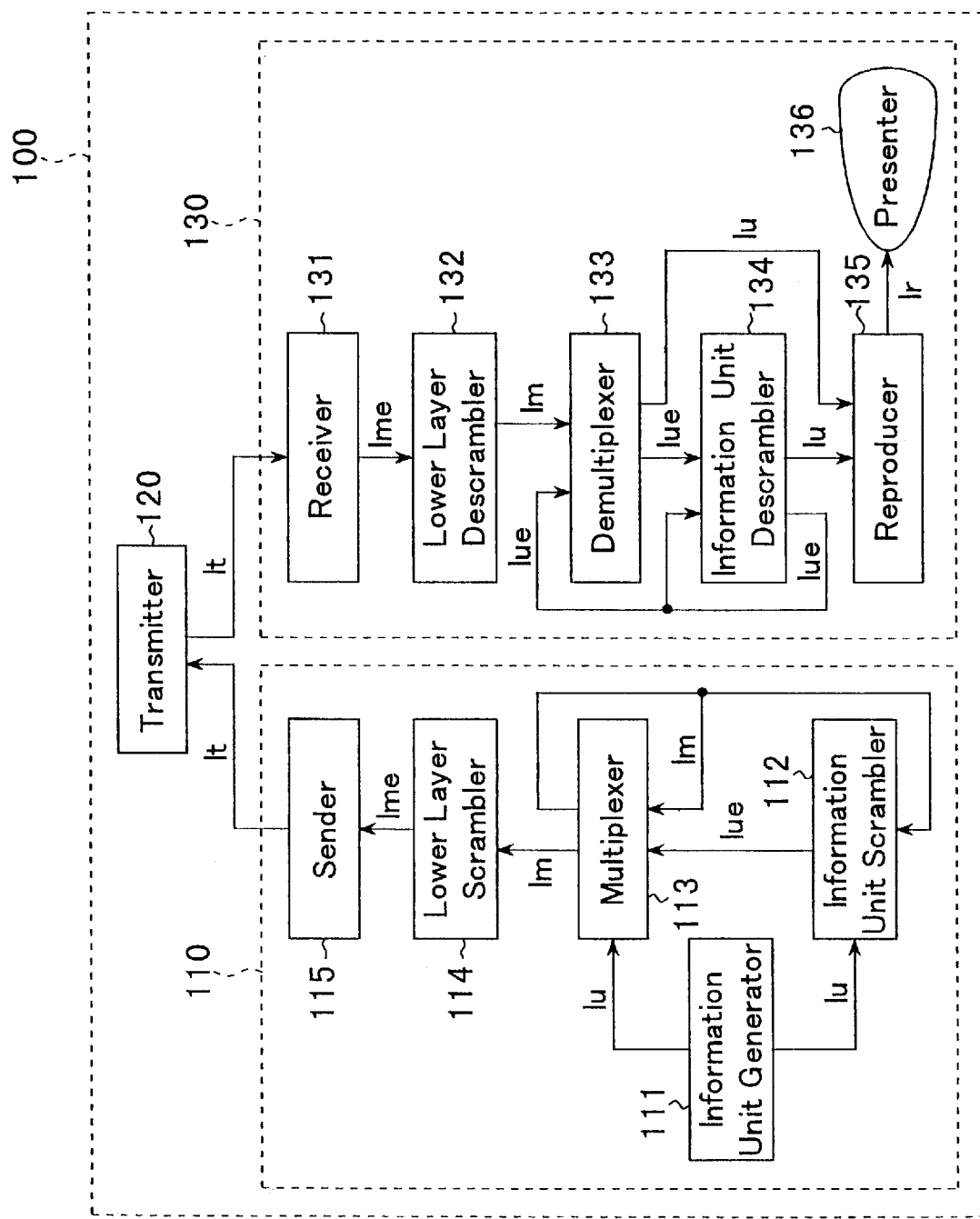
FIG. 1 is a block diagram showing an information transmission apparatus according to a first embodiment of the present invention.
Figure 2:
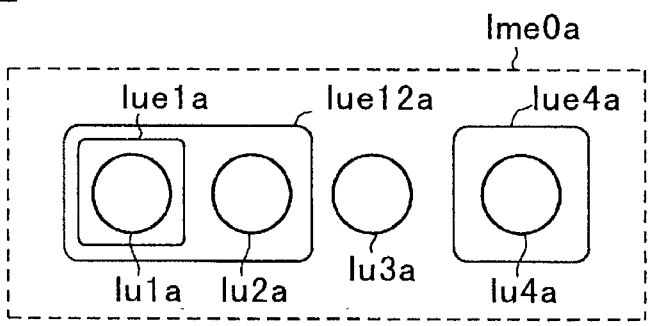
FIG. 2 is a graph in assistance of explaining an encrypted multiple information unit produced by the information transmission apparatus of FIG. 1.
Figure 3:
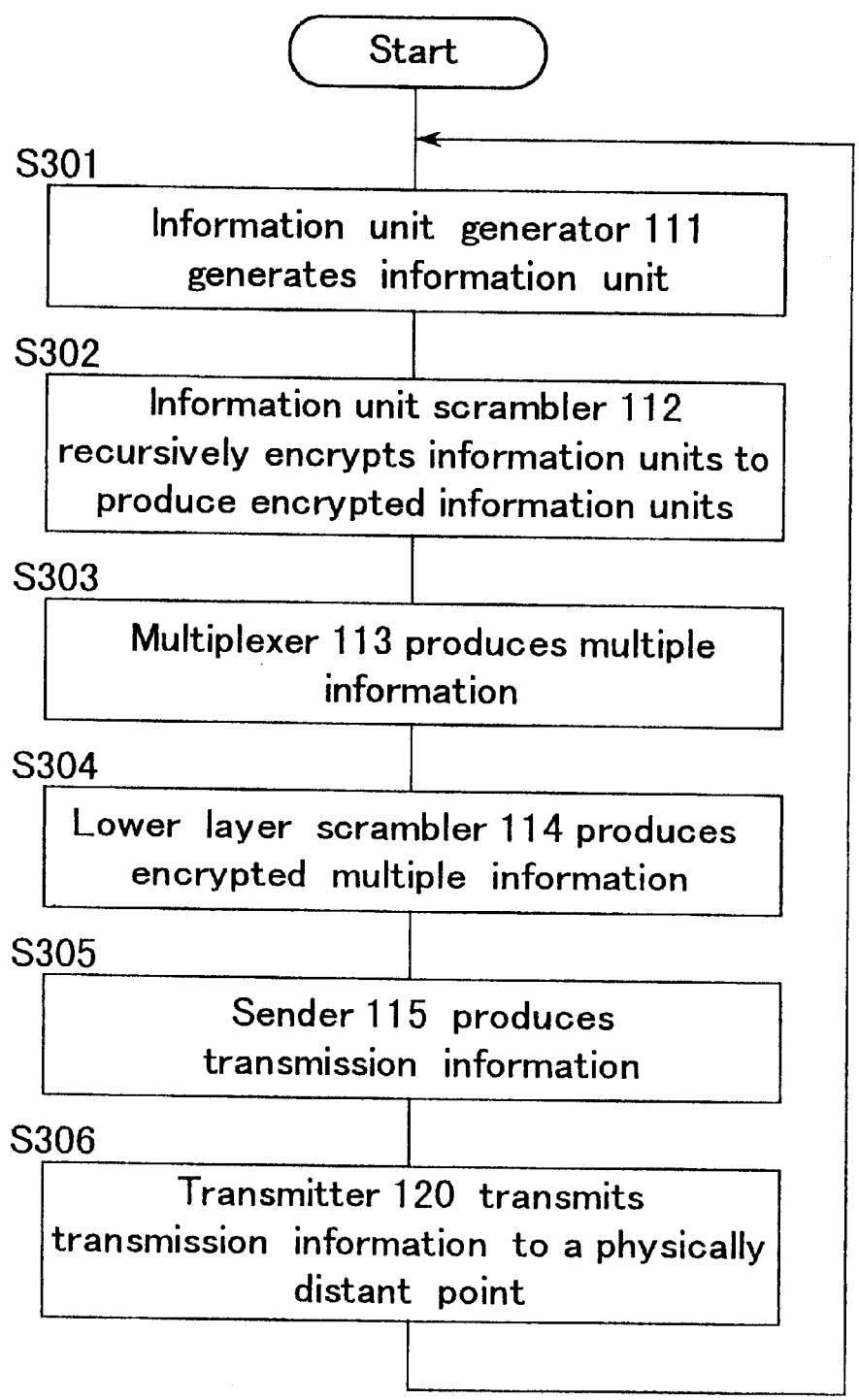
FIG. 3 is a flow chart showing operations performed by the transmitting unit and transmitter in the information transmission apparatus of FIG. 1.

With reference to FIGS. 1 to 3, an information transmission apparatus according to a first embodiment of the present invention is described next. Description is now made by taking two types of specific examples, those are information transmission in the Internet as Example 1 and digital broadcasting as Example 2. The information transmission apparatus 100 includes a transmitting unit 110, transmitter 120, and a receiving unit 130.

Transmitting Unit 110

The transmitting unit 110 includes information unit generator 111, an information unit scrambler 112, a multiplexer 113, a lower layer scrambler 114, and, a sender 115. The information unit generator 111 generates a plurality of information units Iu, and outputs thereof. In Example 1, the information unit generator 111 outputs the information units Iu which are, for example, a text the user entered with a keyboard or the like, and an image taken into a computer, and others already stored in the computer. The information unit generator 111 may be an input screen portion of electronic mail software, and a server in a broadcasting station on the Internet, for example.

On the other hand, in Example 2, all information units Iu generated are previously stored in the information unit generator 111. A method for merely selectively outputting the information units Iu in accordance with a predetermined schedule is considered. The information unit generator 111 is a broadcasting station system containing a program management system in a sending system of digital broadcasting, a cart machine of a VTR, an MPEG-2 encoder, an EPG (Electronic Program Guide) management sending system of digital broadcasting, and the like. Additional information such as EPG must be sent out with the same contents thereof maintained for a long time. Therefore, the same contents, in some cases, are repeatedly outputted in a period on the order of seconds in the information unit generator 111.

The information unit scrambler 112 is connected to the information unit generator 111 for receiving the information unit Iu therefrom to encrypt the inputted information units Iu. Then the information unit scrambler 112 outputs the result of encryption as an encrypted information units Iue. An object to be encrypted once is a set having elements which are information units Iu or the results of the encryption. The encrypted information unit Iue shall be defined as follows.

Definition 1: The encrypted information unit Iue is also an information unit Iu.

Definition 2: A set of information units Iu or encrypted information units Iu is also an encrypted information unit Iue.

Definition 3: The result of encrypting an encrypted information unit Iue is also an encrypted information unit Iue.

The multiplexer 113 is connected to the information unit generator 111 and the information unit scrambler 112 for receiving the information unit Iu and the encrypted information unit, respectively, therefrom. Then, the multiplexer 113 multiplexes the information received from the information unit generator 111 and/or the information unit scrambler 112, and outputs the multiplexed result as a multiple information unit Im therefrom.

The multiplexer 113 is further connected to the output port thereof for receiving the multiple information Im produced thereby to multiplex again. Furthermore, the output port of the multiplexer 113 is also connected to the input port of the information unit scrambler 112, so that the information unit scrambler 112 can encrypt the multiple information unit Im to produce the encrypted information unit Iue.

Thus, the multiplexer 113 handles the encrypted information units Iue outputted by the information unit scrambler 112 as objects to be multiplexed, similarly to the information units Iu out putted by the information unit generator 1. The encrypted information units Iue handled at a time by the informnation unit scrambler 112 are handled upon being considered to be equal to one information unit Iu. The multiplexer 113 may add the information units Iu out putted from the information unit generator 111 to the encrypted information units Iue previously inputted from the information unit scrambler 112, and multiplex them.

Specifically, the multiplexer 113 receives the plurality of information units Iu outputted by the information unit generator 111. Then, the multiplexer 113 multiplexes the inputted information units Iu, and outputs the multiplexed information units Iue as multiple information Im. By the multiplexing, the plurality of information units Iu are converted into a format (multiple information lm) suitable for efficient transmission in the transmitter 120.

In Example 1, the multiplexer 113 is an MIME (Multipurpose Internet Mail Extensions) encoder used for sending multimedia information by an electronic mail on the Internet, for example. In this case, the multiplexer 113 respectively takes text information, image information, voice information, and so forth which are the plurality of information units Iu as parts. Then the multiplexer 113 converts the parts into a multipartite message conforming to MIME for collecting the plurality of parts, and outputs the message. The formal specification of the MIME is defined by RFC (Request for Comments) 1521/1522.

On the other hand, in Example 2, the multiplexer 113 is a service multiplexer for obtaining TS (Transport Stream) of an MPEG-2 systems from a plurality of stream data, for example. The MPEG-2 systems and the TS are standardized by ISO/IEC CD 13818-1. In this case, the multiplexer 113 divides each of the plurality of information units Iu outputted by the information unit generator 111 into packets called PES (Packetized Elementary Stream), and multiplexes the obtained packets on the basis of a predetermined rule.

The lower layer scrambler 114 is connected to the multiplexer 113 for receiving the multiple information Im therefrom to encrypt thereof. Then, the lower layer scrambler 114 outputs the encryption result as the encrypted multiple information Ime therefrom. Specifically, the lower layer scrambler 114 receives the multiple information Im outputted by the multiplexer 113, and encrypts the multiple information Im in accordance with a predetermined encryption algorithm. Then, the lower layer scrambler 114 outputs the encrypted result as encrypted multiple information Ime.

In Example 1, the lower layer scrambler 114 may be software PGP (Pretty Good Privacy) on which an RSA cipher which is a public key cipher, for example, mounted therein is started with an encryption option. An output of the lower layer scrambler 114 is a text of an electronic mail encrypted using the RSA cipher. The RSA cipher is described in detail in an article entitled by R. L. Rivest, A. Shamir, and L. Adleman which are contrivers themselves "A Method for Obtaining Digital Signatures and Public Key Cryptosystems" (Vol. 21, No. 2 issued on February, 1978 in Communications of the ACM). The PGP is described in detail in an article entitled by Simson Garfinkel "PGP: Pretty Good Privacy" (O'Reilly & Associates).

On the other hand, in Example 2, the lower layer scrambler 114 may be, for example, a scrambler of a transport layer. The lower layer scrambler 114 encrypts a payload portion of inputted TS of MPEG-2 using an encryption algorithm such as MULTI2, and outputs the encrypted TS of the MPEG-2 which is the result thereof.

The sender 115 is connected to the lower layer scrambler 114 for receiving the encrypted multiple information Ime therefrom to produce the transmission information It, and outputs produced transmission information It therefrom. Specifically, the sender 115 converts the encrypted multiple information Ime outputted from the lower layer scrambler 114 into the transmission information It which will be inputted to the transmitter 120.

In Example 1, the sender 115 is a program for adding a mail header composed of a destination field, a sender field, and so forth to the text of the electronic mail. An output of the sender 115 is the text of the electronic mail to which the mail header is added. On the other hand, in Example 2, the sender 115 is an error-correcting encoder and a modulator for the TS of the MPEG-2.

Transmitter 120

The transmitter 120 receives the transmission information It outputted by the sender 115, and transmits the transmission information It to a physically distant point. Both inputs and outputs of the transmitter 120 are the transmission information It. All the inputs of the transmitter 120 may not appear in the outputs to the receiving unit 130 without any error. In Example 1, the transmitter 120 is a plurality of mail communication daemons which are connected to each other by a channel such as the Internet for interpreting and executing an SMTP (Simple Mail Transfer Protocol) Examples of the typical mail communication daemon include "sendmail". The formal specification of the SMTP is defined by RFC 821, RFC 822, and RFC 974. The sendmail is described in detail in an article entitled by E. Allman ""SENDMAIL—An Internetwork Mail Router" Unix Programmer's manual" (CSRG U. C. Berkeley issued on July, 1983).

On the other hand, in Example 2, the transmitter 120 is constituted by an up-converter, a parabola antenna for sending data to a satellite, a communication satellite, and a ground receiving antenna.

Receiving Unit 130

The receiving unit 130 receives the transmission information It from the transmitter 120. Then, the receiving unit 130 variously processes the transmission It to reproduce the information unit Iu included therein, and finally presents the reproduction information Ir which is the contents of information unit Iu to a user. The receiving unit 130 includes receiver 131, a lower layer descrambler 132, demultiplexer 133, an information unit descrambler 134, reproducer 135, and presenter 136.

The receiver 131 is connected to the transmitter 120 for receiving the transmission information It therefrom, and produces the encrypted multiple information Ime. Specifically, the receiver 131 receives the transmission information It outputted by the transmitter 120, and takes out the whole or a part of thereof, then, the receiver 131 produces the encrypted multiple information Ime based on the transmission information It.

In Example 1, the receiver 131 is a front end program for mail transmission. On the other hand, in Example 2, the receiver 131 is the connection of a satellite broadcasting tuner, a demodulator and an error-correcting decoder.

The lower layer descrambler 132 is connected to the receiver 131 for receiving the encrypted multiple information Ime therefrom, and produces the multiple information Im. The lower layer descrambler 132 receives the encrypted multiple information Ime outputted by the receiver 131, and decrypts the encrypted multiple information Ime, and produces the multiple information Im. In Example 1, the lower layer descrambler 132 is a PGP program which is started with a decryption option. On the other hand, in Example 2, the lower layer descrambler 132 is a descrambler of the transport layer.

Note that, the encrypted multiple information Ime produced by the lower layer descrambler 132 is substantially the same in content as the encrypted multiple information Ime produced by the lower layer scrambler 114 of the transmitting unit 110, but can be different in the encrypting format or encrypting method. Of course, it is also possible to reproduce the completely same encrypted multiple information Ime as that produced by the lower layer scrambler 114.

The demultiplexer 133 is connected to the lower layer descrambler 132 for receiving the multiple information Im therefrom. The demultiplexer 133 separates the encrypted information unit Iue from the multiple information Im, and outputs the separated encrypted information unit Iue therefrom. When the information decrypted from the multiple information includes the information unit Iu which does not need the decryption, the demultiplexer 133 outputs the encrypted information unit Iue and the information unit Iu, separately.

Specifically, in Example 1, the demultiplexer 133 is an MIME decoder, and separates the text information, the image information, and so forth which are the respective parts included in the multipartite message as separate information, to take out the separate information. On the other hand, in Example 2, the demultiplexer 133 is a demultiplexer for the TS of the MPEG-2. The demultiplexer 133 separates a plurality of streams which are multiplexed by the MPEG-2 systems.

The information unit descrambler 134 is connected to the demultiplexer 133 for receiving only the encrypted information unit Iue therefrom. Then, the information unit descrambler 134 decrypts the received encrypted information unit Iue to produce the information unit Iu. However, when the encrypted information unit Iue is a multiple encrypted information unit such as those repeatedly encrypted by the information unit scrambler 112, or repeatedly multiplexed by the multiplexer 113, as described in the above.

In the former case that the encrypted information unit Im has been repeatedly encrypted by the scrambler 112, another encrypted information unit Iue still remains even after decryption by the information unit descrambler 134 itself. The infoation unit descrambler 134 outputs such remained encrypted information unit Iue and information unit Iu separately from discrete output ports, respectively. For decrypting such remained encrypted information unit Iue, the in formation unit descrambler 134 is further connected to one of output ports thereof for returning the remaining encrypted information unit Iue thereto. The information unit descrambler 134 repeats this feed back operation, until the remaining encrypted information unit Iue does not appear after decryption thereby.

In the latter case that the encrypted information unit Iue has been repeatedly multiplexed by the multiplexer 113, another multiple information unit Im still remains therein even after demultiplexing by the demultiplexer 133. Since such remaining multiple information unit is hierarchically multiplexed and encrypted, it is necessary first to decrypt the outer shell of remaining encrypted (repeatedly multiplexed) information unit Iue before decryption by the information unit descrambler 134 itself Therefore, such remaining multiplexed encrypted (repeatedly multiplexed) information Iue is returned to the demultiplexer 133. As a result, repeated demultiplexing by the demultiplexer 133 and/or decryption by descrambler 134 continues until no multiple information unit Im but decrypted information unit Iu remains after decryption. Then, the information unit descrambler 134 outputs only the information unit 1 therefrom.

Specifically, the information unit descrambler 134 receives the encrypted information unit Iue outputted by the information unit descrambler 134. Then, the information unit descrambler 134 outputs an encrypted information unit Iue or an information unit Iu which is the result of decrypting the encrypted information unit Iue outputted therefrom. The encrypted information unit Iue is obtained by subjecting the information unit Iu to encryption a plurality of times. Therefore, the encrypted information unit Iue must be decrypted a plurality of times in order to take out the information unit Iu.

The information unit descrambler 134 receives the output of the information unit descrambler 134 itself again, and repeatedly decrypts the input, thereby making it possible to decrypt the encrypted information unit Iue obtained by performing encryption a plurality of times. Even if the number of times of decryption which can be performed at a time by the information unit descrambler 134 is one, therefore, an information unit Iu can be finally taken out of the encrypted information unit Iue. The information unit descrambler 134 may be able to simultaneously perform a plurality of times of decryption. In this case, the information unit Iu can be taken out at higher speed.

The reproducer 135 is connected to the information unit descrambler 134 and to the other of input ports of the demultiplexer 133 for receiving the information unit Iu therefrom. Then, the reproducer 135 converts the inputted information unit Iu into reproduction information Ir which is reproducible information, and outputs the reproduction information Ir therefrom. In Example 1, the reproducer 135 may be a text file viewer, image file presenting software, etc. On the other hand, in Example 2, the reproducer 135 may be an MPEG-2 decoder for reproducing voices or images encoded by the MPEG-2, for example. In this case, the output is an NTSC (National Television System Standard Committee) signal or an analog voice signal.

The presenter 136 receives the reproduction information outputted by the reproducer 135, and presents an information unit Iu to a user. Specifically, the presenter 136 receives the reproduction information Ir outputted by the reproducer 135, and presents the information contained in the reproduction information Ir to a user. In Example 1, the presenter 136 may be a window system such as X-window or Microsoft Windows for presenting image and voice to a user. On the other hand, in Example 2, the presenter 136 may be a television receiver for inputting and receiving an NTSC signal and an analog voice signal, for example.

In Operation

Figure 4:
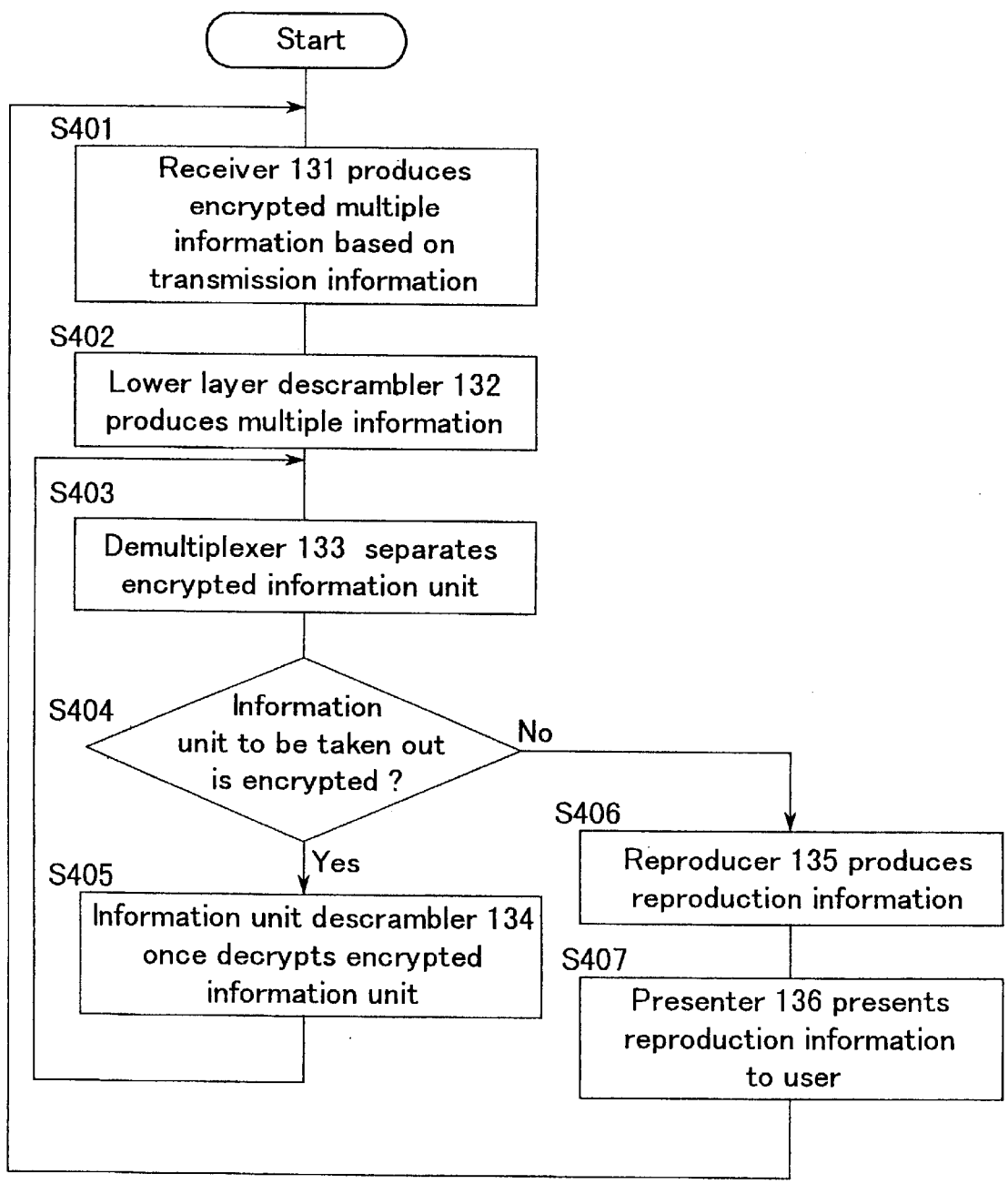
FIG. 4 is a flow chart showing operations performed by the receiving unit in the information transmission apparatus according of FIG. 1.

With reference to FIGS. 3 and 4, general operations performed by the information transmission apparatus 100 will be described next. In FIG. 3, the operations performed by the transmitting unit 110 and the transmitter 120 are shown.

At step S302, information unit scrambler 112 recursively encrypts the information units Iu generated at step S301, and produces the results thereof as encrypted information units Iue.

At step S303, the plurality of encrypted information units Iue produced by the encryption at step S302 are multiplexed, and outputs the result thereof as multiple information Im. The multiplexer 113 multiplexes the information units Iu generated at step S301, and outputs the result thereof as multiple information Im. The multiple information Im is multipartite data conforming to the MIME in the case of Example 1, while being data representing the TS of the MPEG-2 systems in the case of Example 2.

At step S304, the lower layer scrambler 114 encrypts the multiple information Im obtained by the multiplexing at step S303, and produces the encrypted multiple information Ime. In Example 1, the multiple information Im is encrypted using the RSA cipher or the like. On the other hand, in Example 2, the payload portion of the TS of the MPEG-2 is encrypted using a MULTI2 cipher manufactured by Hitachi Ltd. for example.

At step S305, the sender 115 converts the encrypted multiple information Ime obtained by the encryption at step S304 into a format which is suitable for transmission by the transmitter 120, and produces the transmission information It. In Example 1, information obtained by adding information, for example, "To:" field, "From:" to the head of the text of the mail which is encrypted multiple information Ime is outputted as the transmission information It. On the other hand, in Example 2, the information obtained by encoding the TS of the MPEG-2 using an error-correcting code and then, modulating the encoded TS is outputted.

At step S306, the transmitter 120 transmits the transmission information It to a physically distant point. A plurality of receiving units 130 may correspond to one transmitting portion. In Example 1, the mail communication daemons mounted on one or a plurality of computers connected are communicated to a computer network such as the Internet or a LAN (Local Area Network) on the basis of the SMTP. Thus, the mail is transmitted from the mail communication daemon on one of the computers to the mail communication daemon on the other computer.

On the other hand, in Example 2, transmission information It obtained by the conversion in the up-converter is transmitted to the communication satellite by the parabolic antenna. The communication satellite transmits the received transmission information It to the ground by a transponder. The transmission information It from the communication satellite is received by the ground receiving antenna.

In FIG. 4, the operations performed by the receiving unit 130 are shown. At step S401, the receiver 131 receives the transmission information It outputted from the transmitter 120, and takes out a part or the whole of encrypted multiple information Ime from the received transmission information It. In Example 1, processing for taking out one electronic mail data addressed to a specific user is performed. On the other hand, in Example 2, processing for filtering a particular packet storing information to be found by a PID (Packet ID) and selecting and extracting the packet is performed by tuning to a predetermined frequency.

At step S402, the lower layer descrambler 132 receives the encrypted multiple information Ime generated at step S401, and decrypts the received encrypted multiple information Ime. Then, the lower layer descrambler 132 outputs the decryption result as the multiple information Im. In Example 1, the lower layer descrambler 132 is the PGP program started with a decryption option. Decryption is performed using the RSA cipher by the PGP program, and the result of the decryption is outputted. On the other hand, in Example 2, the multiple information Im encrypted using the MULTI2 cipher is decrypted, to obtain multiple information Im.

At step S403, the demultiplexer 133 separates the encrypted information unit Iue from the multiple information unit Im obtained at step S402. In Example 1, the demultiplexer 133 separates for each part of the multipartite message obtained by multiplexing on the basis of the MIME. As a result, the text information, the image information, the voice information, and so forth which are the respective parts are separated as discrete information units Iu.

On the other hand, in Example 2, the demultiplexer 133 separates the plurality of streams multiplexed by the MPEG-2 systems on the basis of a PID (Packet ID, a packet identifier). As a result, additional information such as an MPEG-2 video stream, an MPEG-1 audio stream, and EPG are separated as discrete information units Iu. An MPEG-2 video is standardized by ITU-T H. 262, and an MPEG-1 audio is standardized as ISO/IEC 11172-3 Standard.

At step S404, it is judged whether the information after being demultiplexed by the demultiplexer 133 includes an encrypted information unit Iue or not. When it is judged YES, meaning that that information produced by the demultiplexer 133 at step S403 needs decryption to take out the content therefrom, the procedure advances to step S405.

At step S405, the information unit descrambler 134 decrypts once the encrypted information unit Iue outputted from the demultiplexer 133. Thereafter, the procedure returns to step S403. By repeatedly carrying out the operation at steps S403, S404, and S405, the information unit descrambler 134 can decrypt all the encrypted information unit Iue included in the multiple information Im, and finally take out all the information unit Iu sent from the transmitting unit 110.

On the other hand, when it is judged NO at step S404, meaning that that information after being demultiplexed by the demultiplexer 133 does not need decryption to take out the content therefrom. In other words, the information outputted from the demultiplexer 133 is the information unit Iu only. Then, the procedure advances to step S406.

At step S406, the reproducer 135 receives the information unit Iu outputted by the descrambler 134, and produces reproduction information Ir which is reproducible information. In Example 1, when the information unit Iu is text information, for example, fonts corresponding to respective character codes are selected and listed, to produce a bitmap format as the reproduction information Ir. When the information unit Iu is in an image information format such as JPEG (Joint Photographics Experts Group), it is expanded into the bitmap format, and the result of the expansion is outputted as reproduction information. The JPEG is standardized by ISO/IEC 10918. When the information unit Iu is voice information, it is converted into an analog voice signal by the same function as that of a digital-to-analogue (D/A) converter. And the analog voice signal is also outputted as reproduction information.

On the other hand, in Example 2, when the information unit Iu obtained at step S301 is the MPEG-2 video stream, the MPEG-2 video is decoded, and the NTSC signal is outputted as reproduction information. When the information unit Iu is a voice stream, it is converted into an analog voice signal by D/A conversion, and the analog voice signal is outputted.

At step S407, the presenter 136 receives the reproduction information Ir outputted from the reproducer 135, and then presents the contents of reproduction information Ir to a user in accordance with the format of the reproduction information. In Example 1, when the reproduction information obtained at step S406 is in the bitmap format, the presenter 136 arranges and presents the reproduction information Ir on a display screen. Thus, the reproduction information Ir is presented to the user. When the reproduction information obtained at step S406 is an analog voice signal, the analog voice signal is converted into sound by being sent to a speaker, and is visually presented to the user.

On the other hand, in Example 2, an NTSC signal as the reproduction information which is obtained at step S406 is received on a display, the analog voice information is sent to a speaker, and the reproduction information is presented to the user.

As described in the foregoing, in the first embodiment, it is possible to handle the information unit Iu which has been recursively encrypted a plurality of times. Therefore, it is possible to introduce a hierarchical structure into the encryption of the information unit Iu. The correspondence of the hierarchical structure to the structure of a program makes it possible to encrypt, in cases such as a case where a part of a set of information units Iu is selectively purchased, the information unit Iu only by performing one type of encryption a smaller number of times.

The information unit descrambler 134 repeatedly performs decryption in the receiving unit 130, to take out the information unit Iu. Therefore, the receiving unit can be constructed without requiring such a high-level or special descrambler as to correspond to a plurality of types of ciphers and perform a plurality of times of decryption processing at a time, thereby making it possible to realize simplification and cost reduction.

Encoding Information Units Into Encrypted Multiple Information Unit

With reference to FIG. 2, the encrypted multiple information unit Ime produced by the information transmission apparatus 100 is described. Various processing levels of information units are expressed with different suffixes for the sake of better recognition thereof. For example, the output from the lower layer scrambler 114, represented by a rectangle of a dot line, is the encrypted multiple information Ime0$a$.

The four outputs from the information unit generator 111, indicated by circles, are the information units Iu1$a$, Iu2$a$, Iu3$a$, and Iu4$a$, respectively. These information units Iu1$a$, Iu2$a$, Iu3$a$, and Iu4$a$ represent, for example, a tourist resort guide considering the weather forecast, a weather forecast for the tourist resort, a weather forecast for the entire country, and a weather forecast for a local area, respectively.

The rectangles Iue1$a$, Iue12$a$, and Iue4$a$ each indicated by a solid line represent the units of encrypted information produced inside the transmitting unit 110 of the information transmission apparatus 100 at respective encryption stages. Specifically, the rectangle Iue1$a$ represents a first encrypted information unit Iue which is produced, such that the information unit scrambler 112 encrypts the information unit Iu1$a$ outputted from the information unit generator 111 with a first predetermined cipher C1 under a first predetermined encryption system CS1 at step S302. Thus, the first encrypted information unit Iue1$a$ is produced.

The rectangle Iue12$a$ represents also a second encrypted information unit Iue which is produced at the following two steps. At step S303, the multiplexer 113 multiplexes the first encrypted information unit Iue1$a$ received from the information unit scrambler 112 and the information unit Iu2$a$, and produces a multiple information unit Im12$a$ (not shown). At step S302, the information unit scrambler 112 encrypts the multiple information unit Im12$a$ received from the multiplexer 113 with a second predetermined cipher C2 under a second predetermined encryption system CS2 at step S302. Thus, the second encrypted information unit Iue12$a$ wherein the information unit Iu1$a$ is encrypted twice is produced.

The rectangle Iue4$a$ represents a third encrypted information unit Iue which is produced, such that the information unit scrambler 112 encrypts the information unit Iu4$a$ outputted from the information unit generator 111 with a third predetermined cipher C3 under a third encryption system CS3 at step S302. Thus, the third encrypted information Iue4$a$ is produced.

The rectangle Ime0$a$ represents an encrypted multiple information Ime which is produced as follows. First, the multiplexer 113 multiplexes the second encrypted information unit Iue12$a$, the information unit 3$a$, and third encrypted information unit Iue4$a$, and produces a multiple information unit Im1234$a$ (not shown) at step S303. Second, the lower layer scrambler 114 encrypts the multiple information unit Im1234 with a fourth predetermined cipher C4 under a fourth predetermined encryption system CS4 at step S304.

As a result, the first information unit Iu1$a$ is encrypted thrice with the first, second, and fourth predetermined ciphers C1, C2, and C4. The second information unit Iu2$a$ is encrypted twice with the second and fourth predetermined ciphers C2, and C4. The third information unit Iu3$a$ is encrypted once with the fourth predetermined cipher C4. The fourth information unit Iu4$a$ is encrypted twice with the third and fourth predetermined ciphers C3 and C4.

Thus, there is a hierarchical order among these information unit Iu1$a$, Iu2$a$, Iu3$a$, and Iu4$a$ representing different contents of weather forecast program. Specifically, the encrypted multiple information Ime0$a$ is a set of information having meanings for a user. The set is one electronic mail or one information program, for example. The encrypted multiple information unit Ime0$a$ recursively includes a portion (Iu3$a$) which is not encrypted and a portion (Iue12$a$ and Iue4$a$) which is encrypted therein.

Note that each of all ciphers C1, C2, C3, and C4 can be assigned with the same value or any optional value according to the suitable resistance of cipher necessary to protect the information unit against unfair access thereto. Similarly, each of all encryption system CS1, CS2, CS3, and CS4 can be selected from the identical encryption system or various different encryption system such as examples referred in the above.

Considered as an example in which non-encrypted portion (Iu3$a$) and encrypted portion (Iue12$a$ and Iue4$a$) are included in one encrypted multiple information unit (Ime0$a$). The whole of an encrypted multiple information unit Ime0$a$ is a weather forecast program, the non-encrypted portion (Iu3$a$) is a free weather forecast for the entire country, the encrypted portion (Iue12$a$ and Iue4$a$) is a charged detailed forecast for the local areas. Furthermore, a preview of a film and the encrypted film, an article for introducing software, an execute form of encrypted software, and so forth are also considered.

In this case, the user can view the weather forecast for the entire country (Iu3a) by decrypting the encrypted multiple information unit Ime0a, the weather forecast for the tourist resort (Iu2a) by decrypting the encrypted information unit Iue2a, the tourist resort guide considering the weather forecast (Iu1a) by decrypting the encrypted information unit Iue1a, and the weather forecast for a local area (Iu4a) by decrypting the encrypted information unit Iue4a, respectively.

Thus, the information unit encrypted plural times with discrete ciphers has the same resistance against an unfair decryption as in the case that it is decrypted with a single cipher having a resistance corresponding to those plural discrete ciphers. Furthermore, plural information units, such as information units Iue1a and Iu2a according to definition 2 are encrypted at the same time in the same encryption level, enabling to reducing a burden to starting the decrypting operation.

Decoding Encrypted Multiple Information Unit Into Information Unit

The encrypted information encrypted with ciphers in hierarchically arranged by the transmitting unit 110 can be decrypted by repeatedly using a single descrambler with a simply constructed apparatus, which will be specifically described below. The encrypted multiple information unit Ime0a is supplied to the receiving unit 130 through the transmitter 120 in the format of transmission information It.

The receiver 131 of the receiving unit 130 takes out a part or the whole of encrypted multiple information Ime0a from the received transmission information It at step S401. At step S402, the lower layer descrambler 132 decrypts the received encrypted multiple information Ime0a with the fourth predetermined cipher C4 to obtain the multiple information unit Im1234a (not shown) constructed by the second encrypted information unit Iue12a, the third information unit Iu3a, and the third encrypted information unit Iue4a. Note that the thus obtained multiple information unit Im1234a can be produced in a format different from that of the multiple information unit Im1234a produced by the multiplexer 113 at Step S303.

The demultiplexer 133 demultiplexes the multiple information unit Im1234a produced at step S402, and separates each of encrypted information unit Iue and/or information unit Iu therefrom at step S403. Thus, the second encrypted information unit Iue12a, the third information unit Iu3a, and the third encrypted information unit Iue4a are produced at step S403. Note that thus obtained information units Iue12a, Iu3a, and Iue4a can be produced in the formats different from those produced by the information unit scrambler 112 of the transmitting unit 110. Needless to say that those information units Iue12a, Iu3a, and Iue4a can be in the same formats as those produced by the information unit scrambler 112 of the transmitting unit 110, resulting in the reproduction of those information units Iue12a, Iu3a, and Iue4a.

The second encrypted information unit Iue12a is sent to the information unit descrambler 134 where the multiple information unit Im12a (not shown) is produced by decrypting the encrypted information unit Iue12a with the second predetermined cipher C2 at step S405. Thus, the produced multiple information unit Im12a is sent back to the demultiplexer 133 where the first encrypted information unit Iue1a and the second information unit Iu2a are produced by demultiplexing the multiple information unit Im12a at step S403.

At step S404, the first encrypted information unit Iue1a is sent to the information unit descrambler 134, where the first information unit Iu1a is produced by decrypting the encrypted information unit Iue1a with the first predetermined cipher C1. Similarly, the third encrypted information unit Iue4a is sent to the information unit descrambler 134, where the fourth information unit Iu4a is produced.

Each of information units Iu1a produced at step S405, Iu2a produced at step S403, Iu3a produced at step S403, and Iu4a produced at step S405 are sent to the reproducer 135, where the reproduction information Ir are produced from those information units Iu1a, Iu2a, Iu3a, and Iu4a at step S406. Note that all information units Iu1a, Iu2a, Iu3a, and Iu4a can be produced in the substantially same in content as those produced by the information unit generator 111, but can be different in the encrypting format or encrypting method. Of course, it is also possible to reproduce the completely same information units as those Iu1a, Iu2a, Iu3a, and Iu4a produced by the information unit generator 111.

Second Embodiment

With reference to FIGS. 5 to 8, an information transmission apparatus according to a second embodiment of the present invention is described next. The information transmission apparatus 500 includes a transmitting unit 510, transmitter 120, and a receiving unit 530. The transmitter 120 is the same as that used in the information transmission apparatus 100. In the following description, any of the substantially same components constructing the information transmission apparatus 100 are generally omitted for reducing the redundancy.

Note that the encrypted multiple information Ime produced by a descrambler 532 is substantially the same in content as the encrypted multiple information Ime produced by the lower layer scrambler 114 of the transmitting unit 110, but can be different in the encrypting format or encryption method. Of course, it is also possible to reproduce the completely same encrypted multiple information Ime as that produced by the lower layer scrambler 114.

Transmitting Unit 510

The transmitting unit 510 has a construction very similar to that of the transmitting unit 110 shown in FIG. 1, such that the information unit scrambler 112 is replaced by an information unit scrambler 512. Compared with the information unit scrambler 112, the information unit scrambler 512 should be able to encrypt the information unit Iu conforming to a lower layer transmission performed by a transmitter 120. In other words, the information unit scrambler 512 only has to encrypt under a certain encryption system used by a lower layer such as being performed by the transmitter 120. Needless to say, the information unit scrambler 512 may be able to encrypt under various encryption systems including one suitable for the above mentioned lower layer transmission.

Specifically, as the cipher used in the information unit scrambler 512, a cipher which can be decoded by sharing a device having high tamper resistance used for decryption performed in the scrambler 514 may be selected. The device having high tamper resistance is a device which is subjected to such measures that stored contents are erased if they are unfairly decomposed, and information relating to secrecy is not let out from an LSI (Large Scale Integrated Circuit) where it is difficult to analyze without special facilities. For example, an IC card used for a receiver for CS digital broadcasting is a device having high tamper resistance.

Receiving Unit 530

The receiving unit 530 has a construction similar to that of the receiving unit 130 shown in FIG. 1, such that the lower layer descrambler 132 and the information unit descrambler 134 are replaced by a descrambler 532 and a demultiplexer 533. The descrambler 532 is connected to the receiver 131 for receiving the encrypted multiple information unit Ime therefrom. Then, the descrambler 532 decrypts the received multiple information unit Ime once, and produces the multiple information Im. Note that the descrambler 532 can decrypt any encrypted multiple information unit which is encrypted under various encryption systems including a certain encryption system adopted by the lower layer scrambler 114 in the transmitting unit 110.

The demultiplexer 533 is connected to the descrambler 532 for receiving the multiple information Im therefrom, and demultiplexes the received multiple information Im to produce the information unit Iu. However, when the multiple information Im produced by the descrambler 532 includes the repeatedly multiplexed information unit therein, the encrypted information unit Iue remains after demultiplexing.

The descrambler 532 is further connected to the demultiplexer 533 for receiving the remaining encrypted unit Iue therefrom. Then, the descrambler 532 decrypts the encrypted information unit Iue, and produces the multiple information unit Im, which will be supplied to the demultiplexer 533. When the encrypted information unit Iue received from the demultiplexer 533 is simply encrypted but not multiplexed, produced therefrom is an information unit Iu which will be directly supplied to the reproducer 135. Thus, the demultiplexer 533 is not required to be able to demultiplex the repeatedly mutiplexed information unit Im, but only required to be able to demultiplex an information unit Im which is multiplexed once.

Thus, the construction in the second embodiment is obtained by removing such a restriction that recursive encryption is performed a plurality of times by the information unit scrambler 112 from the construction in the first embodiment. The lower layer descrambler 132 and the information unit descrambler 134 which perform decryption in the first embodiment are integrated into the descrambler 532 this embodiment. The integration can be also considered to be the realization of the function of the information unit descrambler 134 by the function of the lower layer descrambler 132.

In Operation

Figure 7:
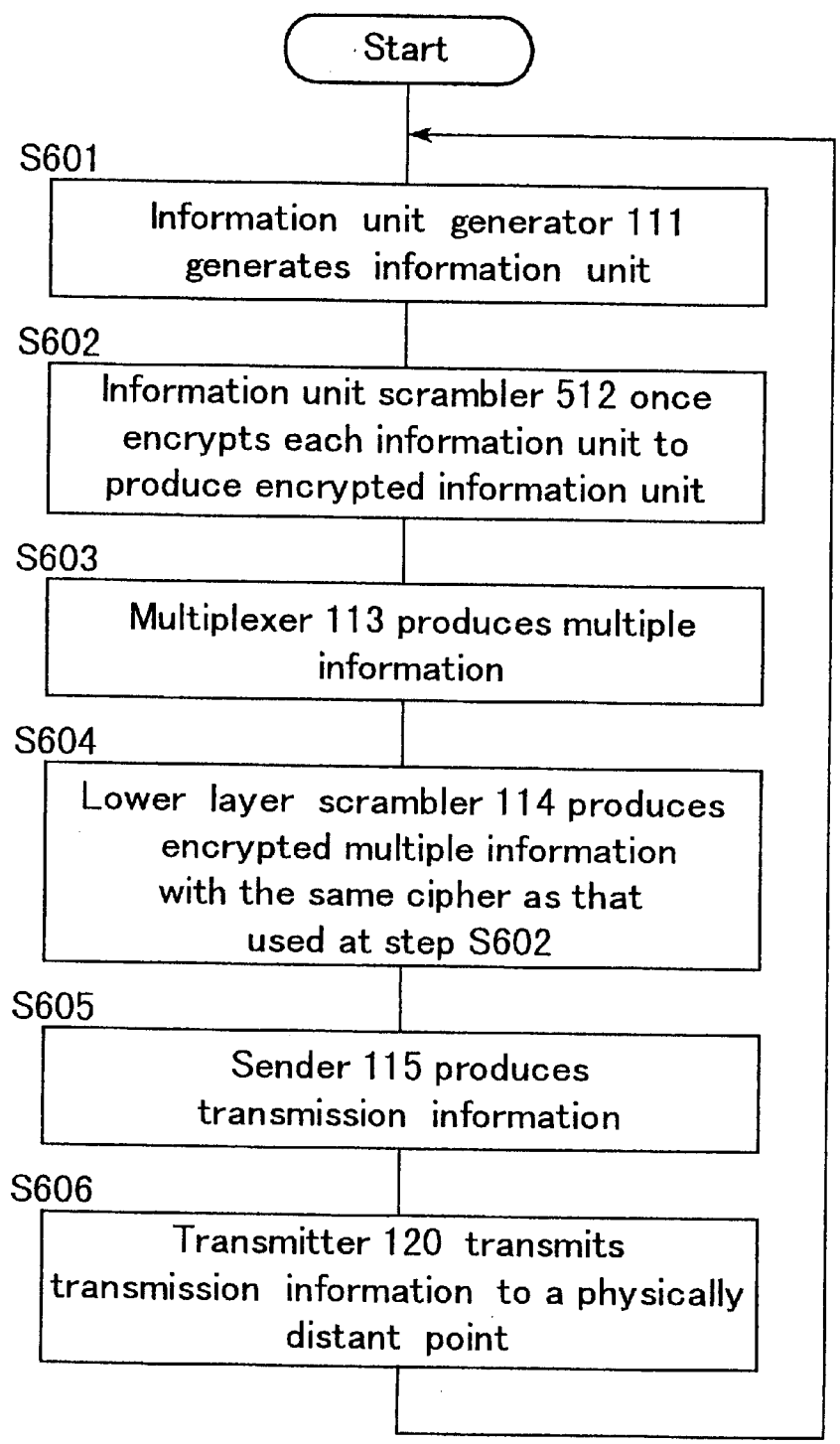
FIG. 7 is a flow chart showing operations performed by the transmitting unit and transmitter in the information transmission apparatus of FIG. 5.
Figure 8:
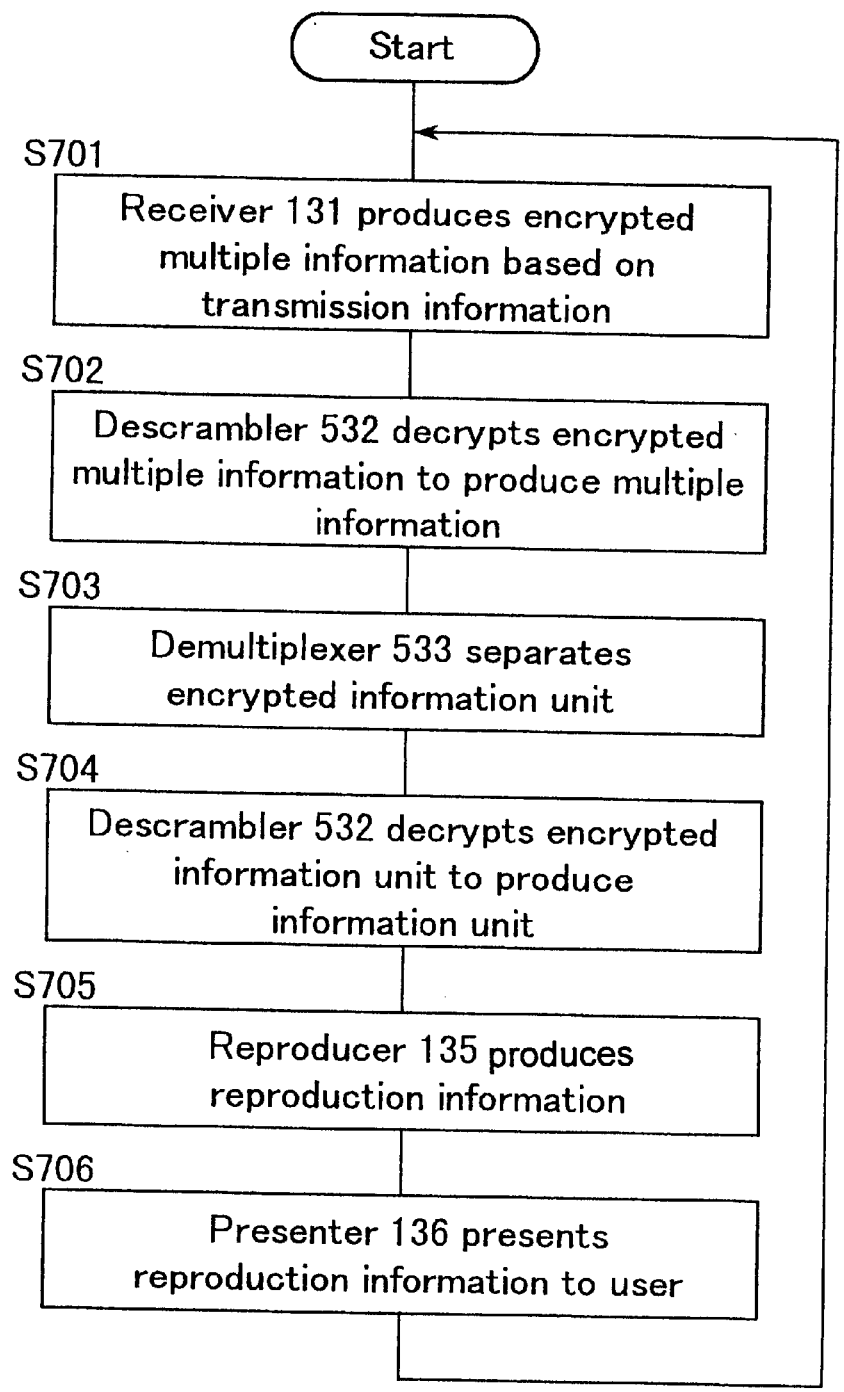
FIG. 8 is a flow chart showing operations performed by a receiving unit in the information transmission apparatus of FIG. 5.

With reference to FIGS. 7 and 8, general operations performed by the information transmission apparatus 500 will be described next. The operations performed by the transmitting unit 510 and the transmitter 120 shown in FIG. 7 are very similar to those that are already described with reference to FIG. 3. Therefore, the operations are briefly described to clarify the distinction between them.

At step S601, the information unit generator 111 generates a plurality of information units Iu, and outputs the generated information units Iu therefrom.

At step S602, the information unit scrambler 512 encrypts the information units Iu generated at step S601 once, and outputs the results thereof as encrypted information units Iue. Specifically, the information unit scrambler 512 encrypts the information unit Iu conforming to a lower layer transmission performed by a transmitter 120. Specifically, a cipher used herein is of the same type as that of a cipher used in the lower layer scrambler 114. The "same" means that when the lower layer scrambler 114 uses an RSA cipher, for example, the information unit scrambler also performs encryption using the RSA cipher. Processing for recursively encrypting the information unit Iu a plurality of times is performed at step S302 in the first embodiment, while such a restriction that the information unit Iu is encrypted a plurality of times is not placed at this step.

At step S603, the multiplexer 113 multiplexes the plurality of encrypted information units Iue produced by the encryption at step S602, and outputs the result thereof as multiple information Im therefrom.

At step S604, the lower layer scrambler 114 encrypts the multiple information m obtained by the multiplexing at step S603 with the same cipher used at step S602. A cipher used in the lower layer scrambler 114 is the same as the cipher used in the information unit scrambler 112, as in the description of the information unit scrambler 512.

At step S605, the sender 115 converts the encrypted multiple information Ime obtained by the encryption at step S604 into a format which is suitable for transmission by the transmitter 120, and produces the transmission information It.

At step S606, the transmitter 120 transmits the transmission information It to a physically distant point.

In FIG. 8, the operations performed by the receiving unit 530 are similar to those that are already described with reference to FIG. 4. Therefore, the operations are briefly described to clarify the distinction between them. At step S701, the receiver 131 receives the transmission information It outputted from the transmitter 120, and takes out a part or the whole of encrypted multiple information Ime from the received transmission information It.

At step S702, the descrambler 532 receives the encrypted multiple information Ime generated at step S701, and decrypts the received encrypted multiple information Ime. Then, the descrambler 532 outputs the decryption result as the multiple information Im.

At step S703, the demultiplexer 533 separates the encrypted information unit Iue from the multiple information unit Im obtained at step S702. The demultiplexer 533 demultiplexes the repeatedly mutiplexed information unit Im, but demultiplexes an information unit Im which is multiplexed once.

At step S704, the descrambler 532 decrypts the encrypted multiple information unit Ime from the receiver 131 and/or the encrypted information unit Iue from the demultiplexer 533. From the encrypted information unit Ime or encrypted information unit Iue which is encrypted once, produced is the information unit Iu which will be directly supplied to the reproducer 135. From the encrypted information unit Ime or encrypted information unit Iue which is encrypted and multiplexed, produced is the multiple information unit Im which is supplied to the demultiplexer 533.

Specifically, when the information unit Iu is encrypted once, the encrypted information unit Iue is decrypted once, thereby making it possible to generate an information unit Iu. Although there is such a restriction that the information unit Iu is recursively encrypted a plurality of times in the first embodiment, the restriction is not placed in the second invention.

At step S705, the reproducer 135 receives the information unit Iu outputted from the descrambler 532 and the demultiplexer 533, and produces reproduction information Ir which is reproducible information.

At step S706, the presenter 136 receives the reproduction information Ir outputted from the reproducer 135.

As described in the foregoing, the encryption performed by the information unit scrambler 512 is the same as the encryption performed by the lower layer scrambler 114. Thus, it possible for the single descrambler 532 to decode a cipher used in not only the lower layer scrambler 114 but also the information unit scrambler 512. That is, it is possible to decrypt the information unit Iu by preparing only one descrambler which is not special.

Encoding Information Units Into Encrypted Multiple Information Unit

Figure 6:
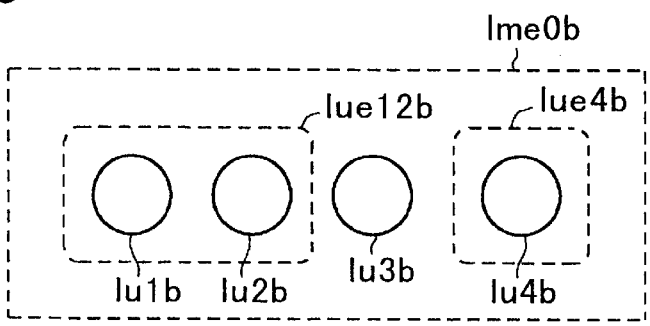
FIG. 6 is a graph in assistance of explaining an encrypted multiple information unit produced by the information transmission apparatus of FIG. 5.

With reference to FIG. 6 similar to FIG. 2, the encrypted multiple information unit Ime produced by the information transmission apparatus 500 is described. The output from the lower layer scrambler 114, represented by a rectangle of a dot line, is the encrypted multiple information Ime0b.

The four outputs from the information unit generator 111, indicated by circles, are the information units Iu1b, Iu2b, Iu3b, and Iu4b, respectively. These information units Iu1b, Iu2b, Iu3b and Iu4b represent, for example, a tourist resort guide considering the weather forecast, a weather forecast for the tourist resort, a weather forecast for the entire country, and a weather forecast for a local area, respectively.

The rectangles Iue12b, and Iue4b each indicated by a dot line represent the units of encrypted information produced inside the transmitting unit 510 respective encryption stages. The rectangle Iue12b is produced, such that the multiplexer 113 multiplexes the information units Iu1b and Iu2b received from the information unit generator 111, and produces a multiple information unit Im12b (not shown) at step S603. Then, the information unit scrambler 512 once encrypts the multiple information unit Im12b received from the multiplexer 113 with a fifth predetermined cipher C5 under a fifth predetermined encryption system CS5, and then produces the encrypted information unit Iue12b at step S602.

The rectangle Iue4b represents also an encrypted information unit Iue which is produced, such that the information unit scrambler 512 encrypts the information unit Iu4b with a sixth predetermined cipher C6 under a sixth predetermined encryption system CS6 at step S602.

The encrypted multiple information unit Ime0b is produced, such that the multiplexer 113 multiplexes the encrypted information unit Iue12b, the information unit Iu3b, and the encrypted information unit Iue4b, and then produces a multiple information unit Im1234b (not shown) at step S603. Then, the lower layer scrambler 114 encrypts the multiple information unit Im1234b with a seventh predetermined cipher C7 under a seventh predetermined encryption system CS7 at step S604.

As a result, the information units Iu1band Iu2b are both encrypted twice with the fifth, and seventh predetermined ciphers C5 and C7. The information unit Iu3a is encrypted once with the seventh predetermined ciphers C7. The information unit Iu4b is encrypted twice with the sixth and seventh predetermined ciphers C6 and C7.

Thus, there is a hierarchical order among these information unit Iu1b, Iu2b, Iu3b, and Iu4b representing different contents of weather forecast program. The hierarchical order according to this embodiment is different from that in the first embodiment, specifically shown in FIG. 2.

Note that each of all ciphers C5, C6, and C7 can be assigned with the same value or any optional value according to the suitable resistance of cipher necessary to protect the information unit against unfair access thereto. Similarly, each of all encryption system CS5, CS6, and CS7 can be selected from the identical encryption system or various different encryption system such as examples referred in the above. Furthermore, all ciphers and encryption system can be selected from those selected in the first embodiment.

Decoding Encrypted Multiple Information Unit Into Information Unit

The encrypted information encrypted with ciphers in hierarchically arranged by the transmitting unit 510 can be decrypted by repeatedly using a single of descrambler with a simply constructed apparatus, which will be specifically described below. The encrypted multiple information unit Ime0b is supplied to the receiving unit 530 through the transmitter 120 in the format of transmission information It.

The receiver 131 of the receiving unit 530 takes out a part or the whole of encrypted multiple information Ime0b from the received transmission information It. at step S701. At step S702, the descrambler 532 decrypts the received encrypted multiple information Ime0b with the seventh predetermined cipher C7 to obtain the multiple information unit Im1234b (not shown) constructed by the encrypted information unit Iue12b, the information unit Iu3b, and the encrypted information unit Iue4b. Note that the thus obtained multiple information unit Im1234b can be produced in a format different from that of the multiple information unit Im1234b produced by the multiplexer 113 at Step S603.

The demultiplexer 533 demultiplexes the multiple information unit Im1234b produced at step S603, and separates each of encrypted information unit Iue and information unit Iu therefrom at step S703. Thus, the encrypted information unit Iue12b, the information unit Iu3b, and the encrypted information unit Iue4b are produced at step S703. Note that the thus obtained information units Iue12b, Iu3b, and Iue4b can be produced in the formats different from those produced by the information unit scrambler 512 of the transmitting unit 510. Needless to say that those information units Iue12b, Iu3b, and Iue4b can be in the same formats as those produced by the information unit scrambler 512 of the transmitting unit 510, resulting in the reproduction of those information units Iue12b, Iu3b, and Iue4b.

The encrypted information unit Iue12b is sent to the descrambler 532 where the multiple information unit Im12b (not shown) is produced by decrypting the encrypted information unit Iue12b with the fifth predetermined cipher C5 at step S704. Thus, the produced multiple information unit Im12b is sent back to the demultiplexer 533 where the information units Iu1b and Iu2b are produced by demultiplexing the multiple information unit Im12b at step S703. Similarly, the encrypted information unit Iue4b is sent to the descrambler 532, where the information unit Iu4b is produced at step S704.

Figure 5:
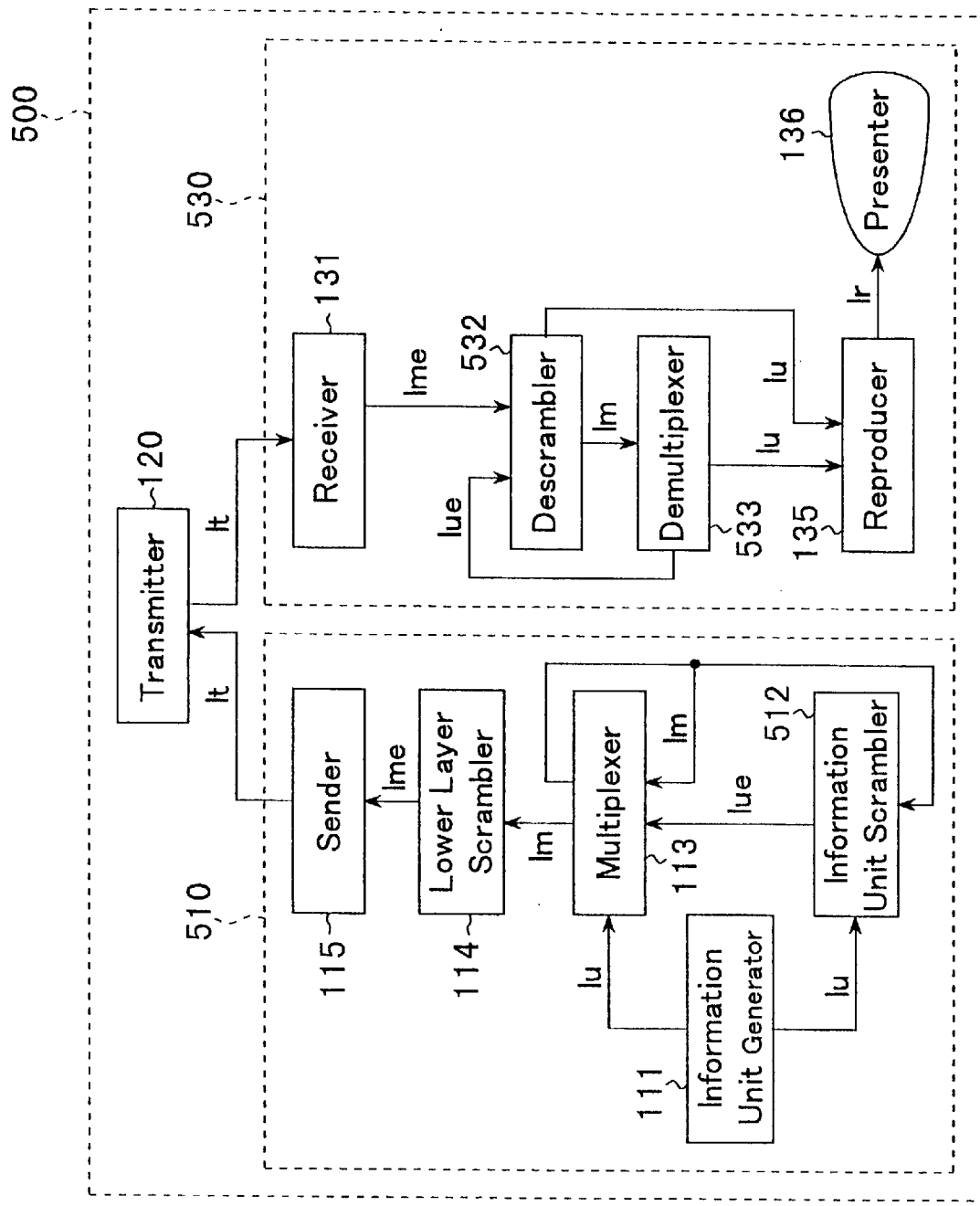
FIG. 5 is a block diagram showing an information transmission apparatus according to a second embodiment of the present invention.
Figure 9:
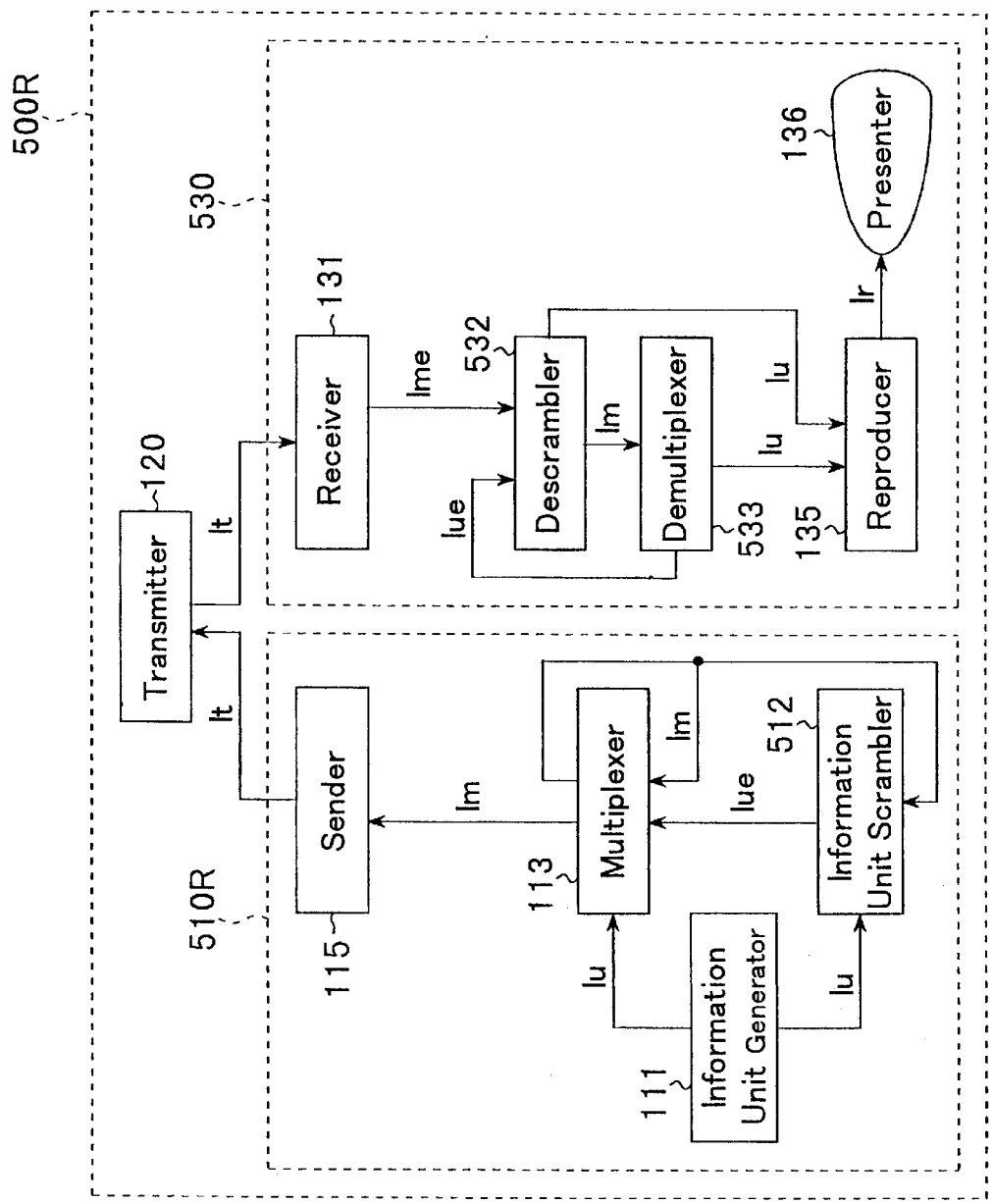
FIG. 9 is a block diagram showing an alternative of the information transmission apparatus of FIG. 5.

With reference to FIG. 9, an alternative of the information transmission apparatus 500 of FIG. 5 is shown. The information transmission apparatus 500R shown in FIG. 9 has a construction where the lower layer scrambler 114 is removed from the information transmission apparatus 500. In this apparatus, the encryption for a lower layer transmission is performed not by the lower layer scrambler 114 (FIG. 5) but by the information unit scrambler 512 (FIG. 9). Therefore the information unit scrambler 512 only has to encrypt under a certain encryption system used by a lower layer such as being performed by the transmitter 120. Needless to say, the information unit scrambler 512 may be able to encrypt under various encryption systems including one suitable for the above mentioned lower layer transmission.

Third Embodiment

Figure 11:
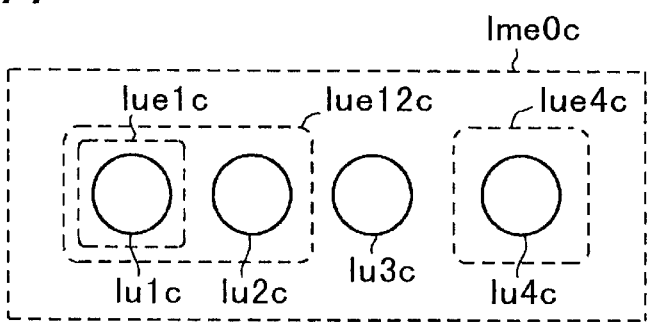
FIG. 11 is a graph in assistance of explaining an encrypted multiple information unit produced by the information transmission apparatus of FIG. 10.
Figure 26:
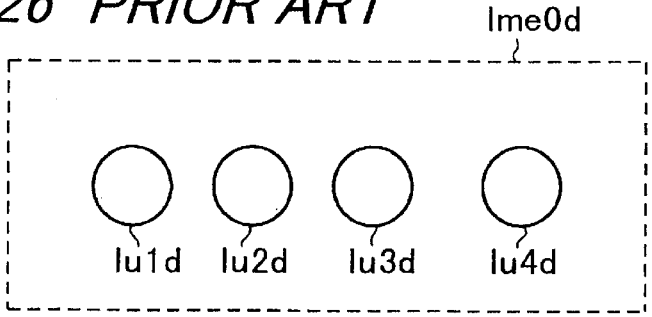
FIG. 26 is a graph in assistance of an encrypted multiple information unit produced by the information transmission apparatus of FIG. 25.
Figure 10:
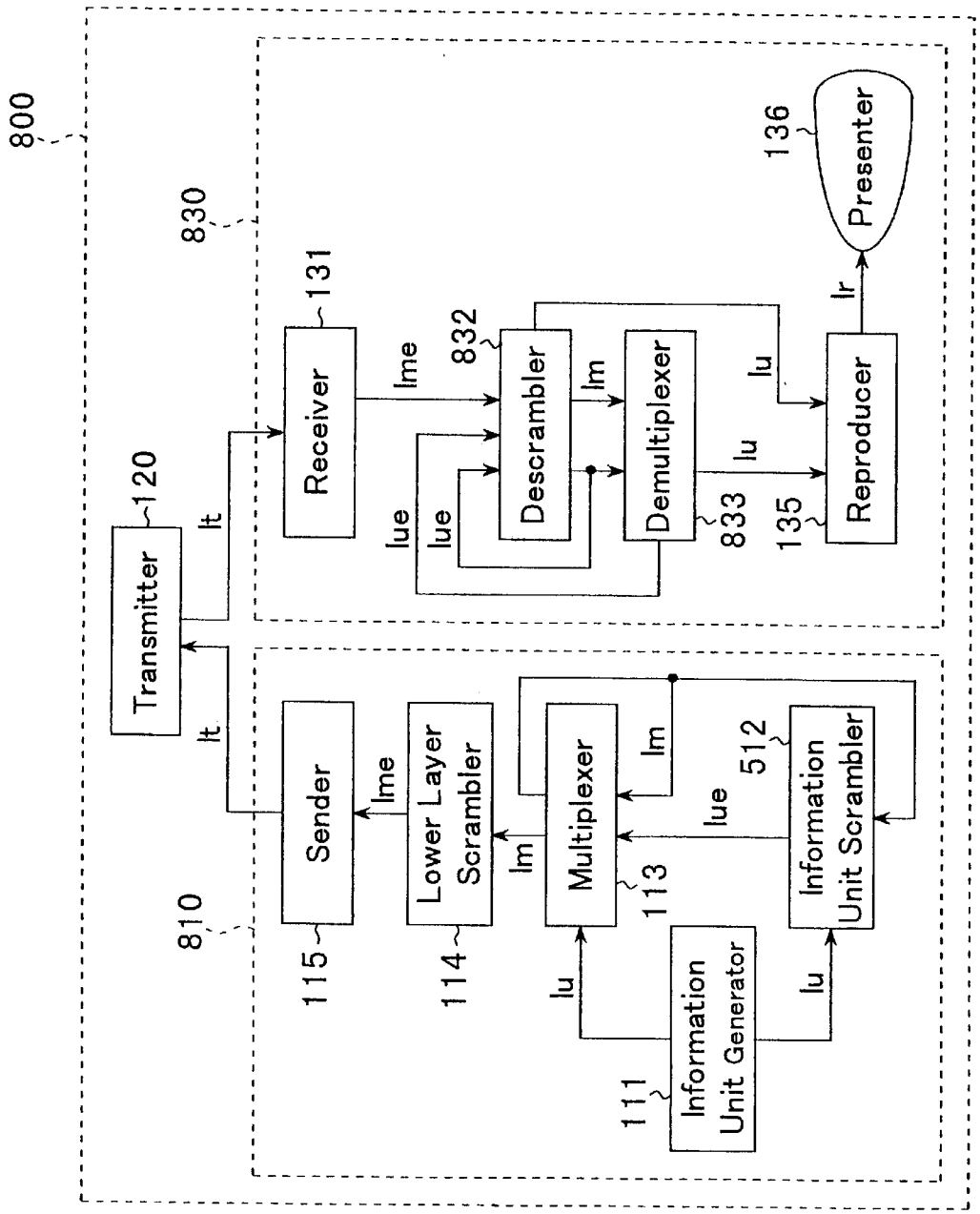
FIG. 10 is a block diagram showing an information transmission apparatus according to a third embodiment of the present invention.
Figure 12:
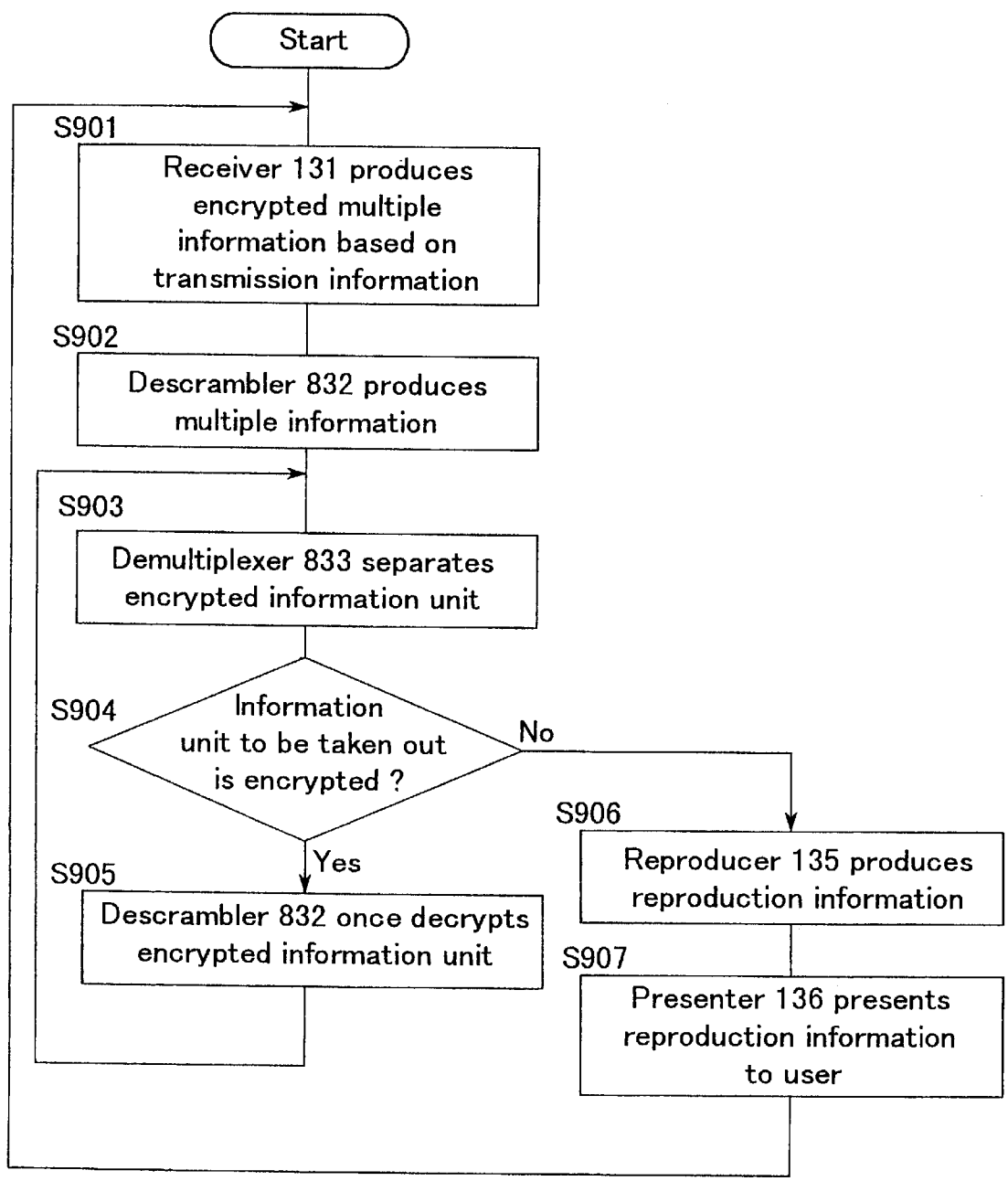
FIG. 12 is a flow chart showing operations performed by a receiving unit in the information transmission apparatus of FIG. 10.

With reference to FIGS. 10, 11, and 12, an information transmission apparatus according to a third embodiment of the present invention is described. In this embodiment, the information transmission apparatus 800 includes a transmitting unit 810, transmitter 120, and a receiving unit 830. Next, descriptions of any of substantially the same components constructing the information transmission apparatuses 100, 500, or 500R are generally omitted for reducing the redundancy.

Note that, the encrypted multiple information Ime produced by the descrambler 832 is substantially the same in content as the encrypted multiple information Ime produced by the lower layer scrambler 114 of the transmitting unit 810, but can be different in the encrypting format or encryption method. Of course, it is also possible to reproduce the completely same encrypted multiple information Ime as that produced by the lower layer scrambler 114.

Transmitting Unit 810

The transmitting unit 810 has a construction substantially the same as that of the transmitting unit 510 already described with reference to FIG. 5. However, the operation of the transmitting unit 810 for producing the encrypted multiple information Ime is different from that of the transmitting unit 510, which will be described later with reference to FIG. 11 and FIG. 12.

Receiving Unit 830

The receiving unit 830 has a construction similar to that of the receiving unit 530 shown in FIG. 5, such that the descrambler 532 and the demultiplexer 533 are replaced by a descrambler 832 and a demultiplexer 833. The descrambler 832 is connected to the receiver 131 for receiving the encrypted multiple information unit Ime therefrom. Then, the descrambler 832 decrypts the encrypted multiple information Ime once, and produces the multiple information unit Im. Note that the descrambler 832 can decrypt hierarchically and repeatedly encrypted multiple information unit. The descrambler 832 encrypts an information unit which is encrypted n (n is an integer) times and produced n-1 times encrypted information unit. Therefore, according to encryption times of the encrypted multiple information unit Ime inputted from the receiver 131, the descrambler 832 repeatedly decrypts the unit Ime until obtaining no more encrypted multiple information unit Ime.

The demultiplexer 833 is connected to the descrambler 832 for receiving the multiple information Im therefrom, and demultiplexes the received multiple information Im to produce the information unit Iu. However, when the multiple information Im produced by the descrambler 832 includes the encrypted information unit Iue therein, the encrypted information unit Iue is sent back to the descrambler 832.

In Operation

With reference to FIG. 12, general operations performed by the receiving unit 830 of the information transmission apparatus 800 will be described next. As described in the above, the transmitting unit 810 is substantially the same as the transmitting unit 510 in construction, therefore the generation operation is also substantially the same as those described with reference to FIG. 7.

At step S901, the receiver 131 receives the transmission information It from the transmitter 120, and takes out a part or the whole of encrypted multiple information Ime from the inputted transmission information It.

At step S902, the descrambler 832 receives the encrypted multiple information Ime produced at step S901. Then, the descrambler 832 decrypts the inputted encrypted multiple information Ime, and outputs the decryption results as the multiple information Im.

At step S903, the demultiplexer 833 separates the multiple information Im produced at step S902 for each encrypted information unit Iue, and takes out the encrypted information unit Iue and/or the information unit Iu.

At step S904, it is judged whether an information unit Iu outputted from the descrambler 832 or the demultiplexer 833 is encrypted or not. When it is judged "YES", meaning that the information unit Iu is encrypted, the information unit Iu (Iue) from the descrambler 832 or demultiplexer 833 is sent back to the descrambler 832. Then, the procedure advances to step S905.

However, when it is judged "NO", meaning that the information unit Iu outputted from the descrambler 832 or the demultiplexer 833 is no longer encrypted. The information unit Iu from the descrambler 832 or demultiplexer 833 is sent to the reproducer 135. Then, the procedure advances to step S906.

At step S905, the descrambler 832 once decrypts the encrypted information unit Iue, and outputs the decryption result therefrom. Then the procedure returns to step S903. By repeatedly carrying out steps S903, S904, and S905, the descrambler 832 can decrypt the information unit Iu to be finally taken out, and take out the information unit Iu in a format which is not encrypted.

At step S906, the reproducer 135 receives the information unit Iu outputted by the descrambler 832 and/or the demultiplexer 833, and produces the reproduction information Ir.

At step S907, the presenter 136 presents the contents of reproduction information Ir obtained at step S906 to a user in accordance with the format of the reproduction information. Then, the procedure advances to step S903.

As described in the foregoing, the recursive encryption is performed a plurality of times in the information unit scrambler 512. The same cipher system as that used in the information unit scrambler 512 is used in the lower layer scrambler 114. Thus, it possible for the descrambler 832 to perform decryption corresponding to all the plurality of times of encryption.

Encoding Information Units Into Encrypted Multiple Information Unit

With reference to FIG. 11 very similar to FIG. 2, the encrypted multiple information unit Ime produced by the information transmission apparatus 800 is described. The output from the lower layer scrambler 114, represented by a rectangle of a dot line, is the encrypted multiple information Ime0c.

The four outputs from the information unit generator 111, indicated by circles, are the information units Iu1c, Iu2c, Iu3c, and Iu4c, respectively. These information units Iu1c, Iu2c, Iu3c and Iu3c represent, for example, a tourist resort guide considering the weather forecast, a weather forecast for the tourist resort, a weather forecast for the entire country, and a weather forecast for a local area, respectively.

The rectangles Iue1c, Iue12c, and Iue4c each indicated by a dot line represent the units of encrypted information produced inside the transmitting unit 810 of the information transmission apparatus 800 at respective encryption stages. Specifically, the rectangle Iue1c represents a formation unit Iue which is produced, such that the information unit scrambler 512 encrypts the information unit Iu1c outputted from the information unit generator 111 with an eighth predetermined cipher C8 under an eighth predetermined encryption system CS8. Thus, the encrypted information unit Iue1c is produced.

The rectangle Iue12c also represents an encrypted information unit Iue which is produced at the following two steps. First, the multiplexer 113 multiplexes the first encrypted information unit Iue1c received from the information unit scrambler 512 and the information unit Iu2c, and produces a multiple information unit Im12c (not shown). Second, the information unit scrambler 512 encrypts the multiple information unit Im12c received from the multiplexer 113 with a ninth predetermined cipher C9 under a ninth predetermined encryption system CS9. Thus, the encrypted information unit Iue12c wherein the information unit Iu1c is encrypted twice is produced.

The rectangle Iue4c represents an encrypted information unit Iue which is produced, such that the information unit scrambler 512 encrypts the information unit Iu4c outputted from the information unit generator 111 with a tenth predetermined cipher C10 under a tenth encryption system CS10. Thus, the encrypted information Iue4c is produced.

The rectangle Ime0c represents an encrypted multiple information Ime which is produced as follows. First, the multiplexer 113 multiplexes the encrypted information unit Iue12c, the information unit Iu3c, and the encrypted information unit Iue4c, and produces a multiple information unit Im1234c (not shown). Second, the lower layer scrambler 114 encrypts the multiple information unit Im1234 with a eleventh predetermined cipher C11 under a eleventh predetermined encryption system CS11.

As a result, the information unit Iu1c is encrypted thrice with the eighth, ninth, and eleventh predetermined ciphers C8, C9, and C11. The information unit Iu2c is encrypted twice with the ninth and eleventh predetermined ciphers C9, and C11. The information unit Iu3c is encrypted once with the eleventh predetermined cipher C11. The information unit Iu4c is encrypted twice with the tenth and eleventh predetermined ciphers C10 and C11.

Note that each of all ciphers C8, C9, C10, and C11 can be assigned with the same value or any optional value according to the suitable resistance of cipher necessary to protect the information unit against unfair access thereto. Similarly, each of all encryption system CS8, CS9, CS10, and CS11 can be selected from the identical encryption system or various different encryption system such as examples referred in the above. Furthermore, all ciphers and encryption system can be selected from those selected in the first and second embodiments.

Decoding Encrypted Multiple Information Unit Into Information Unit

The encrypted information encrypted with ciphers in hierarchically arranged by the transmitting unit 810 can be decrypted by repeatedly using a single descrambler with a simply constructed apparatus, which will be specifically described below. The encrypted multiple information unit Ime0c is supplied to the receiving unit 830 through the transmitter 120 in the format of transmission information It.

The receiver 131 of the receiving unit 830 takes out a part or the whole of encrypted multiple information Ime0c from the received transmission information It at step S901. At step S902, the descrambler 832 decrypts the received encrypted multiple information Ime0c with the eleventh predetermined cipher C11 to obtain the multiple information unit Im1234c (not shown) constructed by the encrypted information unit Iue12c, the information unit Iu3c, and the encrypted information unit Iue4c. Note that the thus obtained multiple information unit Im1234c can be produced in a format different from that of the multiple information unit Im1234c produced by the multiplexer 113.

The demultiplexer 133 demultiplexes the multiple information unit Im1234c produced at step S902, and separates each of encrypted information unit Iue and/or information unit Iu therefrom at step S903. Thus, the encrypted information unit Iue12c, the information unit Iu3c, and the encrypted information unit Iue4c are produced at step S903. Note that the thus obtained information units Iue12c, Iu3c, and Iue4c can be produced in the formats different from those produced by the information unit scrambler 512 of the transmitting unit 810. Needless to say that those information units Iue12c, Iu3c, and Iue4c can be in the same formats as those produced by the information unit scrambler 512 of the transmitting unit 810, resulting in the reproduction of those information units Iue12c, Iu3c, and Iue4c.

Through the operations performed at steps S904 and S905, the reproduction information Ir are produced from those information units Iu1c, Iu2c, Iu3c, and Iu4a at step S906. Note that all information units Iu1c, Iu2c, Iu3c, and Iu4a can be produced in the substantially same in content as those produced by the information unit generator 111, but can be different in the encrypting format or encrypting method. Of course, it is also possible to reproduce the completely same information units as those Iu1c, Iu2c, Iu3c, and Iu4c produced by the information unit generator 111.

Figure 13:
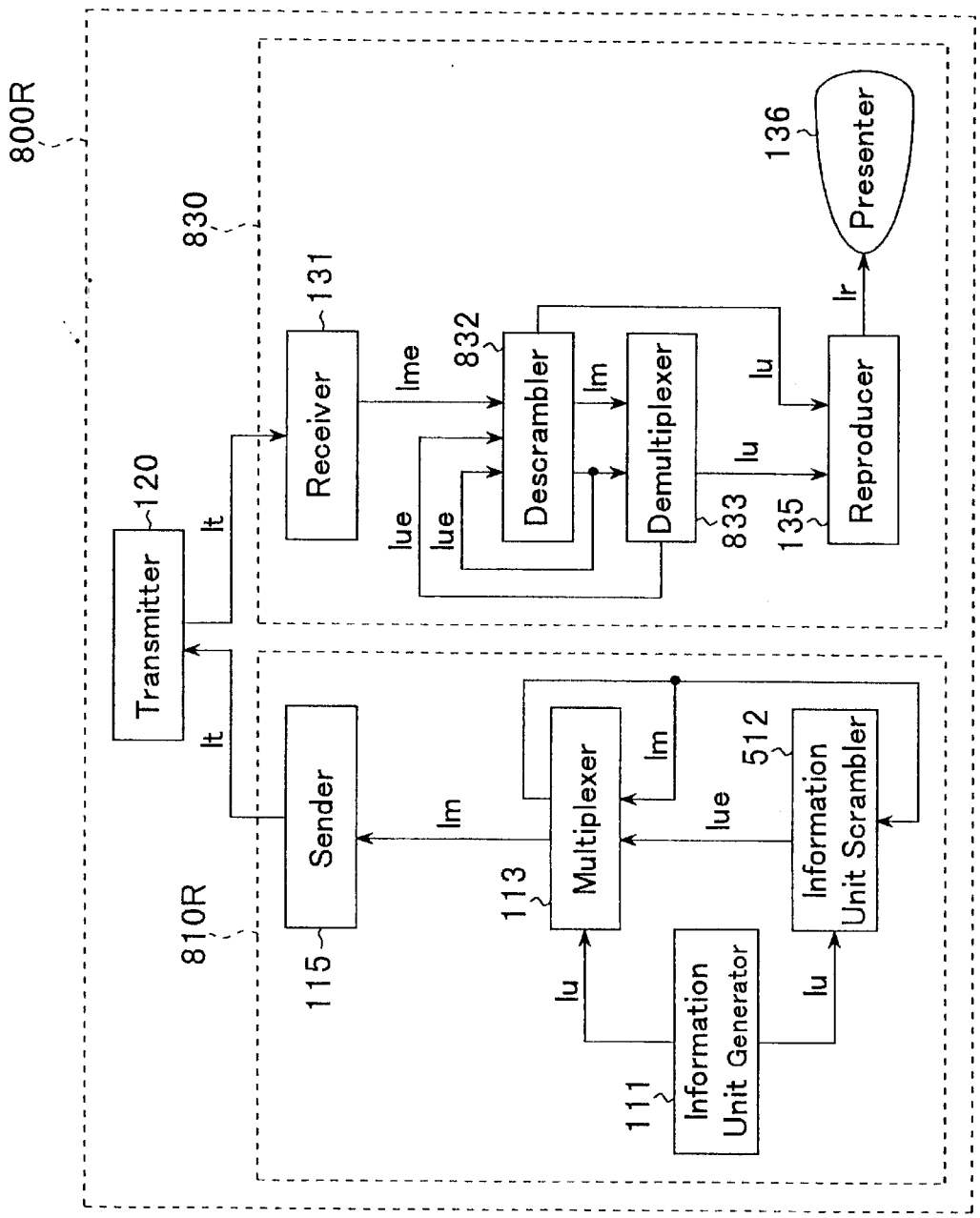
FIG. 13 is a block diagram showing an alternative of the information transmission apparatus of FIG. 10.
Figure 14:
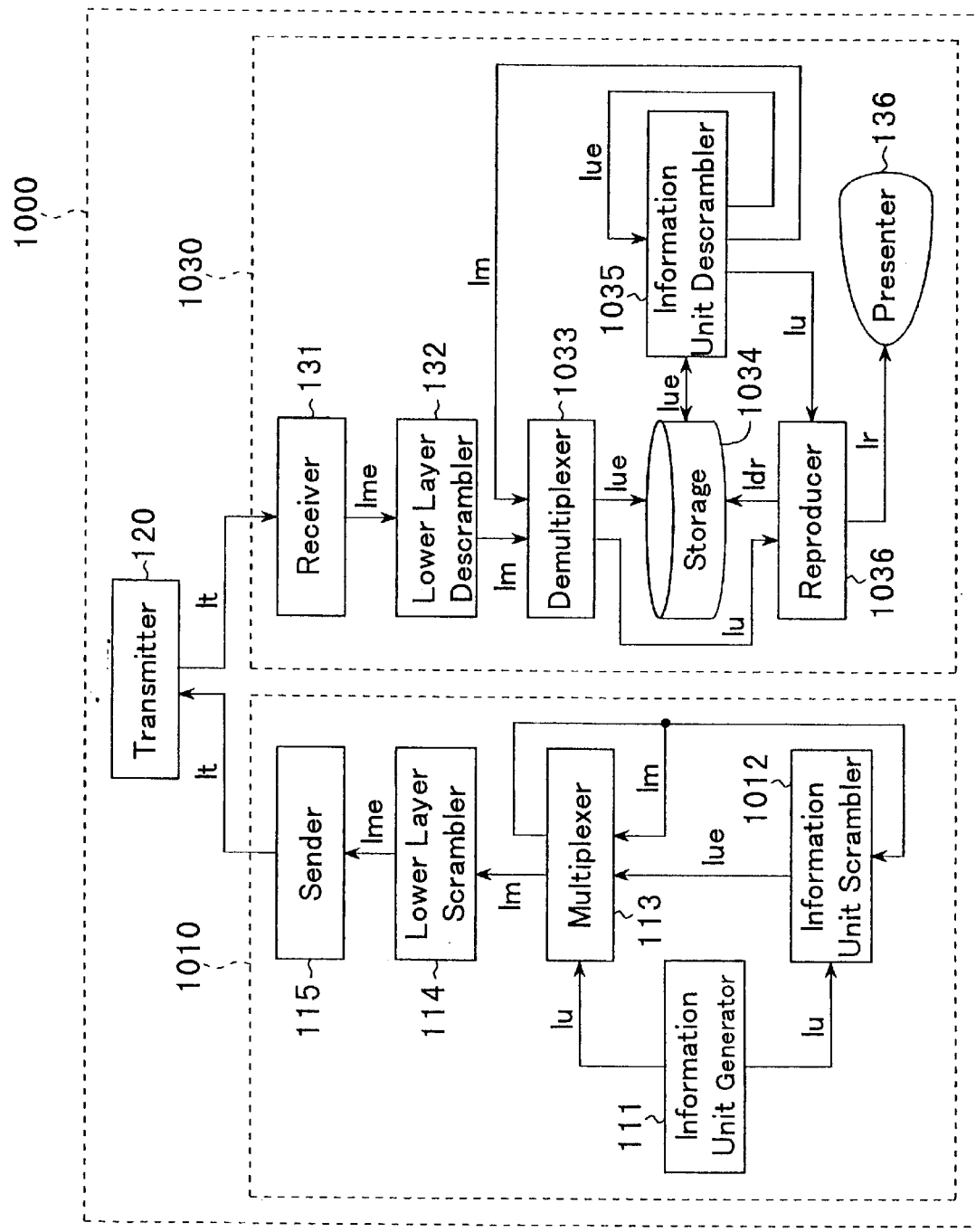
FIG. 14 is a block diagram showing an information transmission apparatus according to a fourth embodiment of the present invention.

With reference to FIG. 13, an alternative of the information transmission apparatus 800 of FIG. 10 is shown. The information transmission apparatus 800R shown in FIG. 13 has a construction where the lower layer scrambler 114 is removed from the information transmission apparatus 800. In this apparatus, the encryption for a lower layer transmission is performed not by the lower layer scrambler 114 (FIG. 10) but by the information unit scrambler 512 (FIG. 14). Therefore, the information unit scrambler 512 only has to encrypt under a certain encryption system used by a lower layer such as being performed by the transmitter 120. Needless to say, the information unit scrambler 512 may be able to encrypt under various encryption systems including one suitable for the above mentioned lower layer transmission.

Fourth Embodiment

With reference to FIGS. 14, 15, 16, and 17, an information transmission apparatus according to the fourth embodiment of the present invention is described next. The information transmission apparatus 1000 includes a transmitting unit 1010, the transmitter 120, and a receiving unit 1030. Next, descriptions of any of substantially the same components constructing the information transmission apparatuses 100, 500, 500R, 800, or 800R are generally omitted for reducing the redundancy.

Transmitting Unit 1010

The transmitting unit 1010 has a construction very similar to that of the transmitting unit 110 of the first embodiment, such that the information unit scrambler 112 is replaced by an information unit scrambler 1012. The information unit scrambler 1012 recursively encrypts the information units Iu outputted by the information unit generator 111 a plurality of times, and produces the encrypted information units Iue. A method of performing recursive encryption a plurality of times may be the same as that performed by the information unit scrambler 112 in the first embodiment.

The information unit scrambler 1012 adds an encrypted information unit Identifier which is an identifier for distinguishing an information unit Iu from the outputted encrypted information units Iue. Hereinafter the encrypted information unit Identifier is referred to as an encrypted information unit ID for simplification. Although the encrypted information unit Iue is composed of so-called child encrypted information units Iue, the encrypted information unit ID shall be added not to the child encrypted information units Iue but to parent encrypted information units Iue. The same value is assigned to information units Iu updated with time as the encrypted information unit ID. For example, the same encrypted information unit ID is assigned to an information unit Iu of the weather in the entire country for yesterday and an information unit Iu of the weather in the entire country for today.

Receiving Unit 1030

The receiving unit 1030 includes receiver 131, a lower layer descrambler 132, demultiplexer 1033, storage 1034, an information unit descrambler 1035, reproducer 1036, and presenter 136. Specifically the receiving unit 1030 has a construction similar to that of the receiving unit 130 of the first embodiment shown in FIG. 1, such that the demultiplexer 133 and reproducer 135 are replaced by the demultiplexer 1033 and the reproducer 1036, respectively, in this embodiment.

Furthermore, the storage 1034 is additionally inserted between the demultiplexer 1033 and the reproducer 1036. The storage 1034 is connected to the demultiplexer 1033 and the reproducer 1036 for receiving the encrypted information unit Iue and an reproduction designating information Idr therefrom, respectively. The storage 1034 is further connected to the information unit descrambler 1035 for exchanging the encrypted information unit Iue therebetween.

The storage 1034 stores the encrypted information unit Iue inputted from the demultiplexer 1033 and the information unit descrambler 1035 therein. Then, the storage 1034 replaces the encrypted information Iue therein with newly inputted encrypted information Iue which is being updated. Thus, the encrypted information unit Iue stored in the storage is updated to the newest one. When the stored encrypted information unit Iue is designated by the inputted reproduction designating information Idr, the storage 1034 outputs the encrypted information unit Iue.

The information unit descrambler 1035 is further connected to the input port thereof for supplying an encrypted information unit Iue (an information unit Iu which is not encrypted is also an encrypted information unit Iue, as defined previously). The information unit descrambler 1035 is also connected to the input port of the demultiplexer 1033 for supplying an encrypted information unit Iue.

The reproducer 1036 is further connected to the demultiplexer 1033 for receiving the information unit Iu therefrom, and produces the reproduction information Ir and the reproduction designating information Idr. The reproduction designating information Idr is an information for designating an information unit Iu. Specifically, the reproduction designating information Idr designates the information unit Iu included in the encrypted information unit Iue stored in the storage 1034. The information unit Iu designated by the reproduction designating information Idr may be determined by a user's direct entry, or may be determined independently by the information transmission apparatus 1000 itself.

The presenter 136 is connected to the reproducer 1036 for receiving the reproduction information Ir therefrom. Then, the presenter 136 presents contents included in the reproduction information Ir to a user.

In Operation

Figure 15:
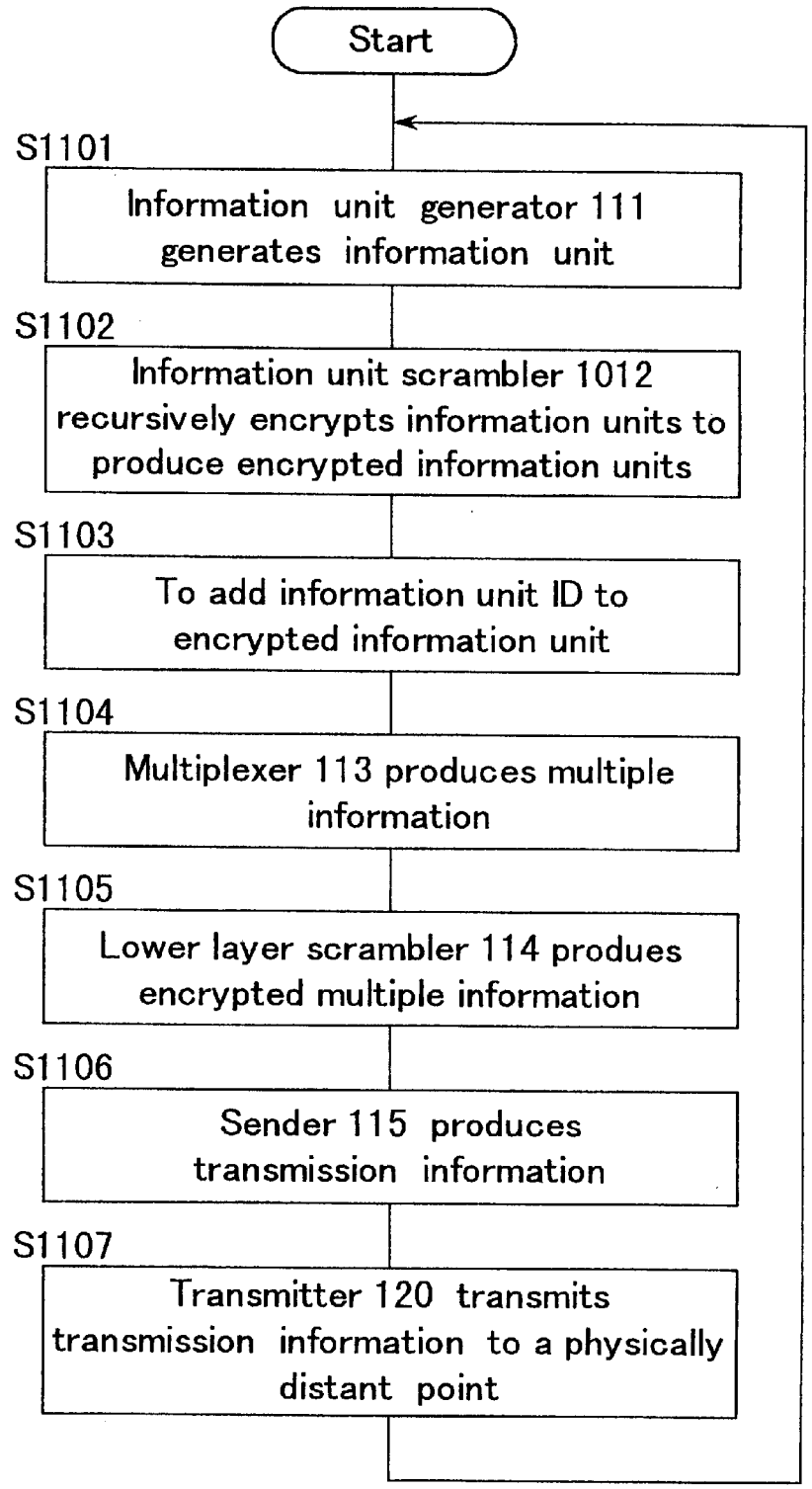
FIG. 15 is a flow chart showing operations performed by a transmitting unit and transmitter in the information transmission apparatus of FIG. 14.
Figure 16:
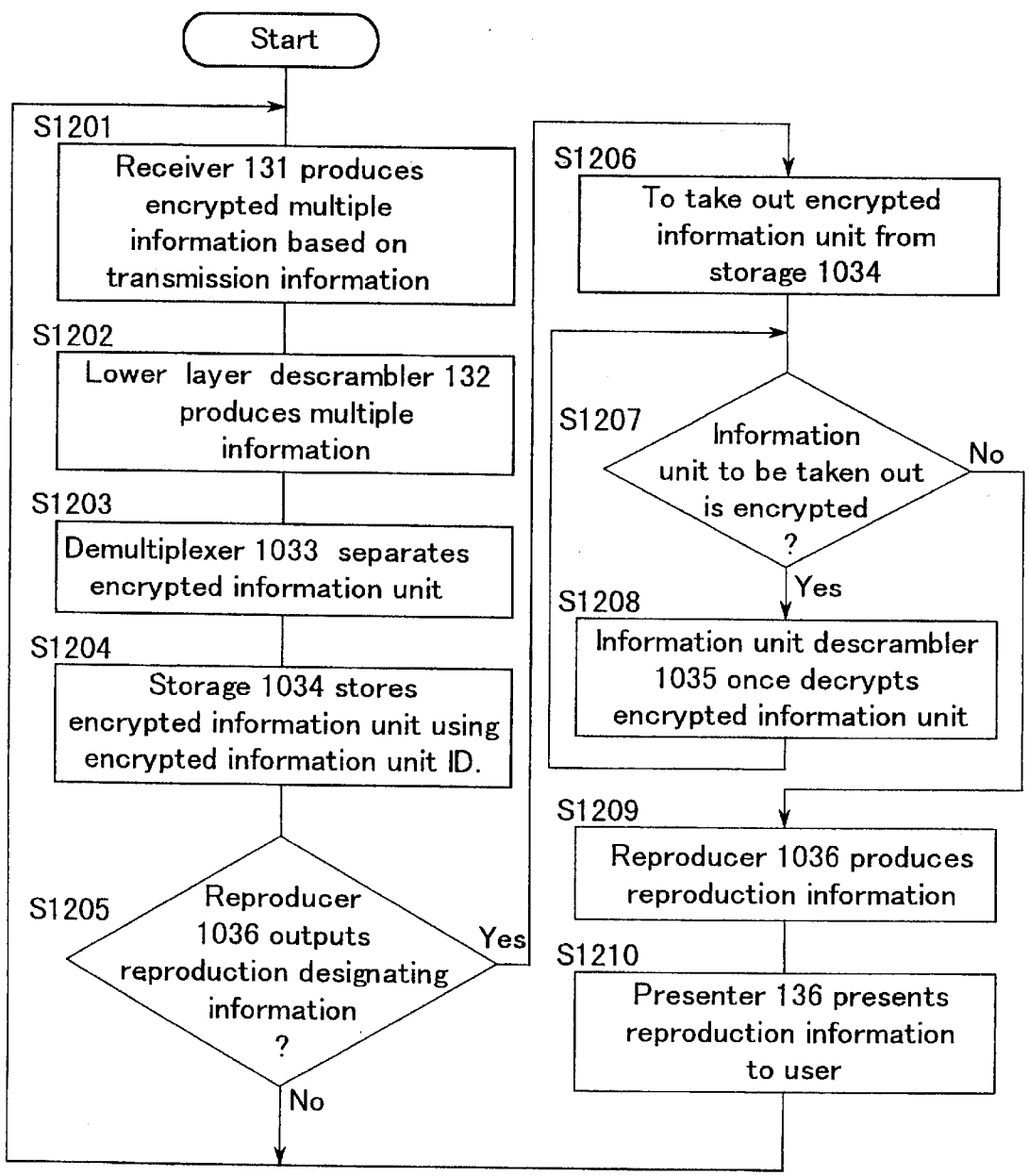
FIG. 16 is a flow chart showing operations performed by a receiving unit in the information transmission apparatus of FIG. 14.
Figure 17:
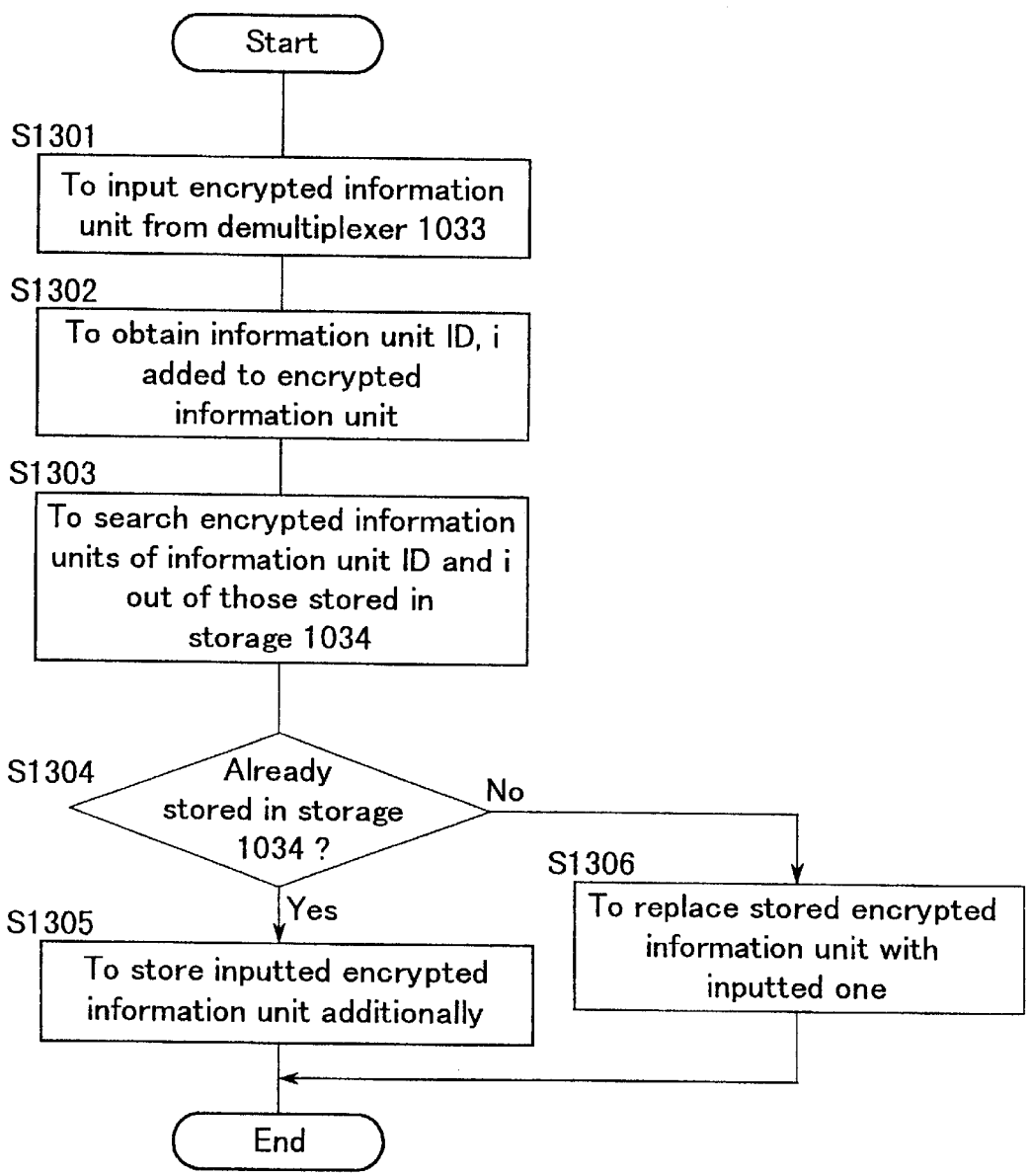
FIG. 17 is a flow chart showing operations performed by storage in the information transmission apparatus of FIG. 14.

With reference to FIGS. 15, 16, and 17, the operations performed by the information transmission apparatus 1000 is described below.

In FIG. 15, a flow chart showing the operations performed by the transmitting unit 1010 and the transmitter 120 is shown.

At step S1101, the information unit generator 111 produces a plurality of information units Iu.

At step S1102, the information unit scrambler 1012 recursively encrypts the information units Iu generated at step S1101, and takes the results thereof as encrypted information units Iue.

At step S1103, an encrypted information unit ID is added to the encrypted information units Iue generated at step S1102. The encrypted information unit ID can be easily taken out without decrypting the encrypted information unit Iue because it is added to the result of encrypting the information unit Iu at step S1102.

At step S1104, the multiplexer 113 multiplexes the encrypted information units Iue generated by the encryption at step S1103, and outputs the result thereof as multiple information Im.

At step S1105, the lower layer scrambler 114 encrypts the multiple information Im obtained by the multiplying at step S1104, and produces the encrypted multiple information Ime. The encryption performed at step S1105 shall use the same cipher as that used in the encryption performed at step S1102.

At step S1106, the sender 115 converts the encrypted multiple information Ime obtained by the encryption at step S1105 into a format which is suitable for transmission by the transmitter 120, and produces the transmission information It.

At step S1107, the transmitter 120 transmits the transmission information It to a physically distant point. In this case, a plurality of receiving units 1030 may correspond to one transmitting unit 1010.

In FIG. 16, a flow chart showing the operation performed by the receiving unit 1030 is shown.

At step S1201, the receiver 131 receives the transmission information It from the transmitter 120, and takes out a part or the whole of encrypted multiple information Ime from the inputted transmission information It.

At step S1202, the lower layer descrambler 132 receives the encrypted multiple information Ime obtained at step S1201, and decrypts the inputted encrypted multiple information Ime.

At step S1203, the demultiplexer 1033 separates the multiple information Im obtained at step S1202 for each encrypted information unit Iue, and takes out the encrypted information unit Iue.

At step S1204, the storage 1034 stores the encrypted information unit Iue using the encrypted information unit ID.

In FIG. 17, the details of the operations performed by the storage 1034 at step S1204 will be described below.

At step S1301, an encrypted information unit Iue is inputted from the demultiplexer 1033.

At step S1302, a value i of an encrypted information unit ID added to the encrypted information unit Iue inputted at step S1301 is obtained.

At step S1303, it is examined by retrieval whether or not the encrypted information unit Iue, to which the encrypted information unit ID having the value i is added, has been already stored in the storage 1034.

At step S1304, It is judged whether any encrypted information unit Iue is stored in the storage 1034 or not. When it is judged "YES", the procedure advances to step S1305. However, when it s judged "NO", the procedure advances to step S1306.

At step S1305, the encrypted information unit Iue inputted at step S1301 is added and stored. Thereafter, the procedure returns to step S1301. From step S1301, the processing is repeated.

At step S1306, the encrypted information unit Iue, to which the encrypted information unit ID having the value i is added, currently stored is removed, and the encrypted information unit Iue inputted at step S1301 is stored instead. Thereafter, the procedure returns to step S1301. From step S1301, the processing is repeated.

As described in the foregoing, the information unit Iu stored in the storage 1034 is encrypted as an encrypted information unit Iue. Even if the contents of the storage 1034 is unfairly referred to, therefore, the secrecy is ensured. In the case of updating, the encrypted information unit ID is assigned to the parent encrypted information units Iue, thereby making it easy to take out the encrypted information unit ID from the encrypted information unit Iue outputted by the demultiplexer 1033. The encrypted information unit ID which can be easily taken out is only used, so that it is very simply feasible to perform updating processing of the contents of the storage 1034.

By adding an information indicating whether or not updating is performed to the encrypted information unit ID, it is possible to simplify processing of the encrypted information unit Iue sent many times without being changed by the storage 1034. As examples of the information indicating whether or not updating is performed are;

(1) a flag indicating that updating is performed,
(2) a numerical value representing a version, and
(3) a checksum of the whole of information are considered.

At step S1205, the procedure advances to step S1206 when the reproducer 1036 outputs reproduction designating information Idr, while being returned to step S1201 when it does not output the reproduction designating information Idr.

At step S1206, the storage 1034 takes out the encrypted information unit Iue having the encrypted information unit ID designated by the reproduction designating information Idr outputted at step S1205 from the storage 1034. Then, the storage 1034 outputs the encrypted information unit Iue.

At step S1207, when an information unit Iu to be taken out exists in a state where it is not encrypted in the encrypted information unit Iue inputted to the information unit descrambler 1035, the procedure advances to step S1209.

At step S1208, the information unit descrambler 1035 decrypts once the encrypted information unit Iue in which there exists the information unit Iu to be taken out. Thereafter, the procedure returns to step S1207. At step S1209, the reproducer 1036 receives the information unit Iu outputted by the information unit descrambler 1035. Then, the reproducer 1036 generates the reproduction information Ir.

At step S1210, the presenter 136 presents the reproduction information obtained at step S1209 to a user in accordance with the format of the reproduction information.

As described in the foregoing, the encrypted information unit ID is added to the encrypted information unit Iue. Additionally provided is the storage 1034. Thus, the encrypted information unit Iue stored in the storage 1034 can be updated to the newest one without performing decryption processing in the information unit descrambler 1035. When the user actually views the encrypted information unit Iue, the encrypted information unit Iue is decrypted by the information unit descrambler 1035.

It is to be noted that the information unit descrambler 134 used in the foregoing embodiments should be able to decrypts the multiple encrypted information unit Iu (Ime) at the same time. Contrary, the information unit descrambler 1035 is free from such a restriction peculiar to the information unit descrambler 134, owing to that the encrypted information which is a result of one time decryption. Specifically, by receiving the information little by little from the storage 1034, it is possible to decrypt the encrypted information at slower processing speed compared with the speed at which the transmitter 120 transmits.

Furthermore it is also possible to temporarily output the encrypted information unit Iue into the storage 1034, only when the processing can not be completed within a determined period. This temporarily stored encrypted information is outputted to the information descrambler 1035, and then is processed.

The reproducer 1036 designates the contents of information to be supplied to the storage 1034 in accordance with the user's request. For this purpose, the reproducer 1036 produces the reproduction designating information Idr. Owing to this reproduction designating information Idr, it is possible to perform decryption at any optional timing. Thus, even if the encryption key is supplied later than the encrypted information (It), the receiving unit 1030 can process that encrypted information.

Fifth Embodiment

Figure 18:
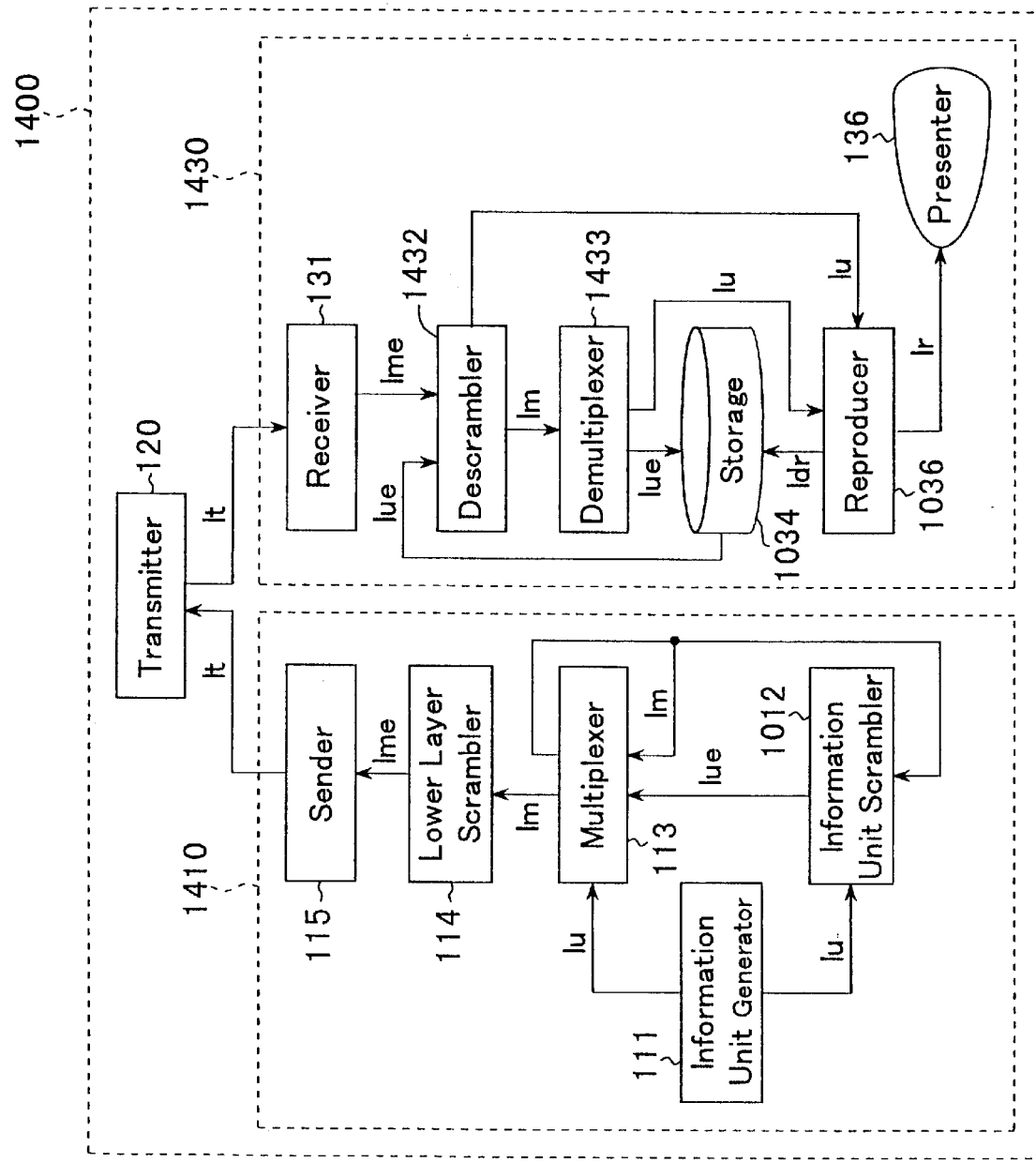
FIG. 18 is a block diagram showing an information transmission apparatus according to a fifth embodiment of the present invention.
Figure 19:
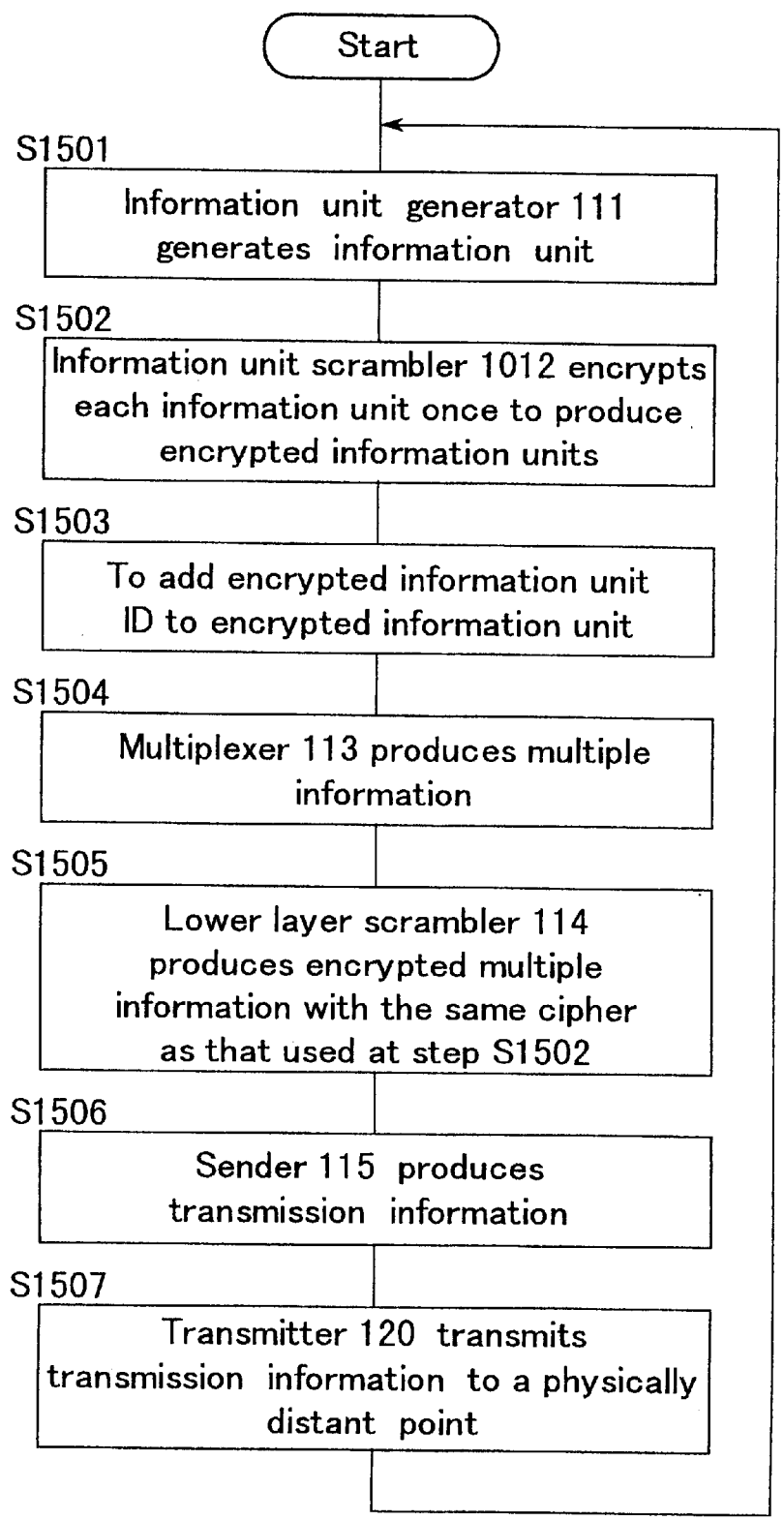
FIG. 19 is a flow chart showing operations performed by a transmitting unit and transmitter in the information transmission apparatus of FIG. 18.
Figure 20:
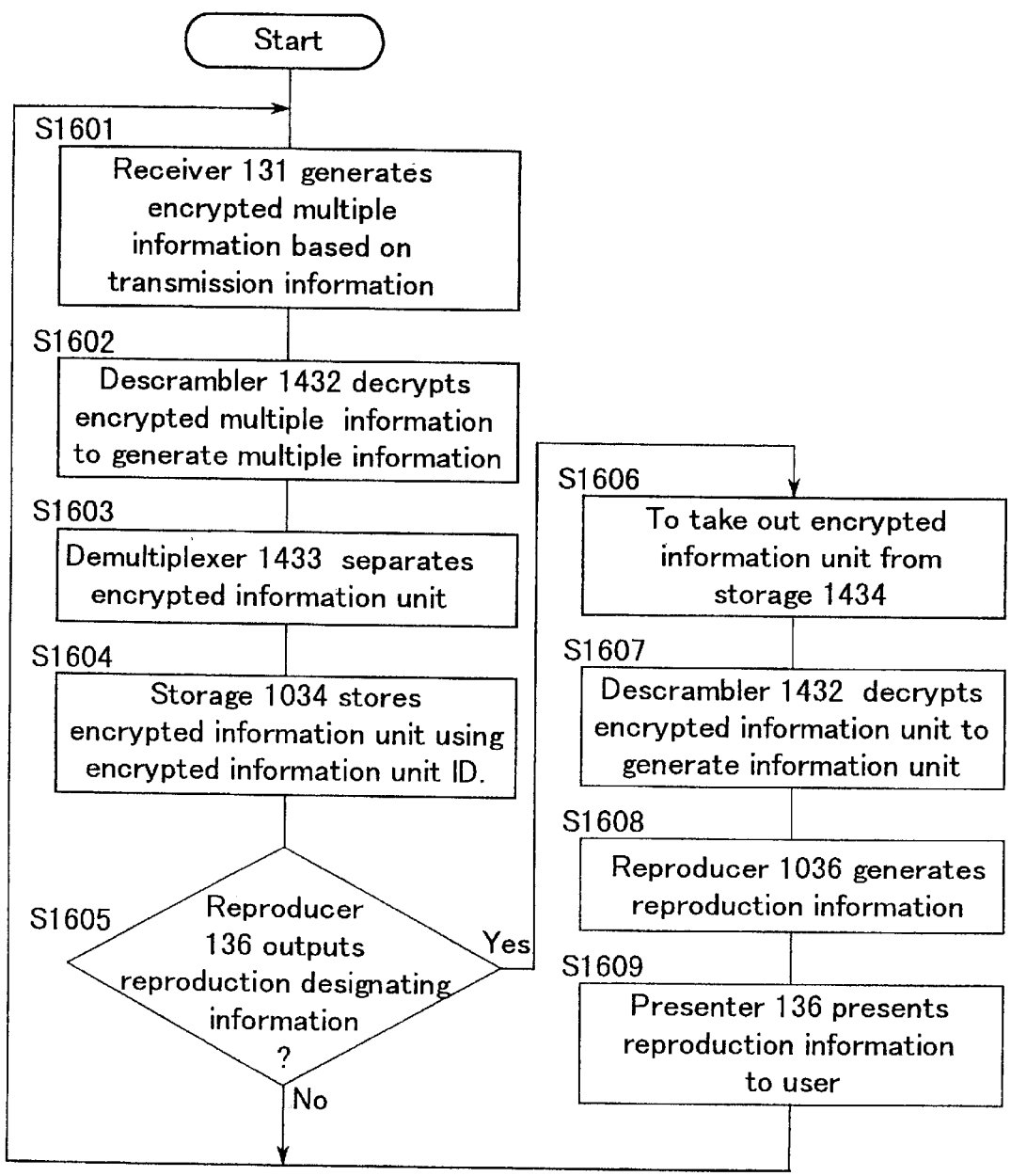
FIG. 20 is a flow chart showing operations performed by a receiving unit in the information transmission apparatus of FIG. 18.

With reference to FIGS. 18, 19, and 20, an information transmission apparatus according to the fifth embodiment of the present invention is described. The information transmission apparatus 1400 includes a transmitting unit 1410, the transmitter 120, and a receiving unit 1430. Next, descriptions of any of substantially the same components constructing the information transmission apparatuses 100, 500, 500R, 800, 800R, or 1000 are generally omitted for reducing the redundancy.

The information transmission apparatus 1400 is constructed by removing such a restriction that the information unit scrambler 1012 recursively encrypts a plurality of times from the information transmission apparatus 1000 according to the fourth embodiment. Furthermore, the lower layer descrambler 132 and the information unit descrambler 1035 in the fourth embodiment are integrated into the descrambler 1432 in the fifth embodiment. It can be considered that the integration enables the descrambler 1432 to substitute for the function of the information unit descrambler 1035.

Transmitting Unit 1410

The transmitting unit 1410 has a construction substantially the same as that of the transmitting unit 1010 shown in FIG. 14. Therefore, description is omitted.

Receiving Unit 1430

The receiving unit 1430 has a construction very similar to that of the receiving unit 1030, such that the lower layer descrambler 132 and the information unit descrambler 1035 are replaced by a descrambler 1432.

The descrambler 1432 is connected to the receiver 131 and the storage 1034 for receiving the multiple information units Iue therefrom. Then, the descrambler 1432 outputs multiple information Im, when the encrypted multiple information Ime is inputted thereto. Further, the descrambler 1432 decrypts, when the encrypted information unit Iue is inputted thereto, the inputted encrypted information unit Iue, and outputs an information unit Iu which is the decryption result thereof Thus the obtained information unit Iu is directly supplied to the reproducer 1036.

The demultiplexer 1433 is connected to the descrambler 1432 for receiving the multiple information unit Im therefrom to demultiplex the received multiple information unit Im. Then, the demultiplexer 1433 produces the encrypted information unit Iue and sends it to the storage 1034, when the multiple information unit Im from the descrambler 1432 is encrypted. The demultiplexer 1433 produces the information unit Iu and sends it to the reproducer 1036, when the multiple information unit Im from the descrambler 1432 is not encrypted.

The storage 1034 is connected to the demultiplexer 1433 and the reproducer 1036 for receiving the encrypted information unit Iue and reproduction designating information Idr therefrom, respectively. The storage 1034 is further connected to the input port of the descrambler 1432. The storage 1034 stores the received encrypted information unit Iue therein, and replaces the stored encrypted information unit Iue when the encrypted information unit Iue is updated.

Thus, the encrypted information unit Iue stored in the storage 1034 is kept the newest.

When the stored encrypted information unit Iue is designated by the received reproduction designating information Idr, the storage 1034 outputs the encrypted information unit Iue. This encrypted information unit Iue is directly fed back to the descrambler 1432.

The reproducer 1036 is connected to the demultiplexer 1433 for receiving the information unit Iu therefrom, and to the storage 1034 for supplying the reproduction designating information Idr thereto.

Note that the descrambler 1432 can perform the decryption process at a slower speed not conforming to the information transmission speed at the transmitter 120, owing to that the encrypted information Iue is supplied to the descrambler 1432 from the storage 1034 little by little. This is especially effective for the first and more inner, viewed from the other shell, encrypted and more inner encrypted information units.

As described in the above, a result of that the encrypted information unit Iue is little by little supplied from the storage 1034 to the descrambler 1432. Resultantly, the demultiplexer 1433 may demultiplex to dissolve the first and more inner, viewed from the outer shell, multiplexed information units and at a slower speed compared with a transmission speed by the transmitter 120.

In Operation

With reference to FIGS. 19 and 20, the operations of the information transmission apparatus 1400 is described briefly. In FIG. 19, a flow chart for operations performed by the transmitting unit 1410 and the transmitting unit 120 is shown.

At step S1501, the information unit generator 111 produces a plurality of information units Iu, and outputs the generated information units Iu.

At step S1502, the information unit scrambler 1012 respectively encrypts the information units Iu generated at step S1501, and takes the results thereof as encrypted information units Iue.

At step S1503, an encrypted information unit ID is added to the encrypted information units Iue generated at step S1502.

At step S1504, the multiplexer 113 multiplexes the encrypted information units Iue generated by the encryption at step S1502, and outputs the result thereof as multiple information Im.

At step S1505, the lower layer scrambler 114 encrypts the multiple information Im obtained by the multiplexing at step S1504, and produces the encrypted multiple information Ime. The encryption performed by the lower layer scrambler 114 shall use the same cipher as that in the encryption performed by the information unit scrambler 1012.

At step S1506, the sender 115 converts the encrypted multiple information Ime obtained by the encryption at step S1505 into a format which is suitable for transmission by the transmitter 120, and produces the transmission information It.

At step S1507, the transmitter 120 transmits the transmission information It to a physically distant point. In this case, a plurality of receiving units 1430 may correspond to one transmitting unit 1410.

In FIG. 20, a flow chart for operations performed by the receiving unit 1430 is shown.

At step 1601, the receiver 131 receives the transmission information It inputted from the transmitter 120, and takes out a part or the whole of encrypted multiple information Ime from the inputted transmission information It.

At step S1602, the descrambler 1432 receives the encrypted multiple information Ime obtained at step S1601. Then, the descrambler 1432 decrypts the received encrypted multiple information Ime, and produces the multiple information Im.

At step S1603, the multiplexer 1433 separates the multiple information Im obtained at step S1602 for each encrypted information unit Iue, and takes out the encrypted information unit Iue.

At step S1604, the storage 1034 stores the encrypted information unit Iue using the encrypted information unit ID.

At step S1605, the procedure advances to step S1606 when the reproducer 1036 outputs reproduction designating information Idr, while being returned to step S1601, when it does not output the reproduction designating information Idr.

At step S1606, the storage 1034 takes out the encrypted information unit Iue having the encrypted information unit ID designated by the reproduction designating information Idr outputted at step S1605 from the storage 1034. Then, the storage 1034 outputs the encrypted information unit Iue.

At step S1607, the descrambler 1432 decrypts the encrypted information unit Iue, to generate an information unit Iu. When the information unit Iu is encrypted once, the encrypted information unit Iue is decrypted once, thereby making it possible to generate an information unit Iu. Although, there is such a restriction that the information unit Iu is recursively encrypted a plurality of times in the fourth invention, the restriction is not placed in this invention.

At step S1608, the reproducer 1435 receives the information unit Iu outputted by the descrambler 1432, and produces the reproduction information Ir.

At step S1609, the presenter 1436 presents the reproduction information obtained at step S1608 to a user in accordance with the format of the reproduction information.

As described in the foregoing, the encryption performed by the information unit scrambler 1012 is made the same as the encryption performed by the lower layer scrambler 114. Thus, it is possible for the single descrambler 1432 to decode a cipher used in not only the lower layer scrambler 114 but also the information unit scrambler 1012. That is, it is possible to decrypt the information unit Iu by preparing only one descrambler which is not special.

Further, the encrypted information unit ID is added to the encrypted information unit Iue, and the storage 1034 is added, thereby making it possible to update the encrypted information unit Iue stored in the storage 1034 to the newest one without performing decryption processing in the descrambler 1432. When the user actually views the encrypted information unit Iue, the encrypted information unit Iue is decrypted by the descrambler 1432.

Figure 21:
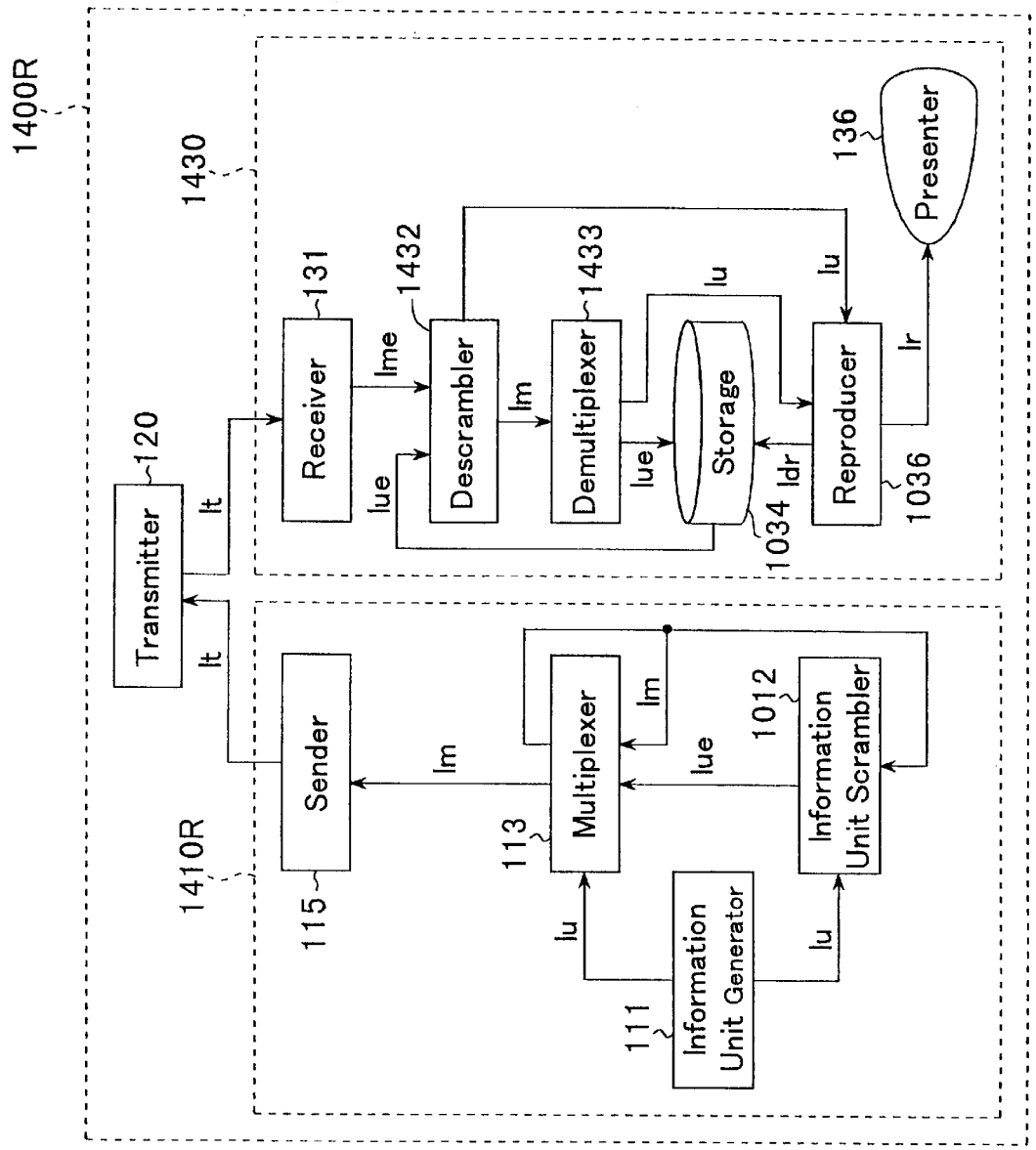
FIG. 21 is a block diagram showing an alternative of the information transmission apparatus of FIG. 18.

With reference to FIG. 21, an alternative of the information transmission apparatus 1400 of FIG. 18 is shown. The information transmission apparatus 1400R shown in FIG. 21 has a construction where the lower layer scrambler 114 is removed from the information transmission apparatus 1400. In this apparatus, the encryption for a lower layer transmission is performed not by the lower layer scrambler 114 (FIG. 18) but by the information unit scrambler 1012 (FIG. 21). Therefore information unit scrambler 1012 only has to encrypt under a certain encryption system used by a lower layer such as being performed by the transmitter 120. Needless to say, the information unit scrambler 1012 may be able to encrypt under various encryption systems including one suitable for the above mentioned lower layer transmission.

Sixth Embodiment

Figure 22:
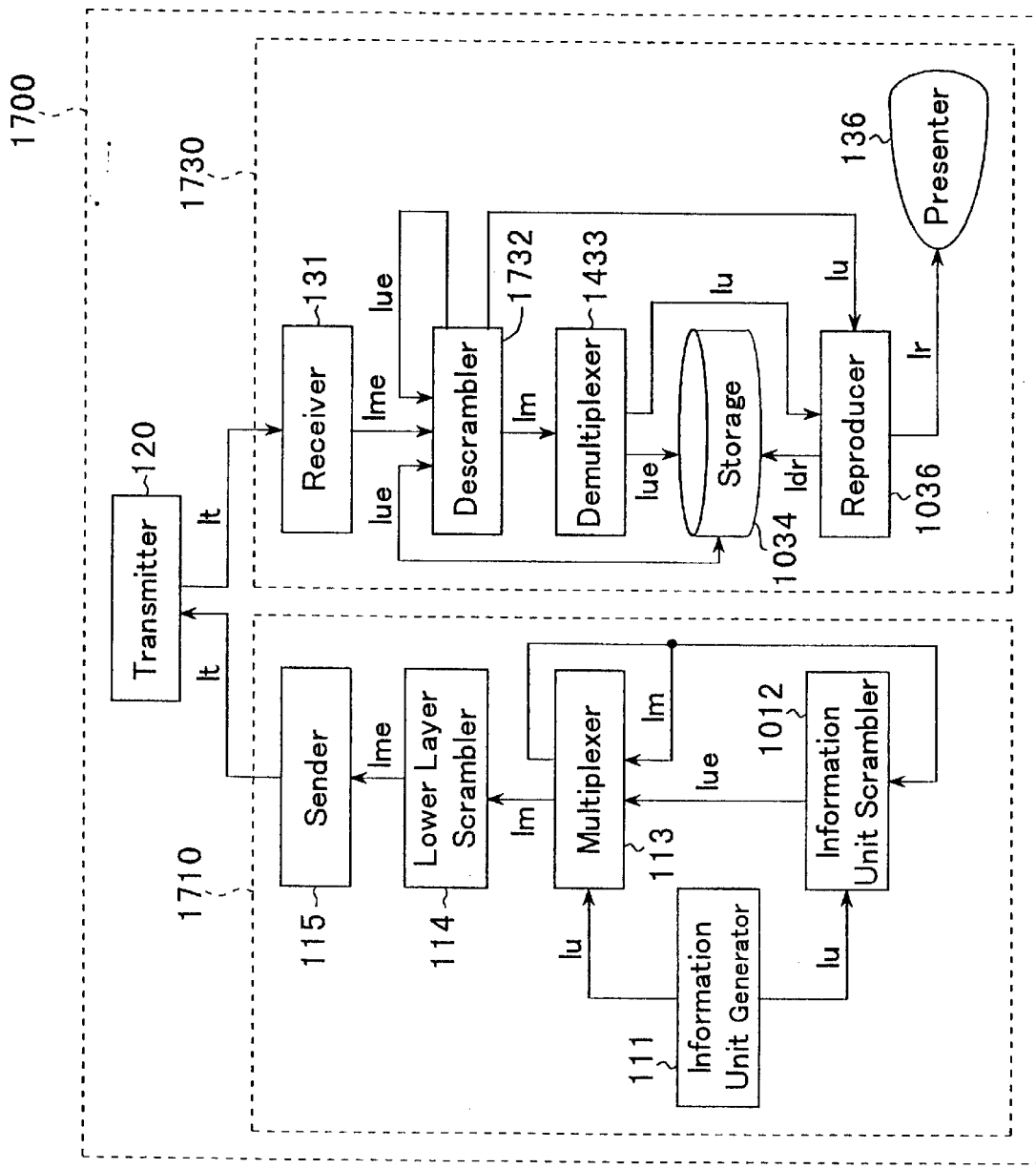
FIG. 22 is a block diagram showing an information transmission apparatus according to a sixth embodiment of the present invention.
Figure 23:
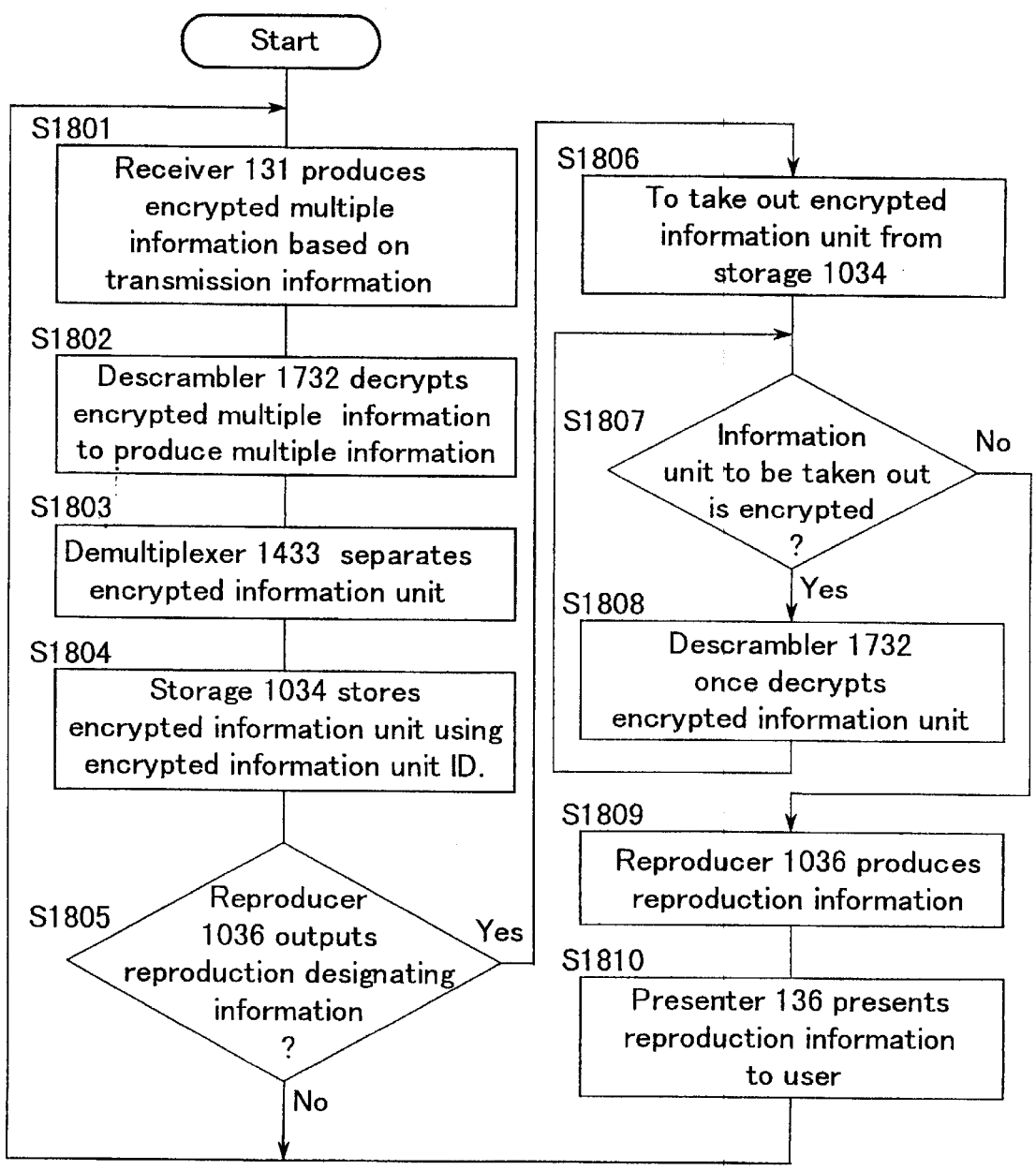
FIG. 23 is a flow chart showing operations performed by a receiving unit in the information transmission apparatus of FIG. 22.
Figure 25:
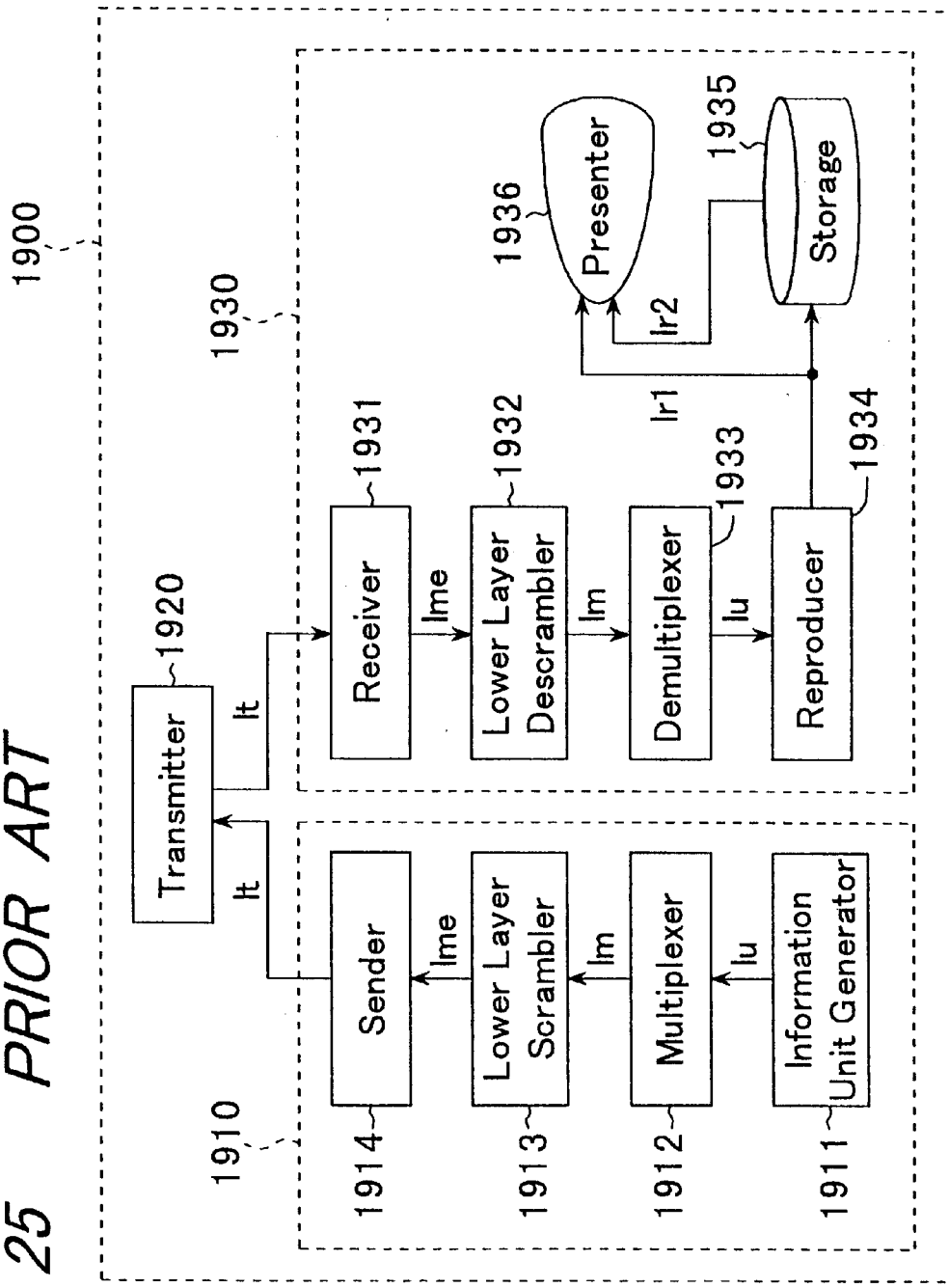
FIG. 25 is a block diagram showing a conventional information transmission apparatus.
Figure 27:
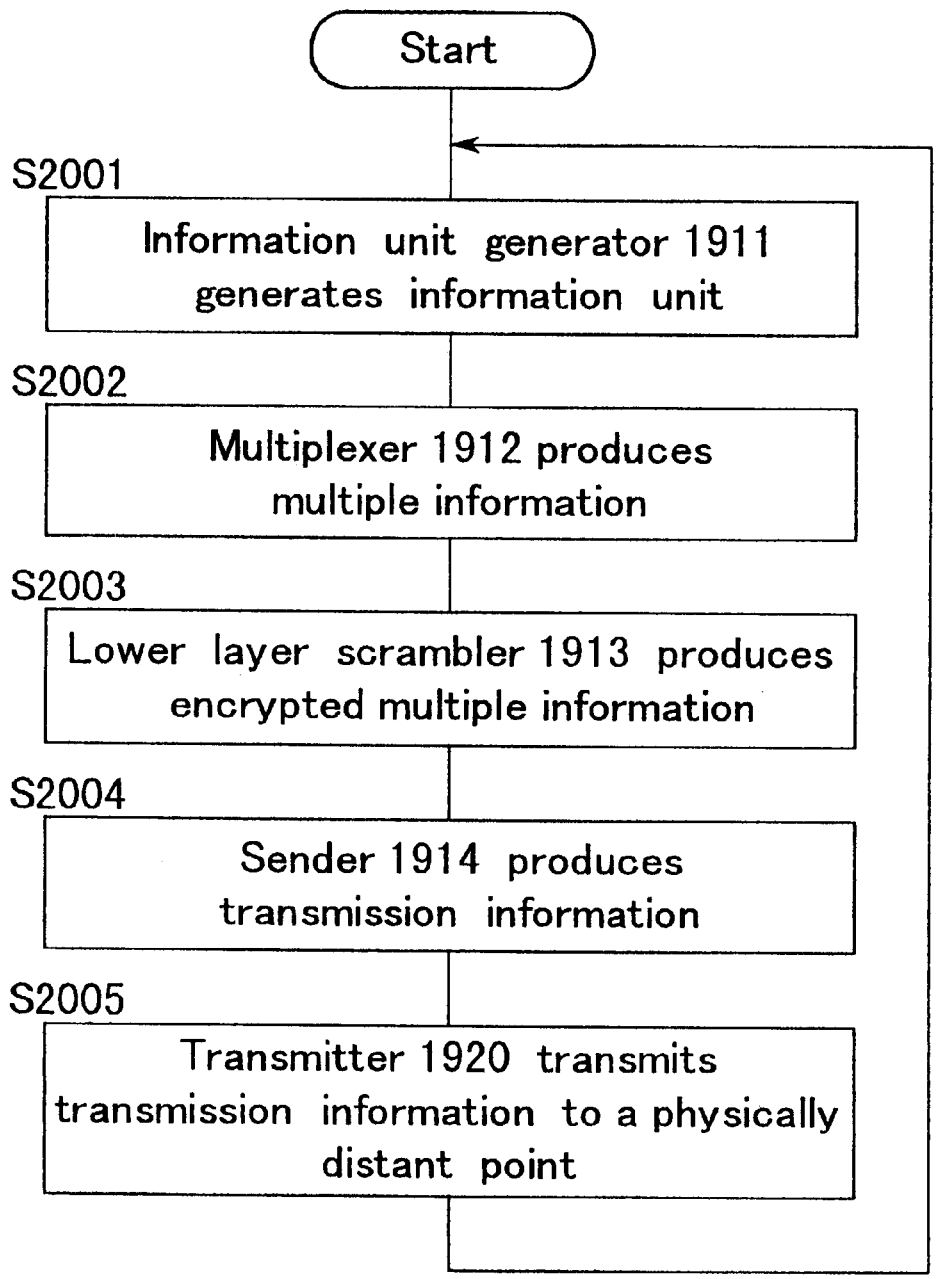
FIG. 27 is a flow chart showing operations performed by the transmitting unit and transmitter in the information transmission apparatus of FIG. 25.
Figure 28:
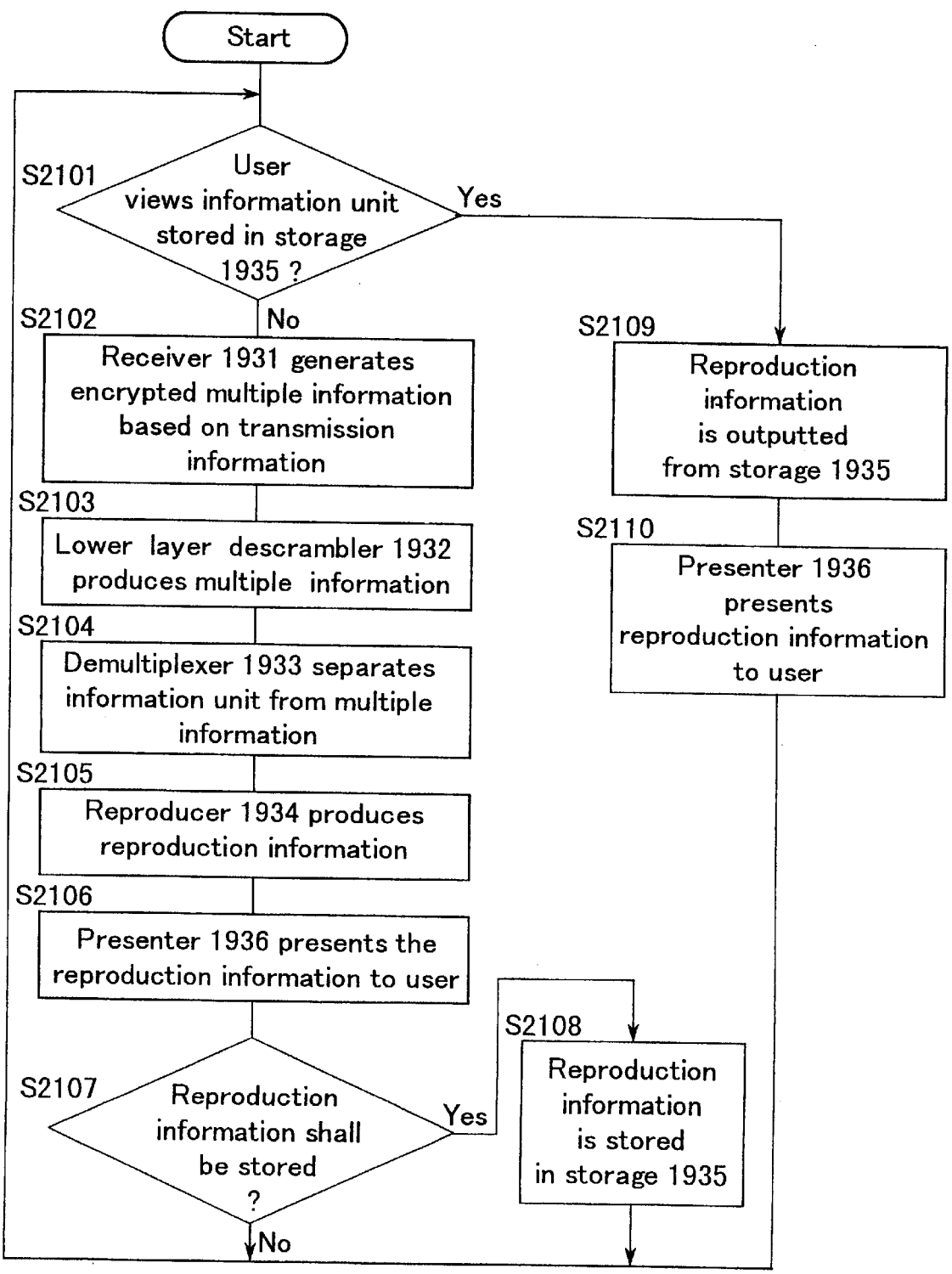
FIG. 28 is a flow chart showing operations performed by a receiving unit in the information transmission apparatus of FIG. 25.

With reference to FIGS. 22, 23, and 25, an information transmission apparatus according to the sixth embodiment of the present invention is described. The information transmission apparatus 1700 includes a transmitting unit 1710, the transmitter 120, and a receiving unit 1730. Next, descriptions of any of substantially the same components constructing the information transmission apparatuses 100, 500, 500R, 800, 800R, 1000, 1400, and 1400R are generally omitted for reducing the redundancy.

In this embodiment, it is invented that the information unit Iu which is outputted from the descrambler 1732 is supplied back thereto, so that the descrambler 1732 can handle such information unit as been recursively encrypted a plurality of times.

Transmitting Unit 1710

The transmitting unit 1710 has a construction substantially the same as that of the transmitting unit 1010 shown in FIG. 14. Therefore, description is omitted.

Receiving Unit 1730

The receiving unit 1730 has a construction very similar to that of the receiving unit 1430 according to the fifth embodiment (FIG. 18), such that the descrambler 1432 is replaced by a descrambler 1732.

The descrambler 1732 is connected to the receiver 131 for receiving the encrypted multiple information Ime therefrom, and produces the encrypted information unit Iue, the multiple information Im, or the information unit Iu. The descrambler 1732 has a loop line for returning the thus produced encrypted information unit Iue thereto. The descrambler 1732 is also connected to the reproducer 1036 for supplying the thus produced information unit Iu thereto, and to the demultiplexer 1433 for supplying the thus produced multiple information Iu thereto. Further, the descrambler 1732 is bilaterally connected to the storage 1034 for exchanging the encrypted information unit Iue therebetween.

The descrambler 1732 outputs, when the encrypted multiple information Ime is inputted thereto, multiple information Im, while decrypting, when the encrypted information unit Iue is inputted thereto, the encrypted information unit Iue, and outputs an information unit Iu which is the result thereof.

The demultiplexer 1433 is connected to the descrambler 1732 for receiving the multiple information Im therefrom, and outputs an encrypted information unit Iue and/or the information unit Iu.

The storage 1034 receives the encrypted information unit Iue outputted by the demultiplexer 1433 and demultiplexer 1732, and the reproduction designating information Idr outputted by the reproducer 1036. Then, the storage 1034 also outputs the encrypted information unit Iue to the descrambler 1732.

The storage 1034 stores the received encrypted information unit Iue, and replaces, when the encrypted information unit Iue is updated, the stored encrypted information unit Iue, to update the encrypted information unit Iue to the newest one.

When the stored encrypted information unit Iue is designated by the received reproduction designating information Idr, the storage 1034 outputs the encrypted information unit Iue.

The reproducer 1036 receives the information unit Iu outputted by the descrambler 1732, and outputs the reproduction information Ir and the reproduction designating information Idr. It is to be noted that the descrambler 832 used in the third embodiment should be able to decrypt the multiple encrypted information unit Iu at the same time. Contrary, the descrambler 1732 is free from such a restriction that the descrambler 832, owing to that the encrypted information which is a result of one time decryption is temporarily stored in the storage 1034.

Furthermore, it is also possible to temporarily output the encrypted information unit Iue into the storage 1034, only when the processing can not be completed within a determined period. This temporarily stored encrypted information is outputted to the information unit descrambler 1732, and then is processed.

In Operation

With reference to FIG. 23, the operations performed by the receiving unit 1730 will be described in detail.

At step S1801, the receiver 131 receives the transmission information It from the transmitter 120, and takes out a part or the whole of the encrypted multiple information Ime from the received transmission information It.

At step S1802, the descrambler 1732 receives the encrypted multiple information Ime obtained at step S1801. Then, the descrambler 1732 decrypts the received encrypted multiple information Ime, and produces the multiple information Im.

At step S1803, the demultiplexer 1433 separates the multiple information Im obtained at step S1802 for each encrypted information unit Iue, and takes out the encrypted information unit Iue.

At step S1804, the storage 1034 stores the encrypted information unit Iue using the encrypted information unit ID.

At step S1805, the procedure advances to step S1806 when the reproducer 1036 outputs reproduction designating information Idr, while being returned to step S1801 when it does not output the reproduction designating information Idr.

At step S1806, the storage 1034 takes out the encrypted information unit Iue having the encrypted information unit ID designated by the reproduction designating information Idr outputted at step S1805 from the storage 1034 storing the encrypted information unit Iue, and outputs the encrypted information unit Iue taken out.

At step S1807, when an information unit Iu to be taken out exists in a state where it is not encrypted in the encrypted information unit Iue inputted to the descrambler 1732, the procedure advances to step S1809.

At step S1808, the descrambler 1732 decrypts once the encrypted information unit Iue in which there exists the information unit Iu to be taken out. Thereafter, the procedure returns to step S1807.

At step S1809, the reproducer 1036 receives the information unit Iu outputted by the descrambler 1732, and produces the reproduction information Ir which is reproducible information.

At step S1810, the reproducer 136 presents the reproduction information Ir obtained at step S1809 to a user in accordance with the format of the reproduction information.

As described in the foregoing, the recursive encryption is performed a plurality of times by the information unit scrambler 1012, and the same cipher system as that used in the information unit scrambler 1012 is used in the lower layer scrambler 114, thereby making it possible to perform decryption corresponding to all the plurality of times of encryption in the descrambler 1732.

Further, the encrypted information unit ID is added to the encrypted information unit Iue, and the storage 1034 is added, thereby making it possible to update the encrypted information unit Iue stored in the storage 1034 to the newest one without performing decryption processing in the descrambler 1732. When the user actually views the encrypted information unit Iue, the encrypted information unit Iue is decrypted by the descrambler 1732.

Figure 24:
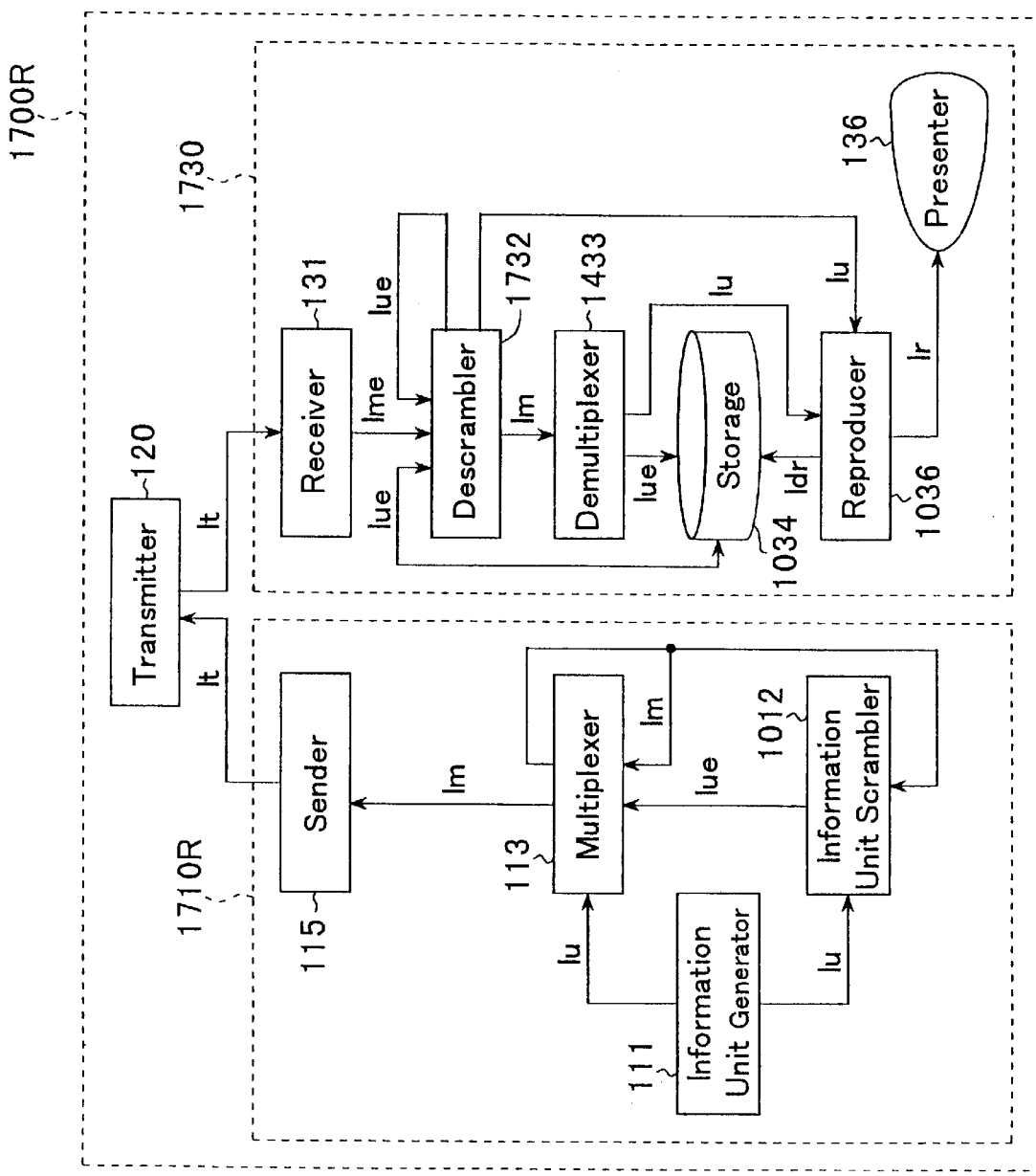
FIG. 24 is a block diagram showing an alternative of the information transmission apparatus of FIG. 22.

With reference to FIG. 24, an alternative of the information transmission apparatus 1700 of FIG. 22 is shown. The information transmission apparatus 1700R shown in FIG. 24 has a construction where the lower layer scrambler 114 is removed from the information transmission apparatus 1700. In this apparatus, the encryption for a lower layer transmission is performed not by the lower layer scrambler 114 (FIG. 22) but by the information unit scrambler 1012 (FIG. 24). Therefore information unit scrambler 1012 only has to encrypt under a certain encryption system used by a lower layer such as being performed by the transmitter 120. Needless to say, the information unit scrambler 1012 may be able to encrypt under various encryption systems including one suitable for the above mentioned lower layer transmission.

As described in detail in the foregoing, according to the present invention, information units Iu are subjected to the same recursive encryption a plurality of times, and are decrypted a plurality of times by one descrambler. Therefore, it is possible to not only perform encryption having a larger degree of freedom, as compared with that in the conventional example, but also to simplify the information transmission apparatus by preventing a special descrambler and the addition of a descrambler, for example.

Furthermore, an encrypted information unit ID added after the encryption of the information unit Iu is introduced, to update the contents of storage newly provided on the basis of the ID. In actually viewing the information unit Iu, the information unit Iu is decrypted by the descrambler. Therefore, it is not only feasible to simply manage the updating of the contents of the storage but also possible to prevent, because the stored information unit Iu is descrambled when it is viewed, users who do not pay fees from unfairly viewing the information unit Iu. Therefore, the present invention is high in affinity for a system of charging fees in the case of decryption.

While the invention has been described in detail, the foregoing description is in all aspects illustrative and not restrictive. It is understood that numerous other modifications and variations can be devised without departing from the scope of the invention.

What is claimed is:

1. An information transmission apparatus for use in an information transmission system where encrypted information comprised of a plurality of information units each hierarchically encrypted and multiplexed to each other is communicated between at least two parties, the information being encrypted for the transmission, said apparatus comprising:

an information unit producing means for producing the information unit;

a first encryption means for encrypting the information unit with a first predetermined encryption system to produce an encrypted information unit; and a first multiplex means for multiplexing at least one of the information unit and the encrypted information unit to produce a multiplexed information unit.

2. An information transmission apparatus as claimed in claim 1, further comprising:

a second encryption means for encrypting the multiple information with a second predetermined encryption system to produce the encrypted multiplexed information; and a second multiplex means for multiplexing the encrypted information unit to produce the multiplexed information.

3. An information transmission apparatus as claimed in claim 2, further comprising:

a third encryption means for encrypting the multiplexed information with a third predetermined encryption system to produce an encrypted multiple information unit.

4. An information transmission apparatus as claimed in claim 3, wherein said third predetermined encryption system is the same as that applied to the encrypted information.

5. An information transmission apparatus as claimed in claim 3, wherein said second predetermined encryption system is the same as said third predetermined encryption system.

6. An information transmission apparatus as claimed in claim 3, wherein said first, second, and third predetermined encryption systems are the same.

7. An information transmission apparatus as claimed in claim 1, further comprising:

a transmitting means for converting the encrypted multiplexed information into a format suitable for an efficient transmission.

8. An information transmission apparatus as claimed in claim 1, wherein said first encryption means encrypts the information unit with an encryption system suitable for the transmission of information.

9. An information transmission apparatus for use in an information transmission system where encrypted information comprised of a plurality of information units each hierarchically encrypted and multiplexed to each other is communicated between at least two parties, the information being encrypted for the transmission, said apparatus comprising:

a first decryption means for decrypting the encrypted information with a first decryption system to produce a first multiplexed information unit;

a first demultiplex means for demultiplexing the first multiplexed information unit into any of a first encrypted information unit, a second multiplexed information unit and the information unit; and a second decryption means for decrypting the first encrypted information unit with a second decryption system to produce the information unit or a second encrypted information unit.

10. An information transmission apparatus as claimed in claim 9, further comprising:

a second demultiplex means for demultiplexing the second multiplexed information unit;

a third decryption means for decrypting the second encrypted information unit with a third predetermined decryption system to produce the information unit.

11. An information transmission apparatus as claimed in claim 9, wherein said first decryption system is the same as that applied to the encrypted information.

12. An information transmission apparatus as claimed in claim 1, further comprising:

a storage means provided between said first demultiplexing means and said second decryption means for storing any of the first and second encrypted information units.

13. An information transmission apparatus as claimed in claim 12, further comprising:

a reproducing means for receiving the encrypted information units from said second decryption means to produce a reproduction information indicating a content of the encrypted information, said reproducing means requesting said storage means to supply the stored encryption information unit to said second decryption means.

14. An information transmission method for transmitting encrypted information comprised of a plurality of information units each hierarchically encrypted and multiplexed to each other, the encrypted information being communicated between at least two parties, the information being encrypted for the transmission, said method comprising the steps of:

producing the information unit;

encrypting the information unit with a first predetermined encryption system to produce an encrypted information unit; and multiplexing at least one of the information unit and the encrypted information unit to produce a multiplexed information unit.

15. An information transmission method as claimed in claim 14, further comprising the steps of:

encrypting the multiple information with a second predetermined encryption system to produce the encrypted multiplexed information; and multiplexing the encrypted information unit to produce the multiplexed information.

16. An information transmission method as claimed in claim 15, further comprising:

encrypting the multiplexed information with a third predetermined encryption system to produce an encrypted multiple information unit.

17. An information transmission method as claimed in claim 16, wherein said third predetermined encryption system is the same as that applied to said encrypted information.

18. An information transmission method as claimed in claim 16, wherein said second predetermined encryption system is the same as said third predetermined encryption system.

19. An information transmission method as claimed in claim 16, wherein said first, second, and third predetermined encryption systems are the same.

20. An information transmission method as claimed in claim 14, further comprising the step of:

converting the encrypted multiplexed information into a format suitable for an efficient transmission.

21. An information transmission method as claimed in claim 14, wherein at said encrypting step the information unit is encrypted with an encryption system suitable for the transmission of information.

22. An information transmission method for transmitting an encrypted information comprised of a plurality of information units each hierarchically encrypted and multiplexed to each other, the encrypted information being communicated between at least two parties, the information being encrypted for the transmission, said method comprising the steps of:

decrypting the encrypted information with a first decryption system to produce a first multiplexed information unit;

demultiplexing the first multiplexed information unit into any of a first encrypted information unit, a second multiplexed information unit and the information unit; and decrypting the first encrypted information unit with a second decryption system to produce the information unit or a second encrypted information unit.

23. An information transmission method as claimed in claim 22, further comprising the steps of:

demultiplexing the second multiplexed information unit;

decrypting the second encrypted information unit with a third predetermined decryption system to produce the information unit.

24. An information transmission method as claimed in claim 22, wherein said first decryption system is the same as that applied to said encrypted information.

25. An information transmission method as claimed in claim 14, further comprising the step of:

storing any of the first and second encrypted information units.

26. An information transmission method as claimed in claim 25, further comprising the step of:

a reproducing means for receiving the encrypted information units from said second decryption means to produce a reproduction information indicating a content of the encrypted information, said reproducing means requesting said storage means to supply the stored encryption information unit to said second decryption means.

27. An information transmission system for transmitting encrypted information comprised of a plurality of information units each hierarchically encrypted and multiplexed to each other, the encrypted information being communicated between at least two parties, the information being encrypted for the transmission, said system comprising:

an information unit producing means for producing the information unit;

a first encryption means for encrypting the information unit with a first predetermined encryption system to produce an encrypted information unit;

a first multiplex means for multiplexing at least one of the information unit and the encrypted information unit to produce a multiplexed information unit;

a first decryption means for decrypting the encrypted information with a first decryption system to produce a first multiplexed information unit;

a first demultiplex means for demultiplexing the first multiplexed information unit into any of a first encrypted information unit, a second multiplexed information unit and the information unit; and a second decryption means for decrypting the first encrypted information unit with a second decryption system to produce the information unit or a second encrypted information unit.

28. An information transmission system as claimed in claim 27, further comprising:

a second encryption means for encrypting the multiple information with a second predetermined encryption system to produce the encrypted multiplexed information; and a second multiplex means for multiplexing the encrypted information unit to produce the multiplexed information.

29. An information transmission system as claimed in claim 28, further comprising:

a third encryption means for encrypting the multiplexed information with a third predetermined encryption system to produce an encrypted multiple information unit.

30. An information transmission system as claimed in claim 29, wherein said third predetermined encryption system is the same as that applied to said encrypted information.

31. An information transmission system as claimed in claim 29, wherein said second predetermined encryption system is the same as said third predetermined encryption system.

32. An information transmission system as claimed in claim 29, wherein said first, second, and third predetermined encryption systems are the same.

33. An information transmission system as claimed in claim 27, further comprising:

a transmitting means for converting the encrypted multiplexed information into a format suitable for an efficient transmission.

34. An information transmission system as claimed in claim 27, wherein said first encryption means encrypts the information unit with an encryption system suitable for the transmission of information.

35. An information transmission system as claimed in claim 27, further comprising:

a second demultiplex means for demultiplexing the second multiplexed information unit;

a third decryption means for decrypting the second encrypted information unit with a third predetermined decryption system to produce the information unit.

36. An information transmission system as claimed in claim 27, wherein said first decryption system is the same as that applied to said encrypted information.

37. An information transmission system apparatus as claimed in claim 27, further comprising:

a storage means provided between said first demultiplexing means and said second decryption means for storing any of the first and second encrypted information units.

38. An information transmission system as claimed in claim 30, further comprising:

a reproducing means for receiving the encrypted information units from said second decryption means to produce a reproduction information indicating a content of the encrypted information, said reproducing means requesting said storage means to supply the stored encryption information unit to said second decryption means.

* * * * *